US012750348B1

(12) United States Patent
Joglekar et al.

(10) Patent No.: US 12,750,348 B1
(45) Date of Patent: Sep. 29, 2026

(54) TECHNIQUES FOR CLOUD-BASED PRIVACY CONTROLS

(71) Applicant: Amazon Technologies, Inc., Seattle, WA (US)

(72) Inventors: Sachin P. Joglekar, Bothell, WA (US); Temesghen Kahsai Azene, Union City, CA (US); Kadirvel Chockalingam Vanniarajan, Padur (IN); Firas Azrai, Austin, TX (US); Charles Ward, Sammamish, WA (US); David M. Wheeler, Mesa, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

(21) Appl. No.: 19/009,361

(22) Filed: Jan. 3, 2025

Related U.S. Application Data

(63) Continuation of application No. 18/067,533, filed on Dec. 16, 2022, now Pat. No. 12,224,991.

(51) Int. Cl.

| | |
|---|---|
| ***H04L 9/40*** | (2022.01) |
| ***H04L 9/08*** | (2006.01) |
| ***H04L 9/14*** | (2006.01) |
| ***H04L 9/30*** | (2006.01) |

(52) U.S. Cl.
CPC ........ *H04L 63/0428* (2013.01); *H04L 9/0894* (2013.01); *H04L 9/14* (2013.01); *H04L 9/30* (2013.01)

(58) Field of Classification Search
None
See application file for complete search history.

(56) References Cited

U.S. PATENT DOCUMENTS

2016/0260188 A1* 9/2016 Harouche .......... G06Q 50/2057

* cited by examiner

*Primary Examiner* — Cai Y Chen
(74) *Attorney, Agent, or Firm* — Eversheds Sutherland (US) LLP

(57) ABSTRACT

Systems, devices, and methods are provided for cloud-based privacy controls. User content is encrypted using a content encryption key (CEK). The CEK may be double-encrypted by the data producer—the inner envelope is encrypted using keys associated with privacy domains that are authorized to access the user content. The outer envelope is encrypted using a cloud privacy control's public key. When a data consumer requests access the user content, the cloud privacy control evaluates privacy policies and determines whether access should be permitted. If permitted, the cloud privacy control decrypts the outer envelope and provides the inner envelope with CEK to the requestor. Upon receiving the inner envelope, the data consumer may then decrypt the inner envelope with its privacy domain private key to obtain the CEK. The CEK may then be used to perform a decryption and obtain the user content.

20 Claims, 33 Drawing Sheets

TECHNIQUES FOR CLOUD-BASED PRIVACY CONTROLS

CROSS-REFERENCE TO RELATED APPLICATIONS

This application is a continuation of U.S. application Ser. No. 18/067,533 filed Dec. 16, 2022, which incorporates by reference for all purposes the full disclosure of co-pending U.S. application Ser. No. 18/067,524 filed Dec. 16, 2022, and co-pending U.S. application Ser. No. 18/067,502 filed Dec. 16, 2022. The disclosures of which are incorporated herein by reference in their entirety.

BACKGROUND

In the context of computer security, establishing trust between computing devices has many challenges. In various circumstances, devices in local proximity to each other may utilize a cloud service provider to facilitate various identity and access management related functionality. With the growing prevalence of devices being utilized in use cases that are of a particularly sensitive nature, data privacy is becoming more and more important. For example, an individual who installs home security cameras may wish to have greater control of video data captured by the device. One of the key techniques used to improve data privacy for customers in distributed systems is data minimization. Typically, this refers to the technique of only authorizing data access to the data consumers (device and cloud) that need access to that data to deliver an experience. In a cloud environment, this authorization is managed through access policies. However, there are many challenges involved in cloud-based privacy controls, including but not limited to privilege escalation, causing data to be exposed in an undesired manner, which could be intentional (e.g., by a malicious actor) or unintentional (e.g., a software bug).

Figure 1:
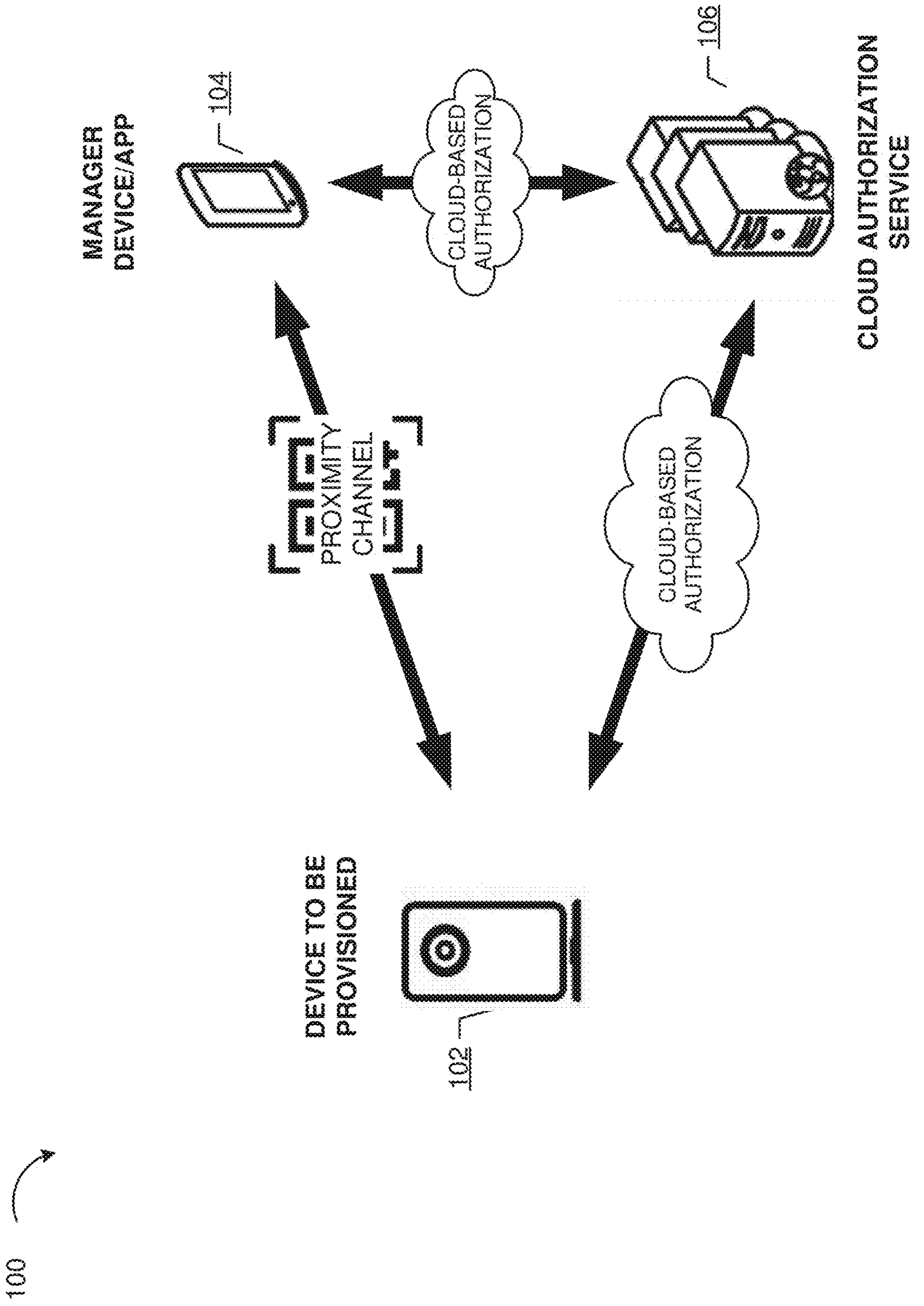
FIG. 1 illustrates a computing environment 100 depicting device enrollment using proximity channel and cloud-based authorization, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for establishing trust between devices using a proximity based key exchange protocol. In various embodiments, the protocol involves the coordination of connected devices and a cloud service provider. Techniques described herein may be used to implement a multi-modal enrollment protocol in which a proximity channel and cloud service provider are jointly used to securely establish control keys that will be trusted by a device or application to authorize privacy preferences.

The use of a multi-modal enrollment protocol has various advances and provides for greater security than any single channel. For example, the use of a proximity channel ensures that the cloud service provider is cryptographically incapable of taking control of the device or application configuration. In various embodiments, users of the cloud service provider may wish to use various services provided by the cloud service provider but not necessarily grant the cloud service provider unlimited access to locally produced data.

Take as an example a use case in which a home consumer sets up a security camera that produces video data—the consumer may wish to utilize various cloud-related functionality, such as the ability to run computer vision models on the video data to detect various types of activity (e.g., notify the consumer when a person is approaching her front door). However, the consumer may wish to ultimately control ownership of such data and have the ability to unilaterally grant or deny access the cloud service provider access to the video feed generated by the local devices. While the cloud service providers have the ability to define configuration settings, the consumer is placing a certain level of trust that the cloud service provider will implement the configuration settings the consumer specifies. In contrast, techniques described herein rely on cryptographic means to secure data generated by local producer devices. The cryptographic schemes described herein can be utilized to provide greater assurances of data privacy as compared to cloud-implemented configurations, in the sense that so long as cryptographic secrets are not divulged to the cloud service provider, it is mathematically infeasible for the cloud service provider to access data once the consumer has revoked access.

Example embodiments described herein provide certain systems, methods, and devices for a multi-modal enrollment protocol in which a proximity channel and cloud service provider are jointly used to securely establish control keys that will be trusted by a device or application to authorize privacy preferences.

FIG. 1 illustrates device enrollment using proximity channel and cloud-based authorization, in accordance with one or more example embodiments of the present disclosure.

In various embodiments, a device to be provisioned 102 may refer to a device that a customer has purchased and wishes to provision to an existing content management environment. For example, device to be provisioned 102 may be a data producer device such as a home security camera, which, when provisioned, may provide a video stream that can be presented on other devices in the customer's home network, such as smartphone apps, smart home devices, and so on and so forth.

Techniques described herein may relate to establishing trust so that a customer's devices will only listen to devices from their own devices/apps and not others. For example, even when the devices are cloud-connected, the cloud cannot override the customer's instructions, such as the user's data privacy preferences. Data security is important in this context—as users expect their preferences to be applied rigorously. For example, if a customer specifies that a home security camera should only encrypt to devices A, B, and C, then the device should listen to the policy defined by the customer sets up, and there is a strong assertion that the cloud cannot intervene through this security model. From that point of view, customers are given a mechanism way to exchange policies and encrypt content in a way that is rigorously applied by the cloud and cannot be intervened. Users may wish to have improved privacy so that they can specify that their content can only be accessible on their devices and not accessible by cloud, or other cases they want to use cloud enabled features to have a richer experience.

Both production-time privacy controls and consumption-time privacy controls are described herein. The CPS privacy control systems described herein may generate per-consumer manifest entries when the content is getting encrypted or at the time a consumer actually needs access. As described in greater detail herein, which implementation is used in specific circumstances can be used on various considerations. For example, generating manifests at the time of consumer access may be advantageous when the consume authorizer could be applied before the manifest is generated, thereby reducing storage requirements as the manifest is generated when the consumer actually needs it, and revocation doesn't require clearing a manifest entry as they are not persisted. Furthermore, if certain data consumers only access a small subset of content, then the amount of data that is persisted may be significantly reduced. Moreover, it simplifies the past content access for a consumer who is newly enrolled in a customer account, as the manifest entries are generated at runtime. This allows a data consumer that is enrolled at time t2 to gain access to encrypted content that was produced at time t1 where t1<t2 (i.e., t1 occurred before t2). On the other hand, on-demand manifest creation adds latency for consumer requests as the manifest entries are being dynamically generated in response to the request. Based on these considerations, there may be cases where some of the above factors are more important than others and vice versa, which may be used to affect or determine an appropriate privacy control regime.

In enrollment, the customer uses a proximity channel to prove the possession of the device to be provisioned 102 and for setting up an exchange where there is sufficient information that can subsequently be used in a way that the cloud cannot override the cloud channel. The cloud is just an abstraction of a pass-through entity and cannot decrypt or intervene with that state machine. In addition to the proximity channel, a cloud-based authorization channel is also introduced. Having this added layer of security provides greater security because it prevents anyone in proximity of the device to start controlling to the device enrollment and data sharing policies.

The way we prevent this is that the protocol uses the cloud to provide an authorization to say that two devices are worthy enough to have a relation and trust between them—the manager device/app 104 and the device to be provisioned 102. It verifies that the two devices belong to the same account or approved by the customer through some relation, but the cloud cannot override the fact that there is a proximity. So what happens is that there is a proximity started up, and there is a cloud authorization with cloud authorization service 106 that happens without cloud being able to override the proximity channel, and that raises the bar in terms of security to avoid a rogue actor from taking over control of the device and at the same time it still has a secure trust establishment without cloud intervention.

A proximity channel may be used to establish proof-of-possession, and a cloud-based authorization may be performed to verify that the enrollee is a legitimate participant.

Figure 2:
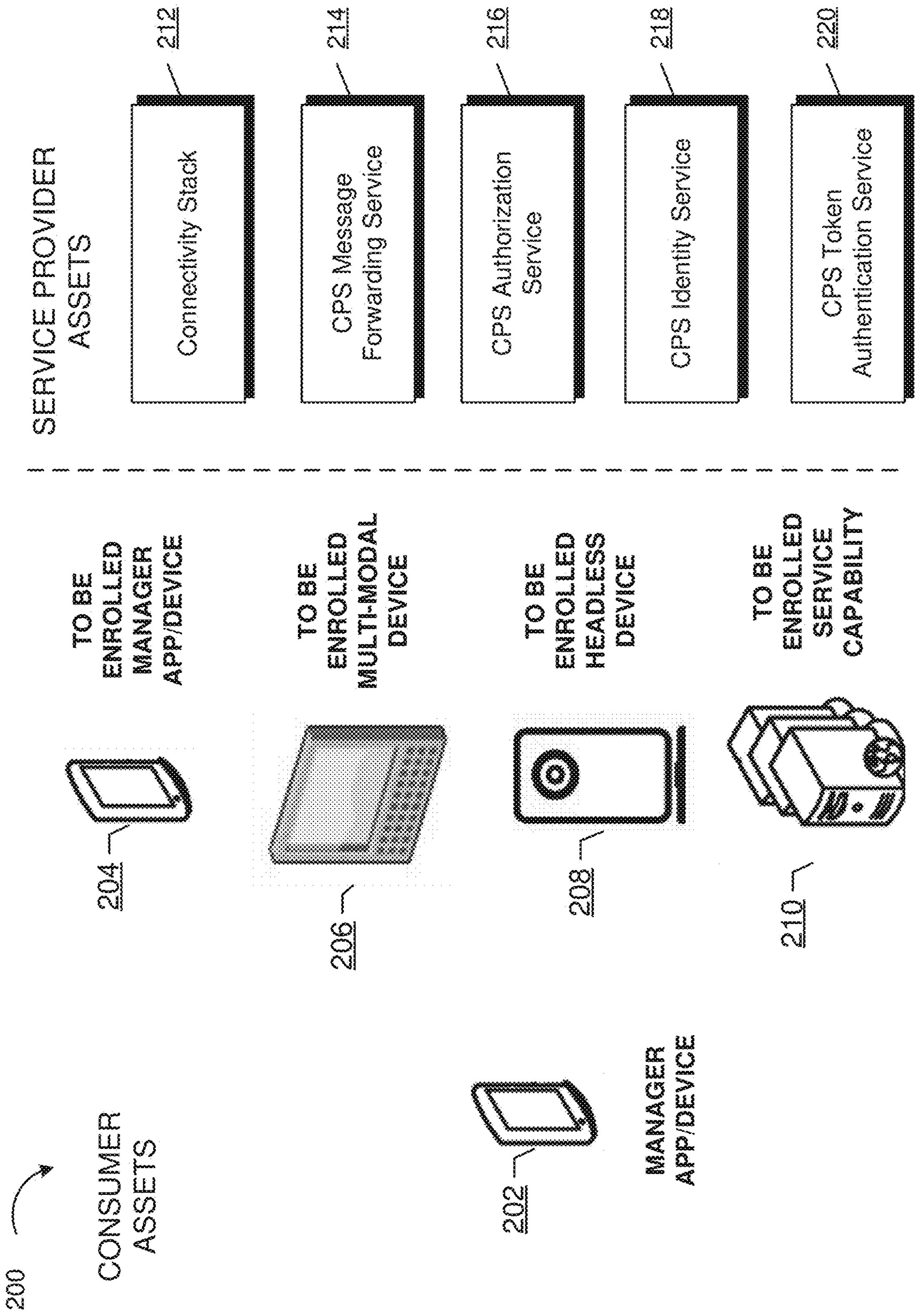
FIG. 2 illustrates a computing environment 200 depicting various consumer and cloud components that may be utilized to perform an enrollment process, in accordance with one or more example embodiments of the present disclosure.

FIG. 2 illustrates a computing environment 200 depicting various consumer and cloud components that may be utilized to perform an enrollment process, in accordance with one or more example embodiments of the present disclosure.

In various embodiments, FIG. 2 depicts an environment that comprises an already enrolled manager app/device 202, to be enrolled manager app/device 204, data consumer device 206, and data producer device 208. The devices 202-208 may be customer assets that are owned or controlled by a customer. The customer may have physical access to these devices. In various embodiments, the devices can be installed and placed in close proximity to each other during an enrollment process. FIG. 2 further comprises cloud service provider assets, according to at least one embodiment. The cloud service provider assets may comprise one or more of: connectivity stack 212, content protection service (CPS) message forwarding service 214, CPS authorization service 216, CPS identity service 218, and token authentication service 220. It is noted that various components that are implemented or provisioned specifically for content management related use cases may include CPS messaging forwarding service 214, CPS authorization service 216, and CPS identity service 218. Other such components may be utilized in connection with CPS-related components as well as functionality unrelated to the CPS services.

In various embodiments, manager app/device 202 refers to an already enrolled manager device or application installed thereon that the content owner has in an enrolled state. In various embodiments, this refers to a device or application on a device from which the customer can establish trust in other devices/app instances. The first manager instance within the account will enroll into the CPS service by either creating a new root-of-trust or by directly using the root-of-trust backup that is secured using the passphrase. Subsequent enrollment can be done through device-to-device setup, which is described throughout this disclosure. In various embodiments, the manager provides APIs to manage the privacy policies and manage enrolled participants. The device/app may be registered to a customer account upon the first enrollment, and may be restricted to a headed or multi-modal device (e.g., not a headless device).

In various embodiments, devices 204-210 refer to devices that can be subject to an enrollment process. These participants may refer to manager, multi-modal non-manager participant, headless non-manager participants). These devices may be customer-owned device/app instances that need to be enrolled into the CPS environment. The customer account already has CPS enabled, and there is a manager who can enroll these devices through an enrollment protocol, for example, device 202. Examples of such devices that can be enrolled include a to be enrolled manager app/device 204, a data consumer device 206, and a data producer device 208. To be enrolled, service capability 210 refers to a cloud service that a customer can opt-in or opt-out of. For example, manager device 202 can be used to opt-in to cloud service functionality such as motion detection services that act as a data consumer of data that is produced by a customer's home security cameras (e.g., a data producer).

In various embodiments, connectivity stack 212 refers to a websocket connectivity gateway that provides device/app-to-cloud messaging as well as cloud-to-device messaging. Bob Dispatcher and the related suite of services are one such implementation. Other implementations may be built specifically for the CPS environment. In various embodiments, connectivity stack 212 is utilized to provide an up-channel through which messages can be delivered to CPS message forwarding service 214, and a down-channel must be available back to the device/app through the connectivity stack through which CPS message forwarding service 214 can forward messages to specific device/app instances. The up-channel and down-channel connections may terminate at two different connectivity stacks. In various embodiments, CPS message forwarding service 214 coordinates the forwarding of messages across the stacks.

In various embodiments, CPS message forwarding service 214 refers to a service registered with the connectivity stacks under specific topic(s), so any message sent from any device/app to the specific topic(s) will be routed to this service. The message will be interpreted by the CPS message forwarding service 214, a destination device/app will be identified, and the message will be forwarded to the specific device/app instance by the CPS message forwarding service 214 using the down-channel (such as S2DM of Bob). CPS message forwarding service 214 may sometimes be referred to throughout this disclosure as a "message forwarder."

In various embodiments, CPS authorization service 216 refers to a device/app-facing service which provides offline authorization capability in the form of a CPS authorization service (CAS) token. A CAS token may be a type of access token used by the CPS authorization service 216 to authorize resource requests across participants. After the initial message from originator to responder over the proximity channel, the responder communicates back to the originator over the device-to-device channel, denoted as CH08. From this point onwards, the messages are secured end-to-end and are accessible only at the originator and responder even though the payload gets relayed through the CPS Message Forwarder and Connectivity Stack. For example, a handshake process may be performed between the two to establish a shared secret using material that is provided through the proximity channel. This information would not be shared or known to the connectivity stack or CPS-related components. Accordingly, messages over the device-to-device channel routed through the connectivity stack and message forwarder could be secured using such shared material.

A resource owner can initiate the authorization in the form of an authorization grant (AG) that gets deposited with the CPS authorization service 216. The grant needs to be shared to an authenticated resource accessor by the resource owner. The resource accessor attempts to exchange the AG with the CPS authorization service 216. The CPS authorization service 216 may perform some cloud-authorization checks based on the accessor and the AG, and only if that happens to be valid, will issue CAS token to the accessor. The accessor can then request the resource custodian (which may be different from the resource owner) for an operation and providing the CAS token as proof. The resource custodian will validate the CAS token to perform authorization checks based on the requested operation, thereby perform allow/deny decisions locally. The CAS token will specify if the resource custodian can perform authorization checks offline with the cloud or if it needs to call into the CPS authorization service 216 for the actual decision using the token.

In various embodiments, CPS identity service 218 refers to a service that tracks the identity public key of the participants and helps to discover the same by other participants. CPS identity service 218 may be where all the enrolled identities are stored so others can discover the existence and identity of other participants within a customer's environment. For example, when, through the out of band channel, a manager device/app has issued an identity to a participant device/app, the participant will use its native identity and then authenticate itself through the CPS identity service 218. In various embodiments, CPS identity service 218 comprises one or more interfaces for providing identity and/or key discovery services. These can be implemented using the same service or discrete services, according to various embodiments. In various embodiments, a key discovery service (e.g., implemented in CPS identity service 218) is used to perform encryption key discovery for participants in a CPS environment. In various embodiments, an identity service (e.g., implemented in CPS identity service 218) is used to check the validity of various certificates (e.g., an X.509 certificate) to authenticate participants' identities.

In various embodiments, CPS authentication service 220 refers to service that abstracts various native identities (device/app identities such as native account OAUTH token, as well as cloud service identities. It issues CPS service's own authentication context, which will be understood by all CPS services, thereby avoiding the need for individual services to be aware of the identity differences across first-party vs. third-party, device/app vs. cloud participants.

Figure 3:
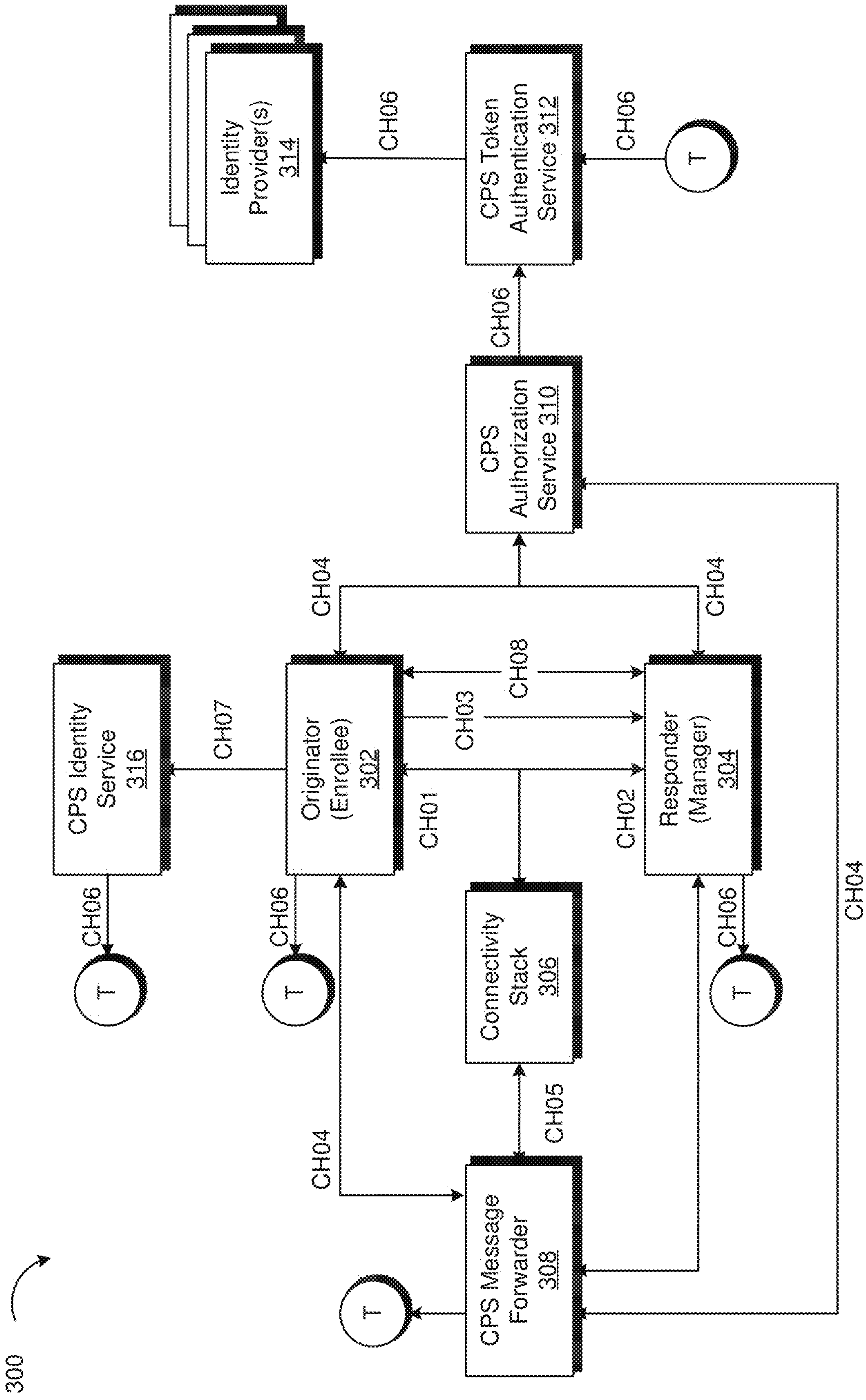
FIG. 3 illustrates a computing environment 300 depicting communications channels for a content protection service (CPS) enrollment environment, in accordance with one or more example embodiments of the present disclosure.

FIG. 3 illustrates a computing environment 300 depicting communications channels for a content protection service (CPS) enrollment environment, in accordance with one or more example embodiments of the present disclosure.

In at least one embodiment, FIG. 3 depicts an enrollment environment that comprises an originator (enrollee) 302, responder (manager) 304, connectivity stack 306, CPS message forwarder 308, CPS authorization service 310, CPS token authentication service 312, identity provider(s) 314, and CPS identity service 316. FIG. 3 furthermore depicts various communications channels represented as CH01, CH02, CH03, CH04, CH04, CH05, CH06, CH07, and CH08. It should be noted that the number of the communications channels does not imply an ordering in communications, but rather, is used to distinguish one channel from another for discussion purposes only.

Various components depicted in FIG. 3, such as connectivity stack 306, CPS message forwarder 308, CPS authorization service 312, CPS token authentication service 312, identity provider(s) 314, and CPS identity service 316, may be implemented in accordance with FIG. 2. Originator and responders depicted in FIG. 3 may refer to customer controlled participant devices. The enrollee may be a data producer, data consumer, a new manager, etc.

In various embodiments, originator (enrollee) 302 refers to a device that is being enrolled to a CPS environment. For example, a customer may purchase a new device, such as a data producer device or data consumer device, and wish to enroll the device within the customer's existing CPS environment. This may include other participant devices. The customer's CPS environment may comprise a responder (manager) 304 device. The responder device may refer to an already enrolled manager device 304, such as described in connection with FIG. 2. Generally speaking, the originator and responder designation may refer to the entity that first initiates the enrollment process and the entity that responds to the initiation, respectively. In other embodiments, it may be the case that a manager device initiates the enrollment process—for example, an application on the manager device may allow for the customer to discover nearby devices that can be provisioned or added to the customer's CPS environment.

As depicted in FIG. 1, CH01 and CH02 may refer to respective communications channels from the originator device and responder device to the connectivity stack 306. The connectivity stack may be implemented as a web socket from originator and responder, respectively.

Originator 302 and responder 304 refer to participants—one is the participant to be enrolled (enrollee), and the other is the manager who enrolls the participant. Techniques described herein to establish the initial trust across these two participants may be independent of the actual role they play, we are just using generic terms as originator and responder. Originator provides the first payload to be sent over a proximity channel denoted as CH03 in FIG. 3 to the responder and hence the nomenclature. The proximity channel may refer to an out-of-band channel between the originator and responder. CH03 proximity channel provides communication between the participants through a channel that doesn't flow through cloud components and is possible by virtue of the proximity between the two participants. Examples of proximity channels are SoftAP, Bluetooth, QRcode display/scan, etc. This may be implemented, for example, as a QR code presented by the originator that is scanned by the responder. The QR code may be used to provide an attestation that the originator and responder are in proximity to each other. In various embodiments, the proximity channel is implemented using near field technologies that require the originator and responder device to be in close physical proximity to each other to function. The responder and originator roles may be reversed in some embodiments.

The proximity channel denoted as CH03 may be used by the manager device to confirm physical proximity to the enrollee device. Both the Originator and Responder begin the enrollment by virtue of the proximity. This may be viewed as a necessary condition but not a sufficient condition for trust in the CPS environment. For example, there may be an unauthorized actor in proximity (e.g., an adversary gains temporary access to a physical space and attempts to enroll a camera device and gain access to the video feed). Such requests can be mitigated by performing a second aspect of the trust through authorization checks in a cloud service provider. For this, the participants leverage the CPS authorization service 310 in the cloud to verify if the other end is a legitimate participant to get into an enrollment hand-shake with.

In order for the participants to get into an enrollment handshake, they either must belong to the same account or different accounts belonging to the same customer—through verification of the linked account scenarios. The channel denoted as CH04 captures the flow to create an authorization grant, exchange authorization grant for a CPS Authorization Service (CAS) token, and to use the CAS token with a resource custodian to perform an operation that requires the authorization.

As shown in FIG. 3, communications channel CH05 denotes a bi-directional communications channel between connectivity stack 306 and message forwarder 308. Message Forwarder will forward messages across two connections within the connectivity stack. It receives messages from the originator/responder to a specific topic over the connectivity channel, checks the destination connection instance, and routes the message accordingly.

Communications channel CH06 refers to a channel used for all requests from the originator/responder to the cloud that are authenticated with a tenant identity provider (TIP) token. The TIP token gets authenticated using CPS Token Authentication Service 312 which in turn calls into the token service from native identity provider(s) 314.

The Identity Provider that the Tenant uses to issue native identity to the customer-owned devices and app instances. These may include identity provider services provided by a cloud service provider. A "tenant" may refer to the team or organization that is integrating with the CPS. This refers to teams within a service provider that may be integrating with the CPS, providing certain functionalities such as the processing of sensitive data belonging to the customer in a cloud environment. These may be first-party cloud providers with the CPS or offloaded to third-party cloud providers unrelated to the CPS.

Once the certificate issuance is complete, the Originator (assuming that is the participant to be enrolled) will enroll the certificate with the CPS Identity Service 316 over communications channel CH07. Conversely, in other embodiments where the responder is the enrollee, the responder would provide the certificate to CPS identity service 316.

After the initial message from originator to responder over the proximity channel, the responder communicates back to the originator over the device-to-device channel, denoted as CH08. From this point onwards, the messages are secured end-to-end and are accessible only at the originator and responder even though the payload gets relayed through the CPS Message Forwarder and Connectivity Stack. For example, a handshake process may be performed between the two to establish a shared secret using material that is provided through the proximity channel. This information would not be shared or known to the connectivity stack or CPS-related components. Accordingly, messages over the device-to-device channel routed through the connectivity stack and message forwarder could be secured using such shared material.

Figure 4:
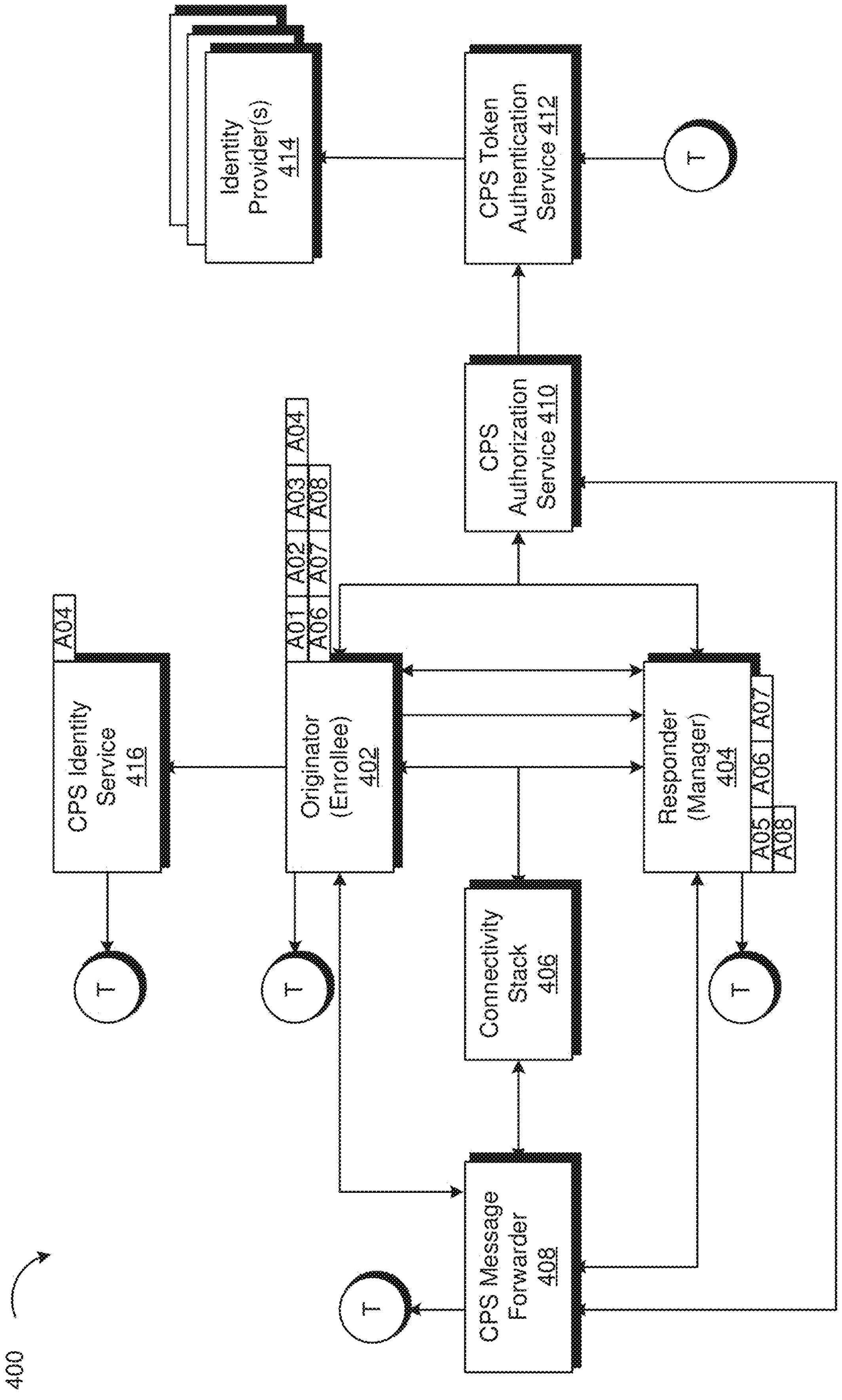
FIG. 4 illustrates a computing environment 400 depicting data elements at rest for a content protection service (CPS) enrollment environment, in accordance with one or more example embodiments of the present disclosure.

FIG. 4 illustrates a computing environment 400 depicting data elements at rest for a content protection service (CPS) enrollment environment, in accordance with one or more example embodiments of the present disclosure.

In at least one embodiment, FIG. 4 depicts an enrollment environment that comprises an originator (enrollee) 402, responder (manager) 404, connectivity stack 406, CPS message forwarder 408, CPS authorization service 410, CPS token authentication service 412, identity provider(s) 414, and CPS identity service 416. FIG. 4 furthermore depicts data at rest and accessible by various components, which are denoted as data elements represented as A01, A02, A03, A04, A05, A06, A07, and A08. It should be noted that the number of the data elements does not imply an ordering, but rather, is used to distinguish one data element from another for discussion purposes only. Data elements A01-A08 may be retained in local compute/storage of the respective components shown in FIG. 4.

Various components depicted in FIG. 4, such as connectivity stack 406, CPS message forwarder 408, CPS authorization service 412, CPS token authentication service 412, identity provider(s) 414, and CPS identity service 416, may be implemented in accordance with FIG. 2. Originator and responders depicted in FIG. 4 may refer to customer-controlled participant devices. The enrollee may be a data producer, data consumer, a new manager, etc.

In various embodiments, A01 refers to a participant identity key. This may refer to a private key of the originator and may be kept secret from other parties. This data may be restricted as loss of data can lead to the loss of customer trust.

In various embodiments, A02 refers to a participant trusted authorities store. This may include one or more trusted certificate chains that a participant needs to work with. A compromise on this store can result in unsupported participants to be trusted by the participant resulting in potential privacy compromise.

In various embodiments, A03 refers to a certificate signing request. The certificate signing request may be generated by an enrollee device that is being enrolled to a customer's CPS environment. The certificate signing request of the participant to be enrolled within the EA may be considered highly confidential as it may include personally identifiable information (PII) related to the participant to be enrolled, such as a device identifier or account identifier. This is information that should typically not be made public and should be kept confidential. However, this need not be the case with all implementations.

In various embodiments, A04 refers to an enrollment authority (EA) issued certificate. The certificate may be an X.509 certificate or other suitable cryptographically verifiable digital certificate. The certificate may be issued by the EA and may, in at least some embodiments, include highly confidential information, as with A03.

In various embodiments, A05 refers to an EA signing key. This may refer to the private signing key required to issue certificates to trusted participants. This key may be in the possession of manager devices.

In various embodiments, A06 refers to an EA root certificate chain. The root certificate or certificate chain in which a participant can validate the identity of a peer participant. This may be treated as highly confidential for the same reasons as A03 discussed above.

In various embodiments, A07 refers to a customer/device OAUTH token (bearer token). This may be referred to as a tenant identity provider (TIP) token. The TIP token may be used to validate the request coming in from the device. This may be done in the bearer-token model and any entity having this token can act on behalf of the customer while interacting with cloud services.

In various embodiments, A08 refers to a session key. The session key may be shared between the originator and responder. The session key may be used to encrypt the enrollment payload end-to-end and flowing through the cloud (e.g., message forwarder) such that the cloud is not able to inspect or alert the message without detection (e.g., through the use of cryptographic techniques).

In various embodiments, the enrollee participant has access to or otherwise stores (e.g., as private information) the following data elements: A01 participant identity key; A02 one or more trusted certificate chains; A03 a certificate signing request information; A04 enrollment authority (EA) issued certificate; A06 EA root certificate chain; A07 a tenant identity provider (TIP) token; A08 a session key.

In various embodiments, the manager participant has access to or otherwise stores (e.g., as private information) the following data elements: A05 refers to an EA signing key; A06 EA root certificate chain; A07 a tenant identity provider (TIP) token; A08 a session key.

In various embodiments, the CPS identity service 416 stores A04 enrollment authority (EA) issued certificates.

Figure 5:
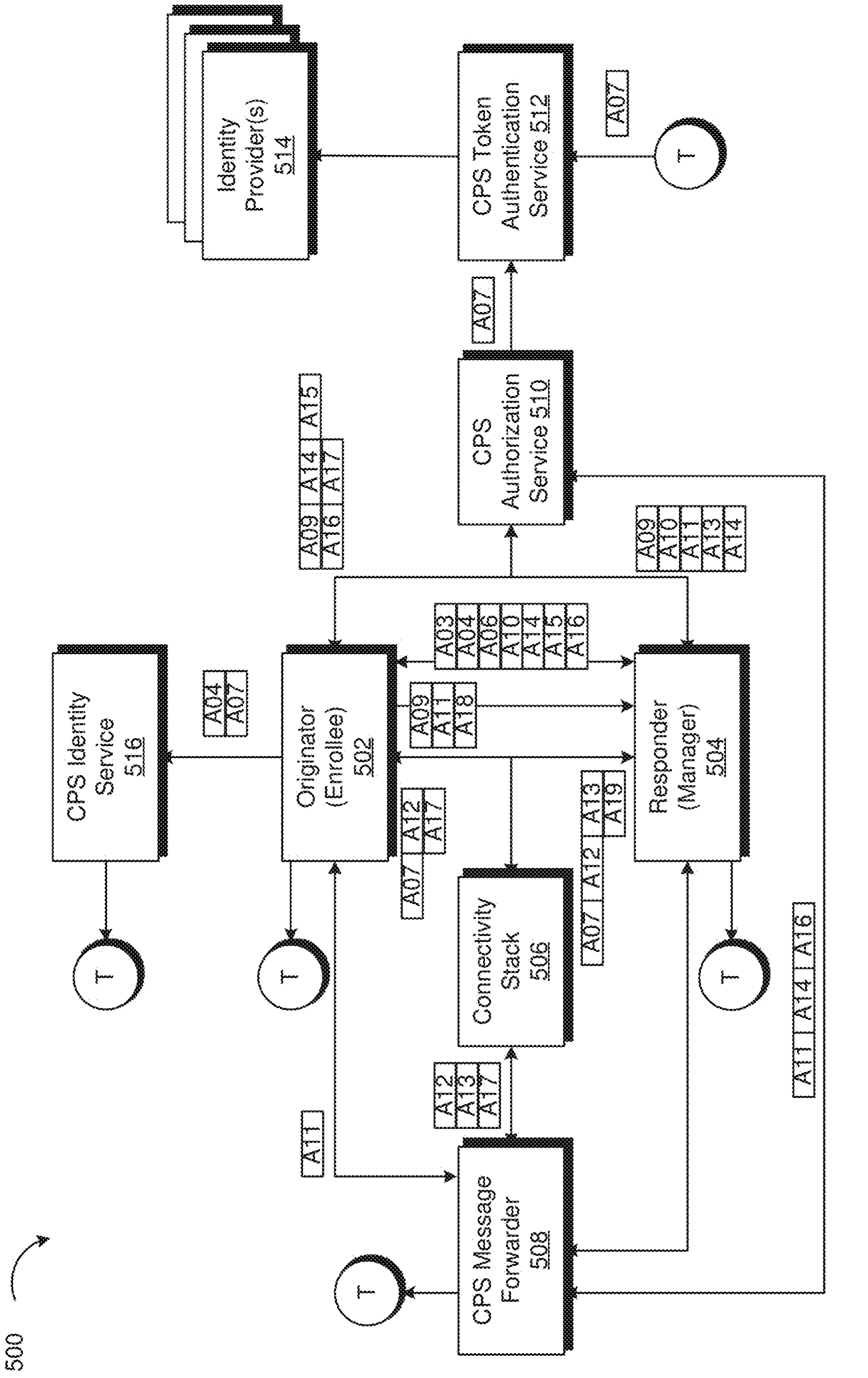
FIG. 5 illustrates a computing environment 500 depicting data elements in transit for a content protection service (CPS) enrollment environment, in accordance with one or more example embodiments of the present disclosure.

FIG. 5 illustrates a computing environment 500 depicting data elements in transit for a content protection service (CPS) enrollment environment, in accordance with one or more example embodiments of the present disclosure.

In at least one embodiment, FIG. 5 depicts an enrollment environment that comprises an originator (enrollee) 502, responder (manager) 504, connectivity stack 506, CPS message forwarder 508, CPS authorization service 512, CPS token authentication service 512, identity provider(s) 514, and CPS identity service 516. FIG. 5 furthermore depicts data elements in transit to/from various components, which may be transmitted using the communications channels represented as CH01-CH08 in FIG. 3. It should be noted that the number of the data elements does not imply an ordering, but rather, is used to distinguish one data element from another for discussion purposes only. Some data elements referenced in FIG. 5 are also described in connection with FIG. 4, such as A04 EA-issued certificate and A07 TIP token.

In various embodiments, A01 refers to a participant identity key. This may refer to a private key of the originator and may be kept secret from other parties. This data may be restricted as loss of data can lead to the loss of customer trust.

In various embodiments, A02 refers to a participant trusted authorities store. This may include one or more trusted certificate chains that a participant needs to work with. A compromise on this store can result in unsupported participants to be trusted by the participant resulting in potential privacy compromise.

In various embodiments, A03 refers to a certificate signing request. The certificate signing request may be generated by an enrollee device that is being enrolled to a customer's CPS environment. The certificate signing request of the participant to be enrolled within the EA may be considered highly confidential as it may include personally identifiable information (PII) related to the participant to be enrolled, such as a device identifier or account identifier. This is information that should typically not be made public and kept confidential. However, this need not be the case with all implementations.

In various embodiments, A04 refers to an enrollment authority (EA) issued certificate. The certificate may be an X.509 certificate or other suitable cryptographically verifiable digital certificate. The certificate may be issued by the EA and may, in at least some embodiments, include highly confidential information as with A03.

In various embodiments, A05 refers to an EA signing key. This may refer to the private signing key required to issue certificates to trusted participants. This key may be in the possession of manager devices.

In various embodiments, A06 refers to an EA root certificate chain. The root certificate or certificate chain in which a participant can validate the identity of a peer participant. This may be treated as highly confidential for the same reasons as A03 discussed above.

In various embodiments, A07 refers to a customer/device OAUTH token (bearer token). This may be referred to as a tenant identity provider (TIP) token. The TIP token may be used to validate the request coming in from the device. This may be done in the bearer-token model and any entity having this token can act on behalf of the customer while interacting with cloud services.

In various embodiments, A08 refers to a session key. The session key may be shared between the originator and responder. The session key may be used to encrypt the enrollment payload end-to-end and flowing through the cloud (e.g., message forwarder) such that the cloud is not able to inspect or alert the message without detection (e.g., through the use of cryptographic techniques).

In various embodiments, A09 refers to an originator enrollment grant code. In various embodiments, A10 refers to an originator enrollment access token (CAS token). The CAS token may be referred to as a bearer token and may be issued by the CPS authorization service that grants the bearer permission to play a role specified in the token during the enrollment process. In various embodiments, A11 refers to an originator messaging grant code. This may be used similar to A09 originator enrollment grant code as part of a process for establishing mutual authentication.

In various embodiments, A12 refers to an encrypted payload. The payload may be encrypted using the A08 session key.

In various embodiments, A13 refers to an originator messaging access token (CAS token). This may refer to a bearer token issued by the CPS authorization service that grants the bearer permission to send messages to the originator when submitting to the CPS message forwarding service.

In various embodiments, A14 refers to a responder enrollment grant code.

In various embodiments, A15 refers to responder enrollment access token (CAS token). This may refer to a bearer token issued by the CPS authorization service that grants the bearer permission to play the role as established in the access token, during enrollment.

In various embodiments, A16 refers to a responder messaging grant code.

In various embodiments, A17 refers to a responder messaging access token (CAS token). This may be a bearer token issued by the CPS authorization service that grants the bearer permission to send messages to the responder when submitted to the CPS message forwarding service.

In various embodiments, A18 refers to the originator session public key. This may be a public key that participates in an Elliptic Curve Diffie Hellman (ECDH) key exchange that is necessary to establish the session. In various embodiments, A19 refers to the responder session public key. This may be a public key that participates in an Elliptic Curve Diffie Hellman (ECDH) key exchange that is necessary to establish the session.

Figure 6:
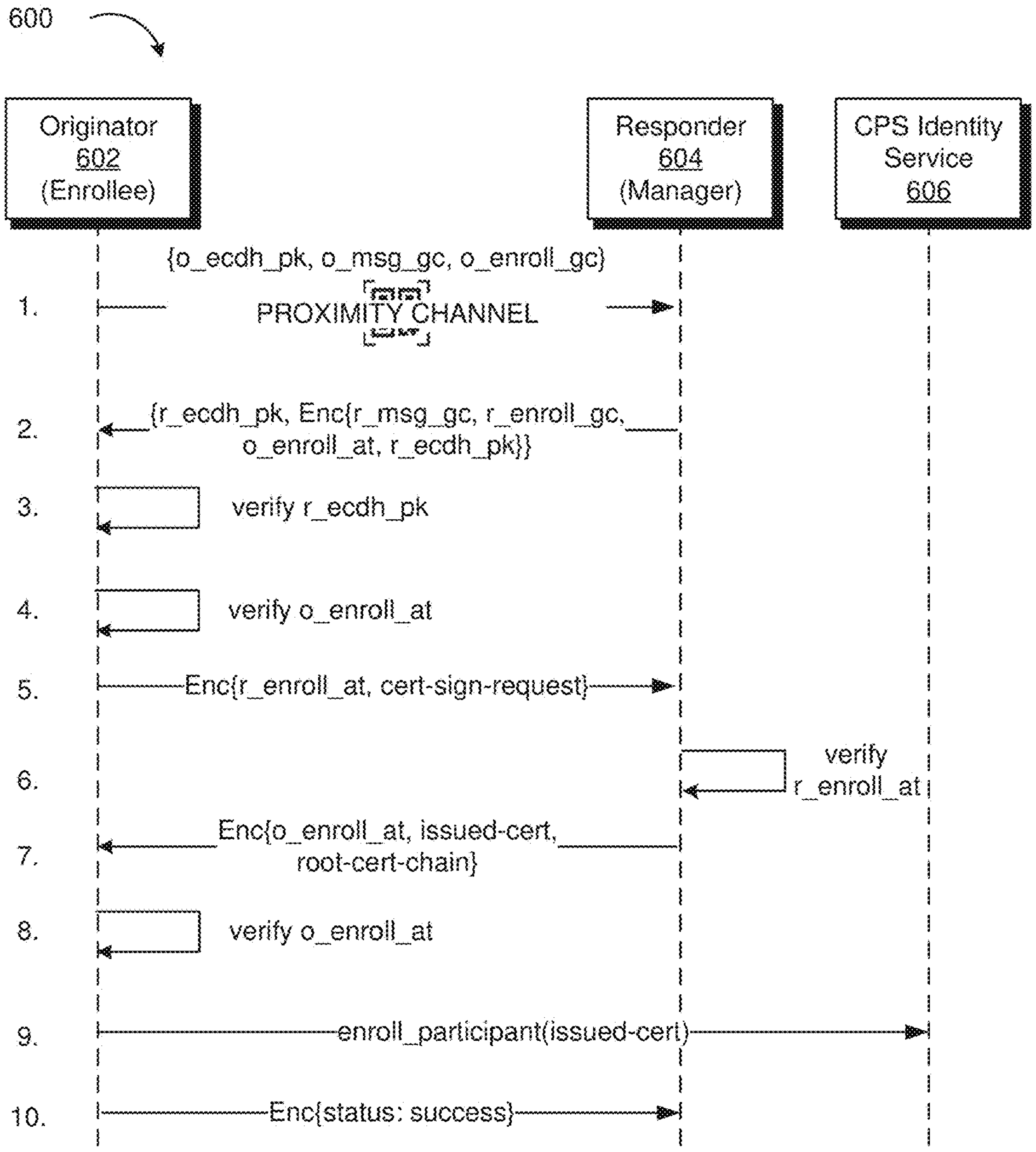
FIG. 6 illustrates a computing environment 600 depicting an enrollment protocol, in accordance with one or more example embodiments of the present disclosure.

FIG. 6 illustrates a computing environment 600 depicting an enrollment protocol, in accordance with one or more example embodiments of the present disclosure.

In various embodiments, FIG. 6 depicts an environment comprising an originator 602, a responder 604, and a CPS identity service 606. These components may be in accordance with those described in connection with FIG. 2, FIG. 3, FIG. 4, and/or FIG. 5. The originator may refer to an enrollee, and the responder may refer to a manager device.

In various embodiments, a protocol for enrolling a device (e.g., enrollee) is depicted in FIG. 6.

Originator 602 may transmit the following information to responder 604: {o_ecdh_pk, o_msg_gc, o_enroll_gc}. As depicted in FIG. 6, o_ecdh_pk as the originator's ECDH public key ('o' indicating originator, 'pk' indicating a public key). As depicted in FIG. 6, o_msg_gc may refer to the originator messaging grant code. This grant code may be used to be exchanged with CPS Authorization Service (CAS) to get a CAS Token o_msg_at. In various embodiments, this token o_msg_at is provided by the responder to the CPS message forwarder in order for the forwarder to authorize send message requests targeted to the originator. As depicted in FIG. 6, o_enroll_gc refers to an originator enrollment grant code. This grant code may be exchanged with the CAS to get a CAS token o_enroll_at. This token o_enroll_at may be provided by the responder to the originator in order to get authorized for the enrollment role that that it is playing, for example, as the manager as depicted in FIG. 6. This information may be transmitted from the originator 602 to responder 604 over a proximity channel. Examples of proximity channels are SoftAP, Bluetooth, QRcode display/scan, etc. This may be implemented, for example, as a QR code presented by the originator that is scanned by the responder. The QR code may be used to provide an attestation that the originator and responder are in proximity to each other. In various embodiments, the proximity channel is implemented using near field technologies that require the originator and responder device to be in close physical proximity to each other to function. The responder and originator roles may be reversed in some embodiments. For example, channel CH03 depicted in FIG. 3 may be used in this step.

In response to initial message from originator 602, responder 604 may provide the following information over the cloud channel: {r_ecdh_pk, Enc{r_msg_gc, r_enroll_gc, o_enroll_at, r_ecdh_pk}}. As depicted in FIG. 6, r_ecdh_pk as the responder's ECDH public key ('r' indicating responder, 'pk' indicating a public key). As depicted in FIG. 6, Enc{r_msg_gc, r_enroll_gc, o_enroll_at, r_ecdh_pk} may refer to a ciphertext generated by the responder 604 using a session key. The session key may be generated according to an ECDH exchange protocol. At the responder, the session key may be generated using a DH exchange protocol based on r_ecdh_sk (responder's ECDH private key) and o_ecdh_pk (originator's ECDH public key, received in step 1). As depicted in FIG. 6, r_msg_gc may refer to the responder messaging grant code. This grant code may be used to be exchanged with CPS Authorization Service (CAS) to get a CAS Token r_msg_at. In various embodiments, this token r_msg_at is provided by the originator to the CPS message forwarder in order for the forwarder to authorize send message requests targeted to the responder. As depicted in FIG. 6, r_enroll_gc refers to a responder enrollment grant code. This grant code may be exchanged with the CAS to get a CAS token r_enroll_at. This token r_enroll_at may be provided by the originator to the responder in order to get authorized for the enrollment role that it is playing, for example, as the enrollee, as depicted in FIG. 6. As depicted in FIG. 6, the ciphertext may further include r_ecdh_pk. This may be used by the originator 602 to verify that the plaintext ECDH public key transmitted by the responder 604 was not tampered with or altered during transmission. Responder 604 may provide this information to originator 602, for example, via communications channels CH01/CH02 of FIG. 3 to facilitate this communication.

In at least one embodiment, at step 3 of FIG. 6, the originator 602 receives the data from responder 604 in the previous step and performs a verification on the r_ecdh_pk quantity. This may involve taking the plaintext r_ecdh_pk that was received outside of the encrypted data, generating a session key, decrypting the encrypted data, and verifying that the decrypted r_ecdh_pk quantity matches the plaintext quantity that was received. This may be used by the originator 602 to verify that the plaintext ECDH public key transmitted by the responder 604 was not tampered with or altered during transmission.

In at least one embodiment, at step 4 of FIG. 6, the originator 602 performs steps to verify o_enroll_at. This o_enroll_at may refer to a CAS token that is needed by the originator 602 in order to get authorized for the enrollment role that it is playing—in this case, for the manager role.

At this point, the following state has been established: first, the session key is established using the respective ECDH public keys of the originator 602 and responder 604. At the originator 602, the session key is established according to a DH (e.g., ECDH) key exchange protocol using o_ecdh_sk and r_ecdk_pk; likewise, at the responder 604, the session key is established using o_ecdh_pk and r_ecdh_sk; these quantities will result in the same session key. Second, device-to-device communications have been established due to the exchange of o_msg_gc and r_msg_gc for o_msg_at and r_msg_at, respectively. Specifically, o_msg_at grants access to the responder to send messages to the originator and r_msg_at grants access to the originator to send messages to the responder. Third, authorization tokens are available at either end, with the responder redeeming the authorization grant code o_enroll_gc for CAS token o_enroll_at, that allows the responder to act as a manager for the participant during enrollment. Likewise, the originator can redeem the authorization grant code r_enroll_gc for CAS token r_enroll_at that grants access to issue identity and trust certs to the originator as part of the enrollment process.

In various embodiments, at step 5 of FIG. 6, the originator 602 will encrypt r_enroll_at and cert-sign-request and send to responder 604. As discussed previously, r_enroll_at is a CAS token that grants access to issue identity and trust certs to the originator 602 as part of the enrollment process; cert-sign-request may refer to a certificate signing request for the originator 602 to be enrolled within the enrollment authority. In various embodiments, the transmission of step 5 is encrypted using the session key previously established between the originator 602 and responder 604.

In various embodiments, at step 6 of FIG. 6, the responder 604 will receive the encrypted transmission from originator 602, decrypt the contents, and verify r_enroll_at allows for the requested operation by originator 602—in this case, a certificate signing request. As the bearer of r_enroll_at, the responder 604 is able to ascertain that the certificate signing request is authorized. The responder 604 may then use an account signing key (ASK) or EA signing key to issue an identity certificate for responder 604. The issued certificate may have a root of trust that can be established using a certificate chain or root certificate that other participants can use to validate that the issued certificate to originator 602 can be trusted. In various embodiments, at step 7, the responder 604 sends to the originator 602 the following as an encrypted quantity: o_enroll_at (CAS token), issued-cert (identity certificate for originator 602), root-cert-chain (root of trust).

In various embodiments, at step 7 of FIG. 6, the originator 602 receives a transmission from responder 604 and decrypts the encrypted quantities. The session key may be used to decrypt the quantities of the transmission from step 7. The originator 602 may verify o_enroll_at at step 8 of FIG. 6. This token o_enroll_at may be provided by the responder to the originator in order to get authorized for the enrollment role that it is playing, for example, as the manager as depicted in FIG. 6. This step may be performed to ensure that a rogue participant is not able to control originator 602 to submit erroneous enrollment requests or to use a compromised certificate.

If the verification is successful, the originator 602 may attempt to submit an enrollment request to the CPS identity service. In various embodiments, the issued certificate is provided by originator 602 to CPS identity service 606. The CPS identity service 606 may verify the certificate is valid (e.g., has a valid root of trust) and store the certificate for originator 602 so that other participants can discover originator. An indication of success/failure may be provided to the originator 602. The originator may, at step 10, provide an encrypted status indicating success or failure of enrollment to the responder 604. Upon receiving an encrypted status from the originator 602, the responder 604 may decrypt the encrypted status and determine whether the enrollment succeeded or not. If the status indicates a successful enrollment, the responder 604 may provide an indication (e.g., in a graphical interface) that end-to-end encryption capabilities is available on the originator 602. If the status indicates a failure, the enrollment may be re-tried or an error message may be provided to facilitate fixing any issues with the enrollment process and to allow for a subsequent enrollment to be attempted.

Figure 7:
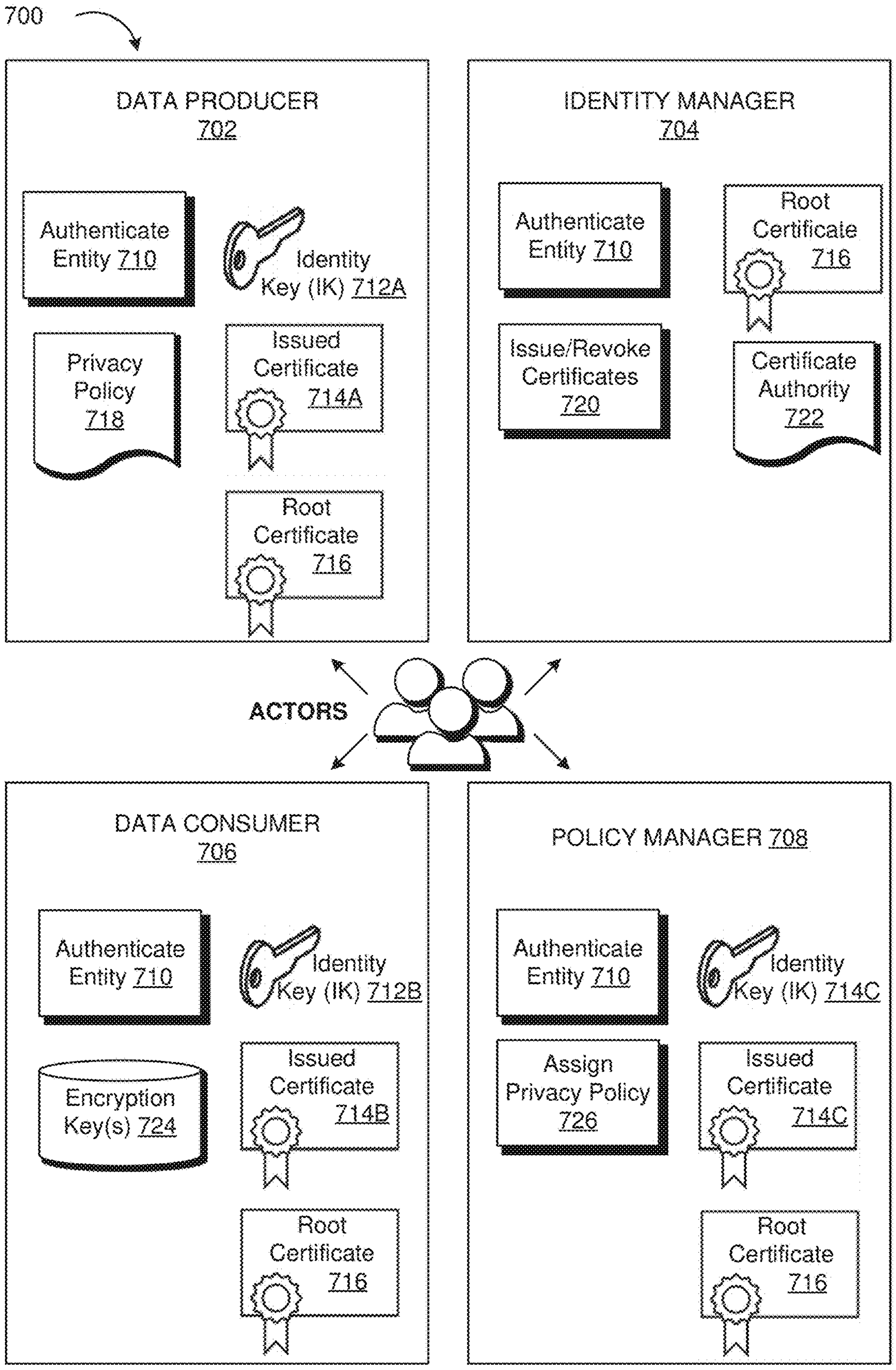
FIG. 7 illustrates an environment 700 depicting actor trust states, in accordance with one or more example embodiments of the present disclosure.

FIG. 7 illustrates an environment 700 depicting actor trust states, in accordance with one or more example embodiments of the present disclosure.

In various embodiments, FIG. 7 depicts an environment comprising trust states for data producer 702, identity manager 704, data consumer 706, and policy manager 708. These components may be in accordance with those described in connection with FIG. 1, FIG. 2, FIG. 3, FIG. 4, FIG. 5, and/or FIG. 6.

In various embodiments, the post-trust establishment state of a data producer 702 is depicted in FIG. 7. The data producer 702 may go through an enrollment process, for example, as described in connection with FIG. 6. In various embodiments, the data producer 702 comprises the following architectural elements: authenticate entity 710; identity key (IK) 712A; issued certificate 714A; root certificate 716; and/or privacy policy 718.

Authenticate entity 710 may refer to software routine that a data producer is able to use to determine whether to authenticate another participant within the context of a CPS environment. Authenticity may refer to cryptographically verifiable assurances that a message was created by a party purporting to be the author of the message. Authenticity may be determined using, for example, root certificate 716 to determine whether cryptographic material is generated by an entity that has a certificate chain that has a root of trust that is trusted by the data producer. Authenticating an entity may be one part of cross-party trust establishment.

Identity key 712A may refer to an identity key (IK) that corresponds to issued certificate 714A. Issued certificate 714A may refer to a certificate issued to the data producer 702 by one of the identity managers 704. In various embodiments, identity key 712A refers to the private key of this asymmetric key pair or may refer to the key pair itself. The private key of the asymmetric key pair is securely stored within the participant, and the issued certificate 714A may be shared with other entities to establish trust.

In various embodiments, the issued certificate 714A is signed by a certificate authority (e.g., using an account signing key or EA signing key) that encodes a public key associated with the identity key 712A. The issued certificate 714A may have a chain of trust to the root certificate 716 that can be cryptographically verified by other participants. The issued certificate 714A may be provided to other participants of the CPS environment to establish trust with data producer 702.

Issued certificate 714A may be an end-entity certificate. An end-entity certificate may refer to a certificate that includes a public key that has a corresponding private key, which is used as part of a cryptographically protected communication. For example, the issued certificate, which may include a public key of data producer 702, may have a corresponding private key that the data producer 702 uses as part of a TLS handshake process to establish a TLS session. The Subject field of the certificate may be an identifier that refers to the entity associated with the certificate. For example, in the issued certificate 714A, the subject may refer to a participant, such as the server described in accordance with other embodiments of this disclosure. The Issuer field of the certificate may refer to the entity that digitally signed the certificate. In some embodiments, the issuer identified in the Issuer field may be an intermediate authority or may be a root authority for a certificate chain such as those issued by identity manager 704. A certificate may further include information regarding the subject's public key information. The SubjectPublicKeyInfo field may include two subfields—a Key field, which includes a bitstream of the cryptographic public key of the subject, and an Algorithm field, which identifies the public key algorithm of the subject public key. For example, the algorithm "RSA- 2048" may refer to the subject public key being a 2048-bit RSA public key, and the key may be a 2048 bit stream.

Root certificate 716 may be a certificate that is self-issued by the certificate authority associated with the root certificate (e.g., by identity managers 704). For example, the Subject field and the Issuer field of the root certificate may refer to the same entity. In some embodiments, additional information is included in the certificate to indicate that a certificate is a root certificate. For example, a root certificate 716, in accordance with the X.509 v3 standard may include a basicConstraints field that further includes a cA field being TRUE. In some embodiments, a computer system may be provisioned with one or more root certificates that are trusted. Additionally, a system administrator may provision a computer system to include additional trusted certificates, such as a root certificate that is issued by an organization's internal certificate authority. An organization's internal certificate authority may, in some embodiments, be trusted by computing devices that are provision by the organization but not necessarily trusted by device that have not been provisioned by the organization. A private key associated with the root authority identified in the root certificate 716 may be used to digitally sign an intermediate certificate, and the subject public key included in the root certificate 716 may be used to cryptographically verify the authenticity of the digital signature generated over the intermediate certificate or to produce a chain of trust.

Trust across actors is established by trusting the root certificate 716 from the other actors. This trust is specified through the privacy policy 718. For example, when actor A shares a specific data producer to actor B, the actor A will add the following to the privacy policy of the data producer device: Allow content access to data consumers having certificates issued from Certificate Authority B, which have the purpose/action "view video". The data producer device will enumerate the data consumers having the purpose/action "view video" issued by Certificate Authority B to discover the processors and encrypt content to.

An illustrative, non-limiting example of a privacy policy 718 is described below. A privacy policy may include one or more permissions. In some embodiments, a permission may specify a principal, a resource, an action, a condition, and an effect. In some embodiments, a permission may also specify a plurality of one or more of these elements, such as, for example, a set or class of users, a collection of resources, several different actions, and/or multiple conditions. In some embodiments, the permission may specify one or more wildcard or otherwise modifiable characters that may be used to denote that the permission may be modified to make the permission applicable to different users and their associated resources. Wildcards may be represented in various formats—for example, an asterisk may represent any number of characters, and a question mark may represent any single character. In some embodiments, the policy may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure.

The principal may be a participant device, a user, a group, an organization, a role, or a collection and/or combination of these or other such entities. A principal may be any entity that is capable of submitting API calls that cause an action associated with a resource to be performed and/or any entity to which permissions associated with a resource may be granted. As an example, a permission may have a principal element specified in the following manner:

"Principal": "CPS: customerid:identity::hawksfan8"

In some embodiments, the principal is identified by a resource name that uniquely identifies the principal. A principal may include one or more name spaces that include additional information regarding the principal. For example, the principal may be encoded such that it uniquely resolves to a specific CPS environment of a specific customer.

The resource may refer to a computing resource of a CPS environment. Computing resources of a CPS environment may include: compute resources (e.g., virtual machine instances); storage resources (e.g., scalable storage, block storage, and managed file storage systems); database systems (e.g., managed relational database systems); migration services (e.g., applications, services, and hardware for streamlining the transfer of data from one physical data center to another); network and content delivery; developer tools; management tools; security, identity, and access management services; analytics services; artificial intelligence services; and more. Computing resources may be organized in a hierarchy and may use structures such as folders, directories, buckets, etc. to organize sets of computing resources into groupings. In some cases, policies and/or permissions may be applied directly to a bucket and grant cross-account access to an environment. As an example, a permission may have a resource element specified in the following manner:

"Resource": "CPS:customerid:storage::bucket/video-_feed.mp4"

In some embodiments, the resource is identified by a resource name that uniquely identifies the resource. In some cases, the resource may share a same naming convention as the principal or other elements of the permission. However, this need not be the case, as each separate element of a permission may use a naming convention, namespace, format, etc., that is independent of other elements. In the example resource given above, "rn "storage" may refer to a service namespace that identifies a storage related resource. In the example above, the resource may indicate an image in the video (MP4) format and is stored in a bucket.

The action may be the specific action or actions that will be allowed or denied by the permission. Different types of services (e.g., having different service namespaces) may support different actions. For example, an identity and account management service may support an action for changing passwords, and a storage service may support an action for deleting objects. An action may be performed in association with the resource and may, for example, be identified by a type of API call, a library call, a program, process, series of steps, a workflow, or some other such action. As an example, a permission may have an action element specified in the following manner:

"Action": "storage:GetObject"

The condition element may be one or more conditions that specify when a policy is in effect. In some embodiments, the condition element is optional and may be omitted in some permissions. Conditions may be described as Boolean expressions that may be used to determine whether the policy is in effect (i.e., if the expression evaluates to TRUE) or not in effect (i.e., if the expression evaluates to FALSE). Policies that are not in effect may be unenforced or ignored by an authorization module (such as those described elsewhere in this). In some embodiments, conditions in a permission may be evaluated against values provided as part of a web API request corresponding to one or more APIs specified in the action element. As an example, a permission may have a condition element specified in the following manner:

"Condition":{"DateLessThan":{"ws:CurrentTime": "2022-12-13" }}

In this example, the condition, the "ws:CurrentTime" value of the request, is compared against a literal value "2022-12-13" using the condition operator "DateLessThan," which may be used to evaluate whether the condition is met. In this example, the condition may be true when the current time (e.g., the time the request is received by the service provider) is less than the supplied date of Dec. 13, 2022. It should be noted that the key value (in the example, the current time) may be compared not only against literal values but policy variables as well. Various other types of condition operators may exist, which may be used for comparing string conditions, numeric conditions, Boolean conditions, binary conditions (e.g., testing values in binary format), IP address conditions (e.g., testing values against a specific IP address or range of IP addresses), and more. Conditions may, furthermore, include quantifiers. For example, a string condition may include an operator such as "StringEquals" that compares whether two strings are equal, and a similar operator may include a quantifier such that "StringEqualsIfExists" may be used to compare two strings when the key value exists in the context of an evaluation. Quantifiers may be used in conjunction with wildcards where multiple resources matching a wildcard expression may support different context keys.

An effect may refer to whether the permission is used to grant or deny access to the computing resources specified in the permission in the resource element. An effect may be an ALLOW effect, which grants access to a resource, and a DENY effect, which denies access to a resource. In some embodiments, access to computing resources of a computing resource service provider are denied by default and a permission affirmatively including an ALLOW effect is required.

It should be noted that the examples described above merely described one of many ways in which permissions may be expressed. Of course, in other embodiments, variations on the principles described above may be applied in various ways.

In various embodiments, the post-trust establishment state of an identity manager 704 is depicted in FIG. 7. The identity manager may be used to issue certificates to entities that are owned by the customer, such as devices that the customer has purchased and wishes to add to a CPS environment. This is done through a special participant that the actor owns called the identity manager 704.

In various embodiments, the data identity manager 704 comprises following architectural elements: authenticate entity 710; root certificate 716; issue/revoke certificates 720; and/or certificate authority 722.

Authenticate entity 710 may refer to software routine that a data producer is able to use to determine whether to authenticate another participant within the context of a CPS environment. Authenticity may refer to cryptographically verifiable assurances that a message was created by a party purporting to be the author of the message. Authenticity may be determined using, for example, root certificate 716 to determine whether cryptographic material is generated by an entity that has a certificate chain that has a root of trust that is trusted by the data producer. Authenticating an entity may be one part of cross-party trust establishment.

Root certificate 716 may be a certificate that is self-issued by the certificate authority associated with the root certificate (e.g., by identity managers 704). For example, the Subject field and the Issuer field of the root certificate may refer to the same entity. In some embodiments, additional information is included in the certificate to indicate that a certificate is a root certificate. For example, a root certificate 716, in accordance with the X.509 v3 standard may include a basicConstraints field that further includes a cA field being TRUE. In some embodiments, a computer system may be provisioned with one or more root certificates that are trusted. Additionally, a system administrator may provision a computer system to include additional trusted certificates, such as a root certificate that is issued by an organization's internal certificate authority. An organization's internal certificate authority may, in some embodiments, be trusted by computing devices that are provision by the organization but not necessarily trusted by devices that have not been provisioned by the organization. A private key associated with the root authority identified in the root certificate 716 may be used to digitally sign an intermediate certificate, and the subject public key included in the root certificate 716 may be used to cryptographically verify the authenticity of the digital signature generated over the intermediate certificate or to produce a chain of trust.

In various embodiments, issue/revoke certificates 720 refers to a software routine for issuing or revoking certificates. Digital certificates may be issued by the identity manager by digitally signing material—for example, a public key associated with a participant, using an account signing key. Certificates such as issued certificates 714A, 714B, and 714C may be issued using this routine. The issuance of certificates may be made by a privileged participant, such as a manager, or an entity that presents a bearer token that provides such capability.

Certificate authority 722 may refer to the component that issues certificates. A privacy manager (or just manager) has an asymmetric key for its own identity key (IK). A certificate issued from the certificate authority 722 to the manager using a special role "manager." This helps participants to differentiate between messages from the manager vs. other participants.

In various embodiments, the post-trust establishment state of a data consumer 706 is depicted in FIG. 7. The data consumer 706 may go through an enrollment process, for example, as described in connection with FIG. 6. In various embodiments, the data consumer 706 comprises the following architectural elements: authenticate entity 710; identity key (IK) 712B; issued certificate 714B; root certificate 716; and/or encryption key(s) 724.

Authenticate entity 710 may refer to software routine that a data producer is able to use to determine whether to authenticate another participant within the context of a CPS environment. Authenticity may refer to cryptographically verifiable assurances that a message was created by a party purporting to be the author of the message. Authenticity may be determined using, for example, root certificate 716 to determine whether cryptographic material is generated by an entity that has a certificate chain that has a root of trust that is trusted by the data producer. Authenticating an entity may be one part of cross-party trust establishment.

Identity key 712B may refer to an identity key (IK) that corresponds to issued certificate 714B. Issued certificate 714B may refer to a certificate issued to the data consumer 706 by one of the identity managers 704. In various embodiments, identity key 712B refers to the private key of this asymmetric key pair or may refer to the key pair itself. The private key of the asymmetric key pair is securely stored within the participant, and the issued certificate 714B may be shared with other entities to establish trust.

In various embodiments, the issued certificate 714B is signed by a certificate authority (e.g., using an account signing key or EA signing key) that encodes a public key associated with the identity key 712B. The issued certificate 714B may have a chain of trust to the root certificate 716 that can be cryptographically verified by other participants. The issued certificate 714B may be provided to other participants of the CPS environment to establish trust with data consumer 706.

Root certificate 716 may be a certificate that is self-issued by the certificate authority associated with the root certificate (e.g., by identity managers 704). For example, the Subject field and the Issuer field of the root certificate may refer to the same entity. In some embodiments, additional information is included in the certificate to indicate that a certificate is a root certificate. For example, a root certificate 716, in accordance with the X.509 v3 standard, may include a basicConstraints field that further includes a cA field being TRUE. In some embodiments, a computer system may be provisioned with one or more root certificates that are trusted. Additionally, a system administrator may provision a computer system to include additional trusted certificates, such as a root certificate that is issued by an organization's internal certificate authority. An organization's internal certificate authority may, in some embodiments, be trusted by computing devices that are provision by the organization but not necessarily trusted by devices that have not been provisioned by the organization. A private key associated with the root authority identified in the root certificate 716 may be used to digitally sign an intermediate certificate, and the subject public key included in the root certificate 716 may be used to cryptographically verify the authenticity of the digital signature generated over the intermediate certificate or to produce a chain of trust.

In various embodiments, encryption key(s) 724 refer to cryptographic key material within a CPS environment. The identity of the encryption key(s) in the CPS model is the identity of the participant to which the certificate is issued. This is achieved by signing the encryption key(s) using the identity key and using the encryption keys in any of the protocols thereafter.

In various embodiments, the post-trust establishment state of a policy manager 708 is depicted in FIG. 7. The policy manager 708 may go through an enrollment process, for example, as described in connection with FIG. 6. In various embodiments, the policy manager 708 comprises the following architectural elements: authenticate entity 710; identity key (IK) 712C; issued certificate 714C; root certificate 716; and/or assign privacy policy 726.

Authenticate entity 710 may refer to software routine that a data producer is able to use to determine whether to authenticate another participant within the context of a CPS environment. Authenticity may refer to cryptographically verifiable assurances that a message was created by a party purporting to be the author of the message. Authenticity may be determined using, for example, root certificate 716 to determine whether cryptographic material is generated by an entity that has a certificate chain that has a root of trust that is trusted by the data producer. Authenticating an entity may be one part of cross-party trust establishment.

Identity key 712C may refer to an identity key (IK) that corresponds to issued certificate 714C. Issued certificate 714C may refer to a certificate issued to the policy manager 708, by one of the identity managers 704. In some embodiments, the policy manager 708 and the identity manager 704 are implemented on the same device. In various embodiments, identity key 712C refers to the private key of this asymmetric key pair or may refer to the key pair itself. The private key of the asymmetric key pair is securely stored within the participant, and the issued certificate 714C may be shared with other entities to establish trust.

In various embodiments, the issued certificate 714C is signed by a certificate authority (e.g., using an account signing key or EA signing key) that encodes a public key associated with the identity key 712C. The issued certificate 714C may have a chain of trust to the root certificate 716 that can be cryptographically verified by other participants. The issued certificate 714C may be provided to other participants of the CPS environment to establish trust with the policy manager 708.

Root certificate 716 may be a certificate that is self-issued by the certificate authority associated with the root certificate (e.g., by identity managers 704). For example, the Subject field and the Issuer field of the root certificate may refer to the same entity. In some embodiments, additional information is included in the certificate to indicate that a certificate is a root certificate. For example, a root certificate 716, in accordance with the X.509 v3 standard may include a basicConstraints field that further includes a cA field being TRUE. In some embodiments, a computer system may be provisioned with one or more root certificates that are trusted. Additionally, a system administrator may provision a computer system to include additional trusted certificates, such as a root certificate that is issued by an organization's internal certificate authority. An organization's internal certificate authority may, in some embodiments, be trusted by computing devices that are provision by the organization but not necessarily trusted by device that have not been provisioned by the organization. A private key associated with the root authority identified in the root certificate 716 may be used to digitally sign an intermediate certificate, and the subject public key included in the root certificate 716 may be used to cryptographically verify the authenticity of the digital signature generated over the intermediate certificate or to produce a chain of trust.

In various embodiments, assign privacy policy 726 is a software module that is used to assign privacy policies such as privacy policy 718. In various embodiments, privacy manager 708 is responsible for managing the privacy policies that are used to describe the set of data consumers that are allowed to access content for a specific purpose for each data producer belonging to the actor. Trust across actors is established by trusting the root certificate 716 from the other actors. This trust is specified through privacy policies. For example, when actor A shares a specific data producer to actor B, the actor A will add the following to the privacy policy of the data producer device: Allow content access to data consumer having certificates issued from Certificate Authority B, which have the purpose/action "view video.". The data producer device will enumerate the data consumers having the purpose/action "view video" issued by Certificate Authority B to discover the processors and encrypt content to.

Figure 8:
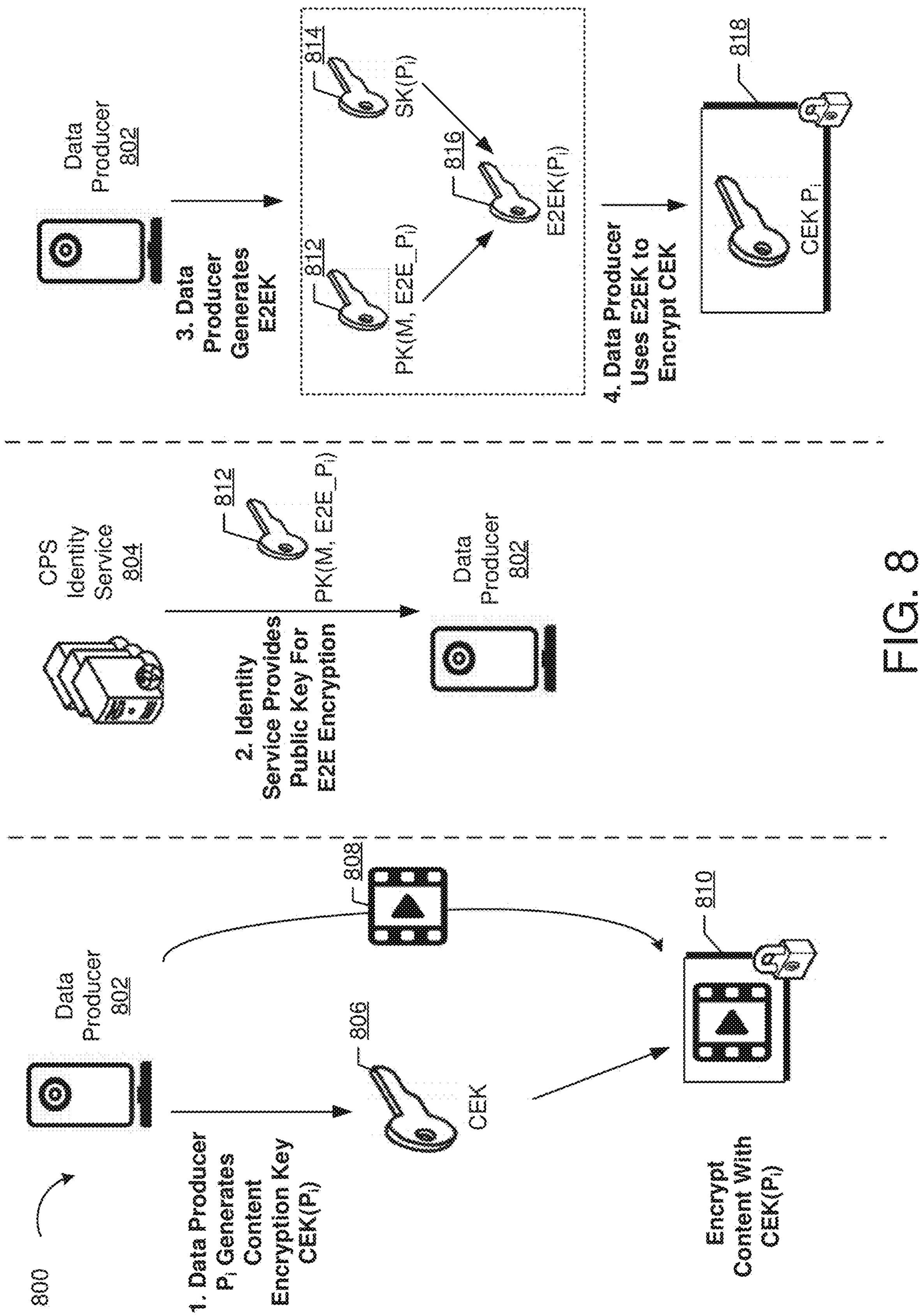
FIG. 8 illustrates a computing environment 800 depicting techniques for off-loading encryption operations with assurances of confidentiality, in accordance with one or more example embodiments of the present disclosure.

FIG. 8 illustrates a computing environment 800 depicting techniques for off-loading encryption operations with assurances of confidentiality, in accordance with one or more example embodiments of the present disclosure.

In various embodiments, FIG. 8 depicts an environment comprising a data producer 802, a content protection service (CPS) identity service 804, a content encryption key (CEK) 806, video content 808 generated by the data producer device, encrypted content 810, a public key 812, a private key 814, an end-to-end encryption key 816, and an encrypted content encryption key 818.

Data producer 802 may refer to a data producer in accordance with those described elsewhere in this disclosure, such as in connection with FIG. 2, FIG. 3, FIG. 4, FIG. 5, FIG. 6, and FIG. 7. Data producer 802 may be enrolled within a CPS environment by a manager entity or another manager app/device.

A CPS environment may have various different data producer devices, and for purposes of discussion, a specific data producer device Pi may be discussed in connection with FIG. 8. Continuing with FIG. 8, data producer 802 may utilize techniques described in connection with FIGS. 8-12 to offload encryption operations in a manner that still preserves end-to-end privacy assurances. Offloading encryption operations may be advantageous as data producer 802 may be a device with limited compute and/or memory capabilities that makes the performance of cryptographic operations expensive. Specifically, data producer 802 may have limited compute and memory capabilities that makes it challenging for data producer 802 to generate separate encrypted data streams for each data consumer that is authorized to access its data. Furthermore, encryption to each data consumer may involve computationally intensive cryptographic operations, such as cryptographic operations being performed using asymmetric keys, which is typically more compute-intensive than cryptographic operations performed using symmetric keys.

A manager may refer to a manager device or application. The manager may refer to a special participant in the CPS environment that has access to an account signing key (ASK) and may be responsible for enrollment and other management capabilities, such as policy management as well as the granting and revoking of access to various devices in the CPS environment. Content protection service (CPS) identity service 804 comprise one or more interfaces for providing identity and/or key discovery services. These can be implemented using the same service or discrete services, according to various embodiments. In various embodiments, a key discovery service (e.g., implemented in CPS identity service 804) is used to perform encryption key discovery for participants in a CPS environment. In various embodiments, an identity service (e.g., implemented in CPS identity service 804) is used to check the validity of various certificates (e.g., an X.509 certificate) to authenticate participants' identities.

In various embodiments, data producer 802 generates a content encryption key (CEK). The CEK 806 generated a participant Pi may be referred to as CEK Pi, CEK_Pi, CEK(Pi), or other variations thereof throughout this disclosure. The CEK may be a symmetric key that is randomly or pseudo-randomly generated by data producer 802 and kept secret except from permitted parties. Generally speaking, the CEK may be shared by data producer 802 with entities that are authorized to view the contents of the data produced by data producer 802.

Data content 808 refers to data that is generated or produced by data producer 802. For example, data producer 802 as a camera device may generate video content that can be viewed by various consumer devices online—for example, a service may be provided where a data consumer device or application can remotely access the data content 808 and see any activity detected by the data producer 802.

Encrypted content 808 refers to the result of an encryption process that occurs in which the content 808 is protected using CEK 806. Encrypted content 808 may also include authentication data that can be used by a repent to cryptographically verify the integrity of the encrypted content. CEK 806 may be a symmetric key, and a symmetric encryption operation may be performed on content 808 to produce encrypted content 810.

In various embodiments, CPS identity service 804 provides public key 812 to data producer. In various embodiments, the public key 812 is requested by data producer 802. The request may be submitted to any manager device with which data producer 802 has established a trust relationship. In various embodiments, a manager generates an asymmetric key pair that may be used solely for encrypting the content encryption key CEK Pi. The corresponding public key may be signed by the manager and provided to CPS identity service 804 to be made available for use by participants in a CPS environment. The asymmetric key pair may include a public key and private key, which may be expressed as PK(m, E2E_Pi) and SK(m, E2E_Pi) respectively. In various embodiments, this asymmetric key pair represents a relationship between a specific content owner & data producer pair—however, this relationship can also be one between a specific content owner and one or more privacy domains. The corresponding private key to public key 812 SK(m, E2E_Pi) may be retained by manager and may be later shared with data consumer devices that are authorized to access content 808. In some embodiments, this asymmetric key pair is implemented as ephemeral keys.

In various embodiments, data producer 802 receives public key 812. In various embodiments, the public key obtained from CPS identity service 804 is digitally signed, and data producer 802 performs a verification of the signature against a known root-of-trust to determine the authenticity and integrity of the public key prior to using it in the generation of end-to-end encryption key 816. Data producer 802 may possess a private key 814, which may be expressed as SK(Pi). Private key 814 may be key material that is known only to data producer 802 and not shared with other devices in the CPS environment. For example, data producer 802 may have a private and public key pair that is used as the identity of data producer 802 that may be used for this purpose.

In various embodiments, public key 812 and private key 814 are used to derive end-to-end encryption key 816. For example, end-to-end encryption key 816 may be generated using a Diffie Hellman key exchange protocol such as an Elliptic Curve Diffie Hellman (ECDH) key exchange. The end-to-end encryption key 816 produced by a data producer Pi may be expressed as E2EK(Pi). The end-to-end encryption key 816 may be used to encrypt the content encryption key 806, thereby producing an encrypted content encryption key 818 (ECEK).

In various embodiments, the E2EK used to wrap the CEK before offloading is different based, at least in part, on whether the content is to be made accessible to the offload point or not. In various embodiments, the E2EK used for cloud-based data consumers that are jointly controlled by the cloud privacy control point is different from the E2EK used by other participants. The reason for having a different E2EK for the cloud is that if the same E2EK is used to secure content to customer-owned devices, the cloud privacy control would have knowledge of the E2EK (by virtue of also being a data consumer) when the cloud access was provided and hence can decrypt the E2EK even for non-cloud access use cases. Accordingly, in various embodiments, the data producer generates distinct E2EKs when content is to be accessed by the cloud and other non-cloud entities.

Figure 9:
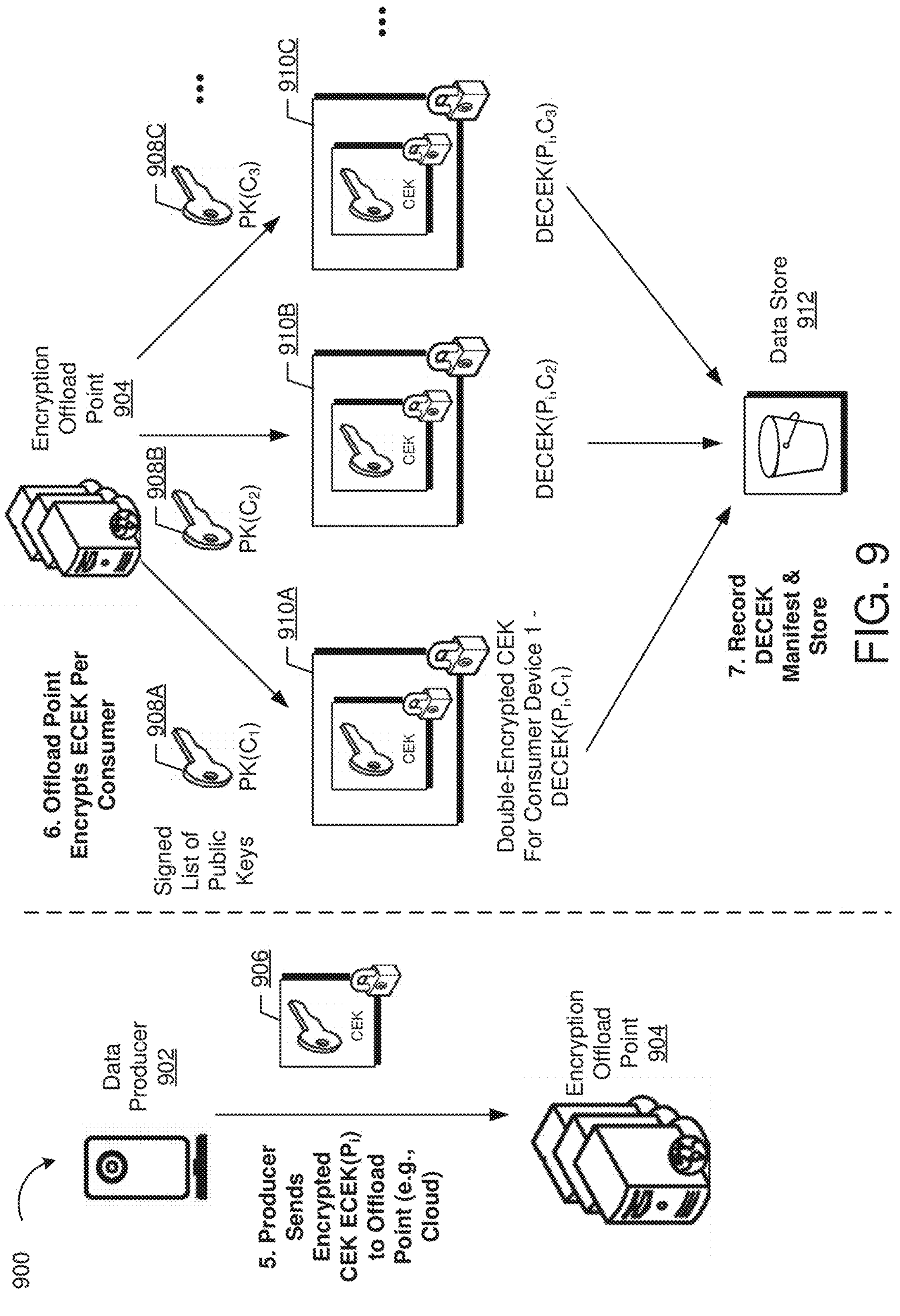
FIG. 9 illustrates a computing environment 900 depicting techniques for off-loading encryption operations with assurances of confidentiality, in accordance with one or more example embodiments of the present disclosure.

FIG. 9 illustrates a computing environment 900 depicting techniques for off-loading encryption operations with assurances of confidentiality, in accordance with one or more example embodiments of the present disclosure.

In various embodiments, FIG. 9 depicts an environment comprising a data producer 902, an encryption offload point 904, an encrypted content encryption key (ECEK) 906, public keys 908A-C, double-encrypted CEKs (DECEK) 910A-C, and data store 912.

Data producer 902 may refer to a data producer in accordance with those described elsewhere in this disclosure, such as in connection with FIG. 8. Data producer 902 may be enrolled within a CPS environment by manager or another manager app/device. A CPS environment may have various different data producer devices, and for purposes of discussion, a specific data producer device Pi may be discussed in connection with FIG. 9. Data producer 902 may be the same data producer Pi referenced in FIG. 8. Continuing with FIG. 9, data producer 802 may utilize techniques described in connection with FIGS. 8-12 to offload encryption operations in a manner that still preserves end-to-end privacy assurances.

In various embodiments, encryption offload point 904 refers to a computing entity that is accessible to data producer 902. The encryption offload point 904 may be a computing entity within the CPS environment or may be a cloud service such as a compute service. The encryption offload point may be considered a kind of data encryption point and can be different from the privacy control point. Encryption offload point 904 may be utilized by data producer 902 to offload encryption operations that would otherwise need to be performed locally on data producer 902. For example, the generation of double-encrypted CEKs 910A-C may be offloaded from data producer 902 to the encryption offload point 904. This may result in consideration reduction in the amount of compute power being used by data producer 902 while still ensuring end-to-end encryption with the various consumer devices C1, C2, C3, etc. Additionally, data producer 902 may be an Internet-of-Things (IoT) device or low energy device whose battery life may be considerably improved by encryption offloading techniques described herein. For example, rather than scaling out the number of encryption operations based on the number of authorized data consumer devices, the data contents and the CEK only need to be encrypted once on data producer 902, dramatically reducing the computational and cryptographic complexity on data producer 902. Further, the memory footprint of performing end-to-end encryption for multiple data consumers is considerably reduced, as the data producer 902 does not need to store cryptographic material for each data consumer in memory, thereby reducing the memory footprint of data producer 902, reducing memory paging, or other forms of memory optimization.

In various embodiments, the data producer 902 sends the encrypted CEK (e.g., generated according to FIG. 8) and sends the encrypted CEK to an encryption offload point 904. The encrypted CEK generated by data producer Pi may be denoted as ECEK(Pi). It should be noted that cryptographically verifiable assurance of confidentiality are preserved when ECEK(Pi) is provided to the encryption offload point 904 because encryption offload point lacks access to the cryptographic material utilized to generate the end-to-end encryption key E2EK(Pi) used to produce the ECEK. Namely, encryption offload endpoint 904 lacks access to SK(Pi), that is kept secret by the data producer.

Upon receipt of the ECEK(Pi), the encryption offload point 904 may generate a plurality of double-encrypted content encryption keys (DECEKs). In various embodiments, data producer 902 provides a list of data consumers and/or their public keys. For example, FIG. 9 illustrates an embodiment in which data consumers C1, C2, C3 . . . are authorized to access the content encrypted by the CEK. The encryption offload point 904 determines a first public key 908A, associated with the first data consumer C1, denoted as PK(C1); determines a second public key 908B, associated with the second data consumer C2, denoted as PK(C2); determines a third public key 908C associated with the third data consumer C3, denoted as PK(C3); and so on and so forth. In various embodiments, the list of authorized data consumers is determined based on privacy policies of the data producer 902. In various embodiments, the encryption offload point 904 obtains a list of signed public keys (e.g., public keys 908A-C) that are digitally signed by a manager entity associated with the content owner. Encryption offload point 904 may verify the authenticity and integrity of the signed list of public keys using a known root-of-trust.

Returning to FIG. 9, the encrypted CEK 906 is encrypted using a public key associated with an authorized data consumer to produce a double encrypted CEK (DECEK). For example, for a first data consumer C1, a double-encrypted CEK is generated by encrypting the ECEK 906 with the first public key 908A, thereby producing a first double-encrypted CEK 910A, which may be denoted as DECEK(Pi, C1). Likewise, for a second data consumer C2, a double-encrypted CEK is generated by encrypting the ECEK 906 with the second public key 908B, thereby producing a second double-encrypted CEK 910B, which may be denoted as DECEK(Pi, C2). Likewise, for a third data consumer C3, a double-encrypted CEK is generated by encrypting the ECEK 906 with the third public key 908C, thereby producing a third double-encrypted CEK 910C, which may be denoted as DECEK(Pi, CC). The resulting DECEKs may be stored as part of a manifest associated with the content protected by the CEK and persisted in a data store 912 to allow for subsequent retrieval by the data consumers.

The data store 912 may, for example, be a network accessible data storage system or data storage system. In various embodiments, a network locator or network address may be provided to the data producer 902 that can be used to retrieve the stored manifests.

Figure 10:
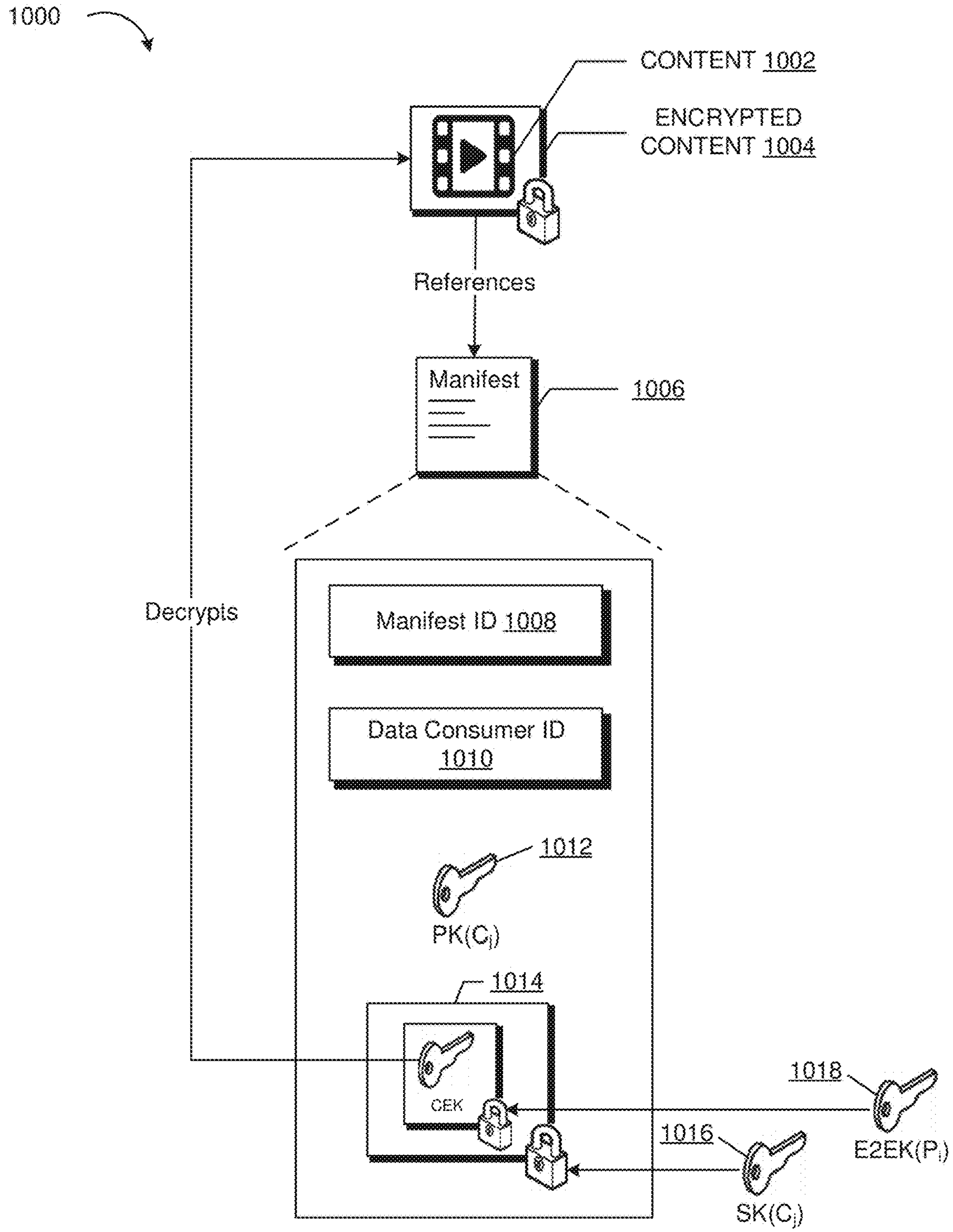
FIG. 10 illustrates a diagram 1000 of encrypted content and its corresponding manifest, in accordance with one or more example embodiments of the present disclosure.

FIG. 10 illustrates a diagram 1000 of encrypted content and its corresponding manifest, in accordance with one or more example embodiments of the present disclosure.

In various embodiments, content 1002 is encrypted using a content encryption key (CEK) to produce encrypted content 1004. The CEK may be a symmetric key, meaning that the CEK may also be used to decrypt the encrypted content 1004 to produce content 1002. The content may be encrypted by a data producer and include a reference to a manifest 1006, which is generated at least in part by an encryption offload site. The encrypted content may be stored with metadata that can be used to retrieve the corresponding manifest 1006. For example, the metadata may reference a network location where the manifest 1006 is stored by a data storage service.

Manifest 1006 may comprise one or more of the following data elements: manifest identifier 1008, data consumer identifier 1010, public key 1012, and double encrypted CEK (DECEK) 1014.

In various embodiments, the manifest identifier 1008 is an identifier that is used to specify a manifest. The metadata for an encrypted content 1004 may include metadata that references a manifest by the manifest identifier 1008.

In various embodiments, the data consumer identifier 1010 indicates an identifier associated with the data consumer to which the manifest is able to be decrypted by. For example, in connection with FIG. 9, the first DECEK is bound to the first data consumer C1 because it can be decrypted (first layer) using the private key corresponding to the public key of C1. When a data consumer requests access to a manifest, an authorization check may be performed to verify whether the requestor is the same data consumer as indicated in the manifest, or otherwise has sufficient rights to access such information (e.g., via a bearer token).

In various embodiments, a public key 1012 refers to the public key associated with the consumer that the outer envelope of the DECEK is encrypted to. In FIG. 10, the public key 1012 is expressed as PK(Cj) and may have been used to generate DECEK using techniques described in connection with FIG. 9.

Double-encrypted CEK (DECEK) 1014 may refer to a ciphertext that was first encrypted using an end-to-end encryption key and then encrypted using the public key 1012. Accordingly, it should be appreciated that the CEK may be accessible with two pieces of cryptographic material: the private key 1016 of the data consumer SK(Cj) and the end-to-end encryption key 1018 E2EK(Pi).

Figure 11:
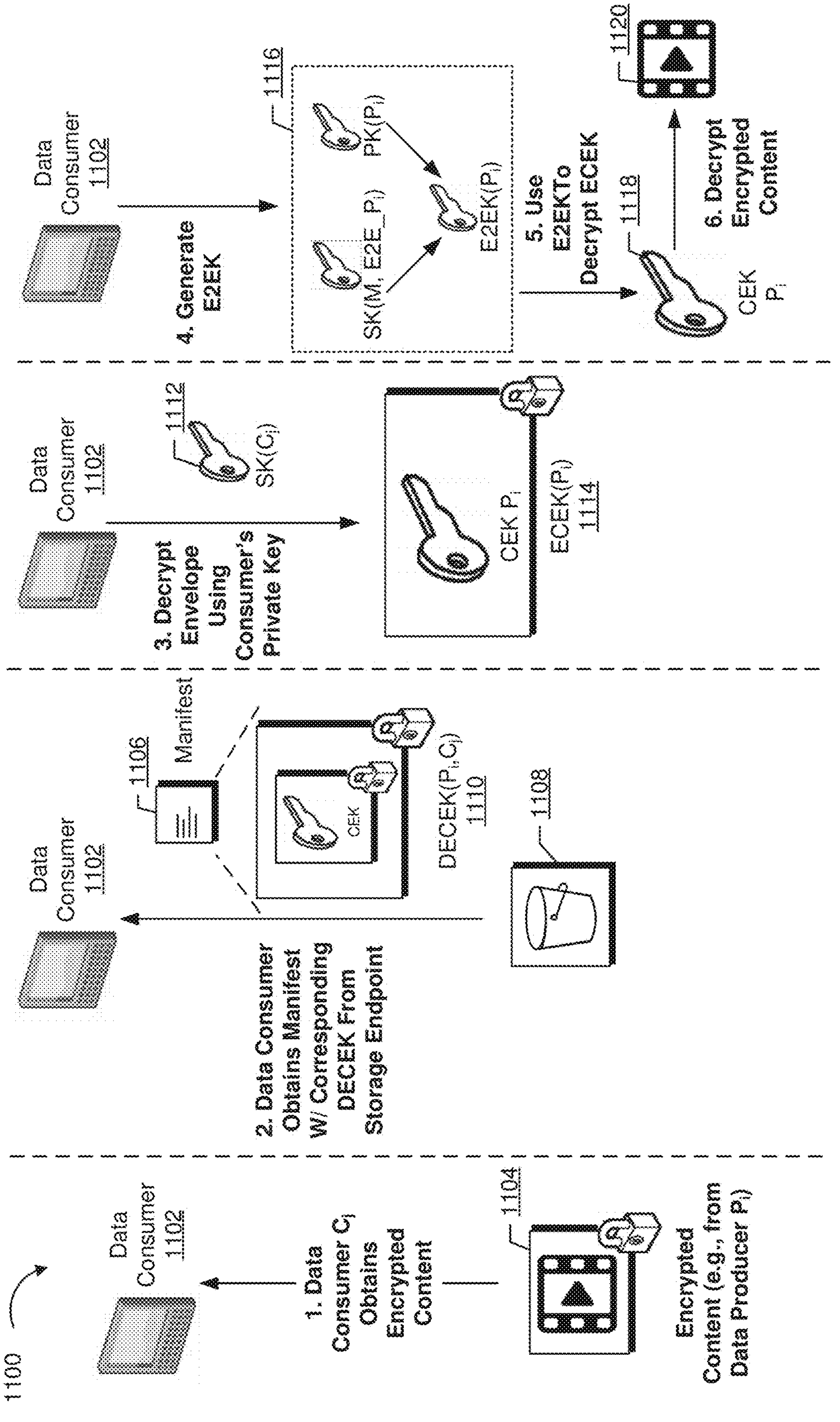
FIG. 11 illustrates a computing environment 1100 in which a data consumer gains access to a content encryption key, in accordance with one or more example embodiments of the present disclosure.

FIG. 11 illustrates a computing environment 1100 in which a data consumer gains access to a content encryption key, in accordance with one or more example embodiments of the present disclosure. In various embodiments, a content encryption key is used to encrypt content and/or decrypt encrypted content.

In various embodiments, FIG. 11 depicts an environment comprising a data consumer 1102, encrypted content 1104, manifest 1106, data store 1108, double-encrypted content encryption key 1110, private key 1112, encrypted content encryption key 1114, key generation 1116, content encryption key 1118, and content 1120.

Data consumer 1102 may refer to a data producer device that is enrolled in a CPS environment. The data consumer 1102 may have a root of trust that is established using a manager device/app of the CPS environment. In various embodiments, data consumer device may refer to a headed device, a headless device, multi-modal device, or other various device types that may consume various types of content that may be generated by data producers in a CPS environment.

In various embodiments, a data consumer may obtain encrypted content 1104. The data consumer may be one among several data consumers in a CPS environment and may be referred to as data consumer Cj. Likewise, the data producer that generated the underlying content may be one among several data producers and may be referred to as Pi.

In various embodiments, the encrypted a manager device/app allows for a customer to specify end-to-end encryption for data between data consumer Cj and data producer Pi. Accordingly, data producer Pi may generate content and encrypt the content to produce encrypted content 1104. The encrypted content may be generated using a content encryption key 1118 that is generated by the data producer and can be determined by data consumer 1102 using the techniques described herein. In various embodiments, the encrypted content 1104 is stored in a data store that is retrieved by the data consumer 1102. In some cases, encrypted content 1104 is provided as part of a real-time or near real-time data stream.

In various embodiments, the encrypted content 1104 comprises metadata that references manifest 1106. The manifest 1106 may be retrieved from a data store 1108, for example, as described in connection with FIG. 9. The manifest 1106 may be in accordance with those discussed in connection with FIG. 10. Manifest 1106 may be associated with data consumer Cj by virtue of the double-encrypted content encryption key 1110 being encrypted using the public key of data consumer 1102. This double-encrypted content-encryption key may be expressed as DECEK(Pi, Cj), indicating that the CEK is double-encrypted and that it was generated by data producer Pi and can be accessed by data consumer Cj.

Continuing with FIG. 11, data consumer 1102 may decrypt the outer envelope of the DECEK using the data consumer's private key 1112, which is expressed as SK(Cj). This may be the corresponding private key to the public key that was used by an encryption offload point to generate the DECEK included in manifest 1106. The resulting quantity is an encrypted content encryption key (ECEK) 1114 that may be expressed as ECEK(Pi), indicating that this content encryption key was used to encrypt content generated by data producer Pi.

In various embodiments, the data consumer 1102 may generate the end-to-end encryption key using key generation 1116. Key generation 1116 may refer to a part of a key exchange protocol such as an Elliptic Curve Diffie Hellman (ECDH) key exchange. Data consumer 1102 may obtain, from a manager device, a private key for assembling an end-to-end encryption key CEK(Pi). The private key may be expressed as SK(M, E2E_Pi). The private key may be obtained from the data manager according to techniques described in connection with FIG. 12. In various embodiments, data consumer 1102 submits a request to the manager device/app to gain access to SK(M, E2E_Pi). Additionally, the key generation 1116 may also involve the use of a public key PK(Pi) of the data producer that generated the content. These two quantities may be used to generate—for example, through an elliptic curve multiplication operation—the end-to-end encryption key, which is expressed as E2EK(Pi). This may refer to the same symmetric key that was used by data producer Pi to generate the encrypted CEK. Likewise, it may be used by data consumer 1102 to decrypt the ECEK 1114 and produce the plaintext content encryption key 1118. The content-encryption key 1118 may then be used to decrypt the encrypted content 1104 and thereby produce plaintext content 1120 which may be presented on the data consumer 1102, analyzed by a service provider to enable rich functionality, such as performing motion detection or monitoring of a video feed, and so on and so forth. This resulting protocol allows for data producer Pi to generate encrypted content for data consumer Cj (and other authorized data consumers) such that there are cryptographically verifiable assurances of authenticity, integrity, and confidentiality of the data. For example, encryption offload point may be used to offload the performance of some operations from the data producer device, but is done so in a manner that does not violate the end-to-end confidentiality assurances as the cryptographic properties of the protocol still ensure that the contents produced by data producer Pi are not readable by the encryption offload point or any other entities involved in the protocol between the data producer and the data consumer.

Figure 12:
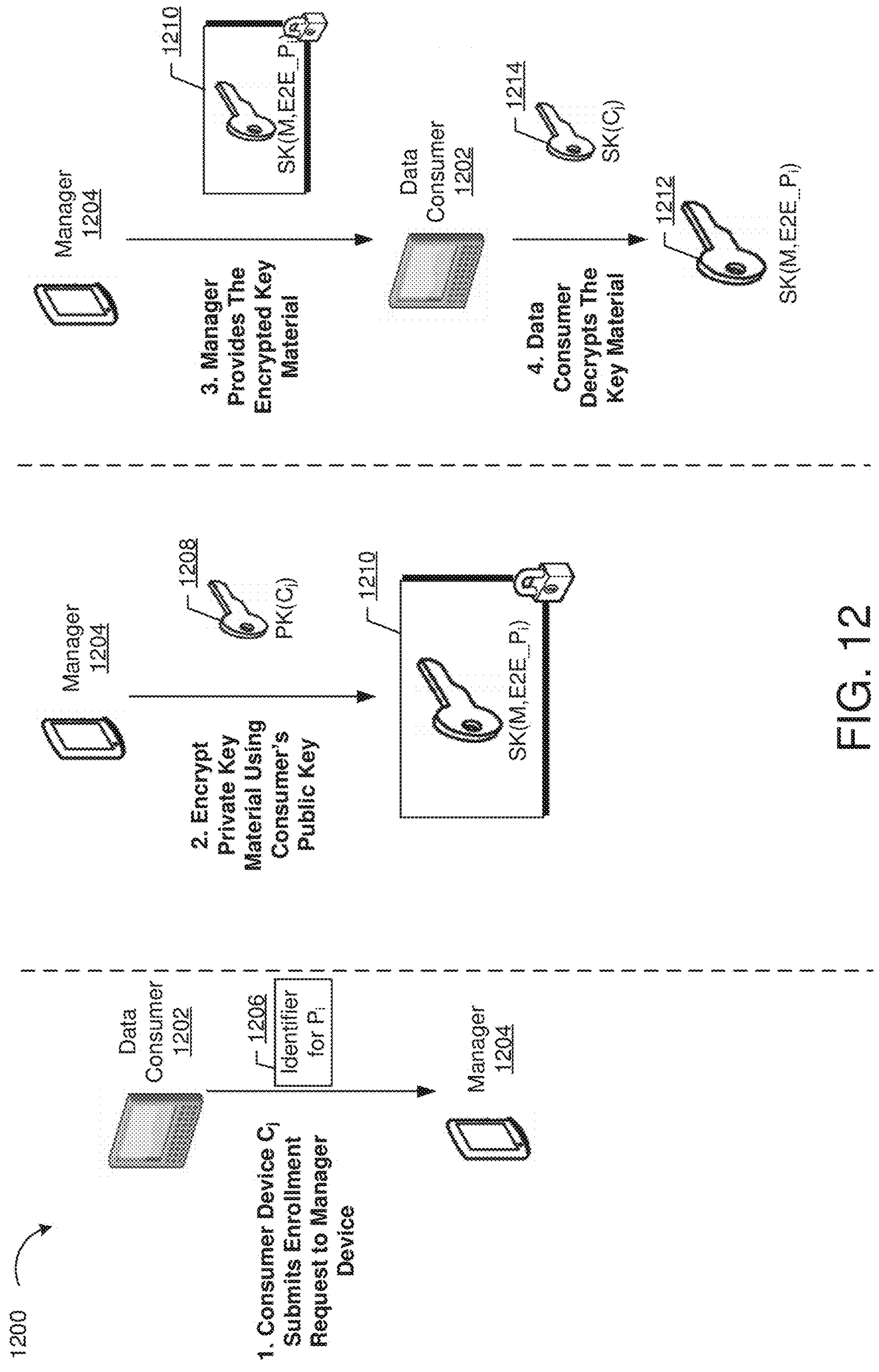
FIG. 12 illustrates a computing environment 1200 in which a data consumer gains access to a content encryption key, in accordance with one or more example embodiments of the present disclosure.

FIG. 12 illustrates a computing environment 1200 in which a data consumer gains access to a content encryption key, in accordance with one or more example embodiments of the present disclosure. In various embodiments, a content encryption key is used to encrypt content and/or decrypt encrypted content.

In various embodiments, FIG. 12 depicts an environment comprising a data consumer 1202, a manager 1204, identifier 1206, public key 1208, encrypted private key material 1212, private key material 1214, and data consumer private key 1216.

Data consumer 1202 may refer to a data consumer device that is enrolled in a CPS environment. The data consumer 1202 may have a root of trust that is established using a manager device/app of the CPS environment. In various embodiments, data consumer device may refer to a headed device, a headless device, multi-modal device, or other various device types that may consume various types of content that may be generated by data producers in a CPS environment.

Manager 1204 may refer to a manager device or application. The manager 1204 may refer to a special participant in the CPS environment that has access to an account signing key (ASK) and may be responsible for enrollment and other management capabilities, such as policy management as well as the granting and revoking of access to various devices in the CPS environment.

In various embodiments, data consumer 1202 submits an enrollment request to manager 1204. The enrollment request may be made in connection with an end-to-end encryption flow in which data consumer 1202 is ready to consume content from a data producer. The data may be encrypted using a content encryption key (CEK). The enrollment request may be made in the context of FIG. 11 for the data consumer to obtain key material usable to determine E2EK (Pi).

Returning to FIG. 12, manager 1204 may receive the enrollment request and perform one or more authorization and/or authentication checks. Authentication may be performed to authenticate the identity of consumer 1202 as the requestor is genuine.

In various embodiments, manager 1204 performs or has a policy control system perform on its behalf authorization and/or authentication operations. The access control policies can be specified by the content owner, content consumer. In various embodiments, platform-level access control policies may also be evaluated. For example, a platform-level access control policy may involve checking whether data consumer device 1202 has a security patch or version information that indicates that the data consumer 1202 is in a safe state. It may be the case that certain older, unpatched devices may become vulnerable to malware or viruses, and enrollment requests may be denied so that such devices will not be able to gain access to encrypted data that would otherwise be permitted based solely on the device's policies.

If the privacy controls indicate that access should be permitted, manager 1204 may determine the corresponding private key to the public key for end-to-end encryption that was provided to data producer Pi, for example, as described in connection with FIG. 8. This private key may be expressed as SK(M, E2E_Pi) and may be the corresponding private key to the public key that was used to determine the end-to-end encryption key E2EK(Pi) that the data producer used to encrypt the content encryption key used to protect content that the data consumer is authorized to consume. Manager 1204 may encrypt the private key material using the data consumer's public key, which may be expressed as PK(Cj), thereby producing encrypted private key material 1212.

In various embodiments, manager 1204 provides encrypted private key material 1212 to data consumer 1202. By virtue of having the corresponding private key SK(Cj) 1216, data consumer 1202 may decrypt encrypted private key material 1212 to determine plaintext private key material 1214. In various embodiments, this private key material 1214 may be used by data consumer 1202 to determine the end-to-end encryption key described in connection with FIG. 11. Private key material 1214 may refer to the derivation parameters of a Diffie Hellman (DH) key exchange protocol that is used to establish a shared secret.

Figure 13:
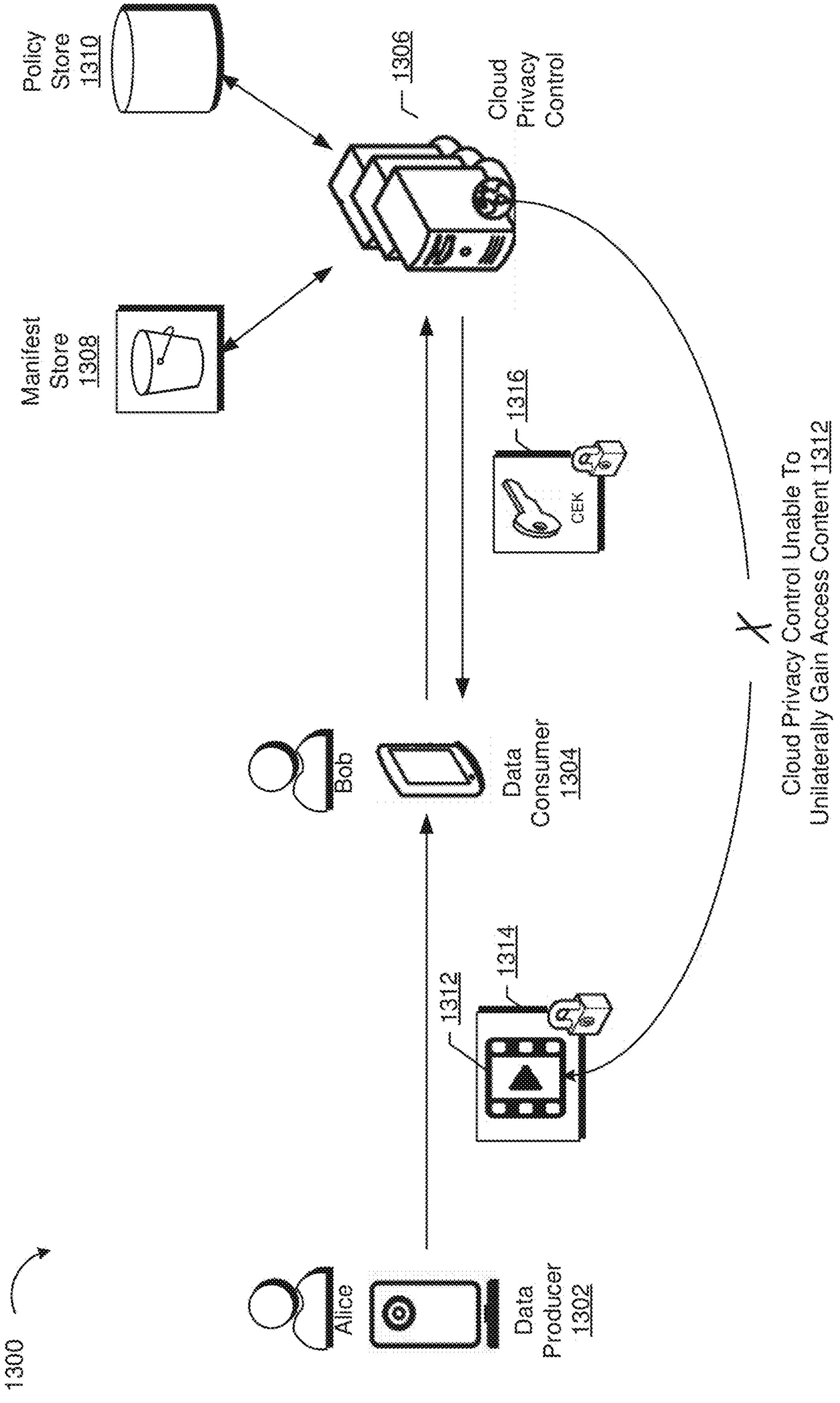
FIG. 13 illustrates a computing environment 1300 in which cloud privacy controls for content protection service (CPS) may be implemented, in accordance with one or more example embodiments of the present disclosure.

FIG. 13 illustrates a computing environment 1300 in which cloud privacy controls for content protection service (CPS) may be implemented, in accordance with one or more example embodiments of the present disclosure.

In various embodiments, FIG. 13 depicts an environment comprising a data consumer 1302 associated with a first user, a data consumer 1304 associated with a second user, a cloud privacy control 1306, manifest store 1308, policy store 1310, content 1312, encrypted content 1314, and encrypted content encryption key 1316.

In various embodiments, data producer 1302 refers to a device of a first user, which is represented as "Alice" in FIG. 13. The data producer device may generate data or content, such as video data in the case of a home security camera or other types of data producer devices. Data producer 1302 may provide or otherwise make its content available to other devices, which may be referred to as data consumers. It is noted that some devices may be both consumers and producers, and the designation of devices as data producers or data consumers may be in reference to the device's role in a specific flow and may change in the context of other flows.

In various embodiments, data consumer 1304 refers to a device of a second user, which is represented as "Bob" in FIG. 13. The data consumer device may be a device that is attempting to access content produced by data producer 1302.

For example, Alice may be a first user with a data producer device (e.g., home security camera), and Alice may wish to share a video feed from the device with Bob's data consumer (e.g., mobile phone device or app). Furthermore, for privacy, Alice may wish for her data to be shared with Bob confidentially, such that other entities—for example, cloud privacy control 1306—are not able to access the data unless specifically granted such permissions by Alice. In such embodiments, end-to-end encryption techniques may be considered as a mechanism for ensuring that other entities are not able to eavesdrop on the content being shared between data producer and data consumer. However, in such cases, the data producer may be forced to act as the privacy policy enforcer and ensure that all privacy controls are correctly implemented and enforced. The implementation and enforcement of privacy control systems is challenging, and may furthermore involve added compute, memory, and power demands on the data producer device, which may be an Internet-of-Things (IoT) device or a low power/compute/energy device.

Techniques described in connection with FIG. 13 may be implemented to allow for the use of a third-party cloud privacy control 1306 to perform privacy policy enforcement on behalf of content owners and restrict access to content to authorized participants, while also preserving assurances of confidentiality with respect to the content. Accordingly, assurances of end-to-end data privacy between data producer 1302 and data consumer 1304 with regard to content 1312 are preserved in a cryptographically verifiable manner.

Cloud Privacy Control (CPC) 1306 refers to a service that may be provided to customers of CPS environments such as Alice and Bob, depicted in FIG. 13. The purpose of CPC 1306 is to act as a privacy policy enforcer, applying access control policy on behalf of the content owners and restricting access to content encryption keys only to approved consumer participants irrespective of the privacy domain they belong to. The CPC 1306 may have access to manifest store 1308, which includes manifests for encrypted content such as encrypted content 1314. The manifest may comprise cryptographically protected content encryption keys. A content encryption key may refer to cryptographic material that is usable to decrypt the encrypted content 1314 and produce the plaintext content 1312. The CPC 1306 may have access to a policy store 1310 that stores security policies that define when and how access to content should be facilitated (e.g., control cross-domain access of data). In various embodiments, the CPC 1306 has its own encryption key (CPC-EK), similar to other privacy domains. The CPC 1306 may furthermore have its own well-known identity (CPC-IK), using which it attests its CPC-EK. The CPC-IK may be used to attest to participants of its role as a privacy control agent. Participants using the CPC-EK can verify it belongs to the CPC 1306 by verifying against the CPC-IK.

It should be noted that CPC 1306 has access to cryptographically protected content encryption keys (CEKs) in various embodiments and is furthermore lacks sufficient cryptographic material to determine the plaintext CEKs. In effect, this means that while CPC 1306 is able to control access to the encrypted contents (e.g., by either providing or withholding encrypted content encryption key 1316 from data consumer 1304), the CPC 1306 itself is not able to access content 1312 and assurances of end-to-end privacy between data consumer 1302 and data consumer 1304 are preserved.

In various embodiments, CPC 1306 has access to a double-encrypted content-encryption key, wherein the outer layer of encryption can be decrypted using a key that the CPC 1306 has access to. However, decryption of the outer layer is insufficient to ascertain the plaintext CEK—the inner layer of encryption may be protected using a key that is accessible only the privacy domains or devices that are authorized to access the underlying contents.

The policy store 1310 may be used to store privacy policies. Privacy policies may refer to information that users describe how data can be accessed. A user can pick some content source—a specific content, content from a specific device such as a camera product, it can be an aggregation of multiple such information, and so on and so forth. The user may then identify some content source and the policy may be applied to, for example, grant access to a specific piece of content through a set of rules to another principal/user in another privacy domain.

Figure 14:
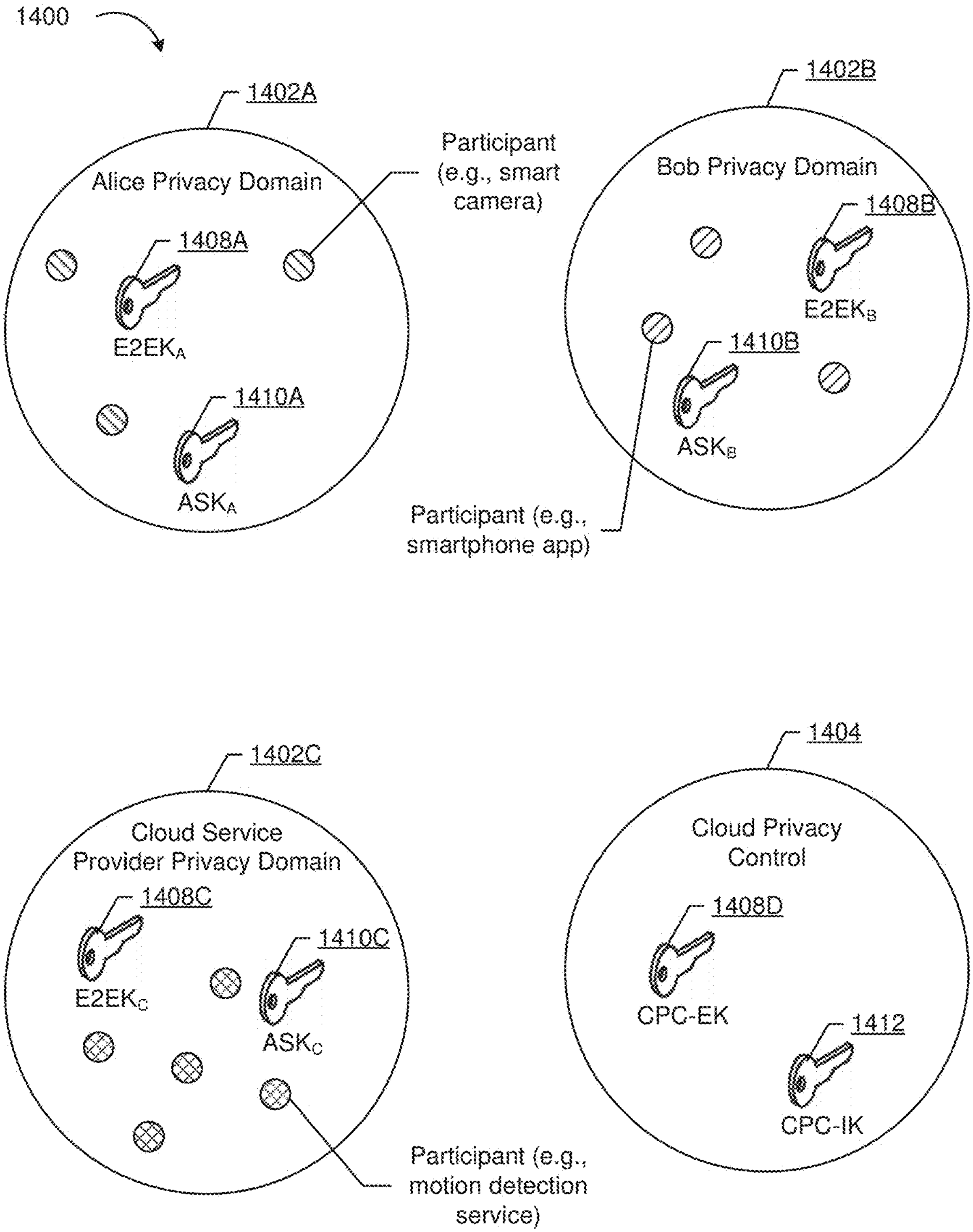
FIG. 14 illustrates a diagram 1400 depicting privacy domains and cloud privacy control, in accordance with one or more example embodiments of the present disclosure.

FIG. 14 illustrates a diagram 1400 depicting privacy domains and cloud privacy control, in accordance with one or more example embodiments of the present disclosure. In various embodiments, a content encryption key is used to encrypt content and/or decrypt encrypted content.

In various embodiments, FIG. 14 depicts an environment comprising a first privacy domain 1402A, a second privacy domain 1402B, and a third privacy domain 1402C. FIG. 14 further depicts a cloud privacy control 1404. FIG. 14 also depicts privacy domain keys 1408A-1408C, which may be expressed as E2EK_A, E2EK_B, E2EK_C, and so on and so forth, as there may be other privacy domains beyond those depicted in FIG. 14. Further, privacy domains such as privacy domains 1402A-C may have corresponding account signing keys (ASKs) 1410A-C, which may be expressed as ASK_A, ASK_B, ASK_C, and so on and so forth for the corresponding privacy domains. In addition to the privacy domain encryption keys, there may also be a CPC encryption key 1408D, which is expressed as CPC-EK. Further, cloud privacy control 1404 may have a cloud privacy control identity key 1412, which may be expressed as CPC-IK.

Each Account Signing Key (ASK) acts as a root-of-trust issuing identity to the participants belonging to the privacy domain of the ASK. In FIG. 14, each privacy domain has its own ASK. The ASK—similar to issuing identity to the participants, issues identity to the E2EKs as well. This helps the producer to validate the E2EK of the privacy domains it needs to make the content accessible to.

FIG. 14 depicts a conceptual diagram of privacy domains 1402A-C and cloud privacy control 1404 that may be used to facilitate cross-domain privacy controls while simultaneously preserving end-to-end data privacy assurances. In FIG. 14, the small, patterned circles within the respective privacy domains represent participant devices within the privacy domain. For example, for a first privacy domain 1402A belonging to Alice, there may be a data producer device such as a smart camera. Alice may wish to grant access to content within her privacy domain to other privacy domains for a variety of reasons. For example, Bob may be an associate or have various legitimate reasons for needing access to content generated by Alice's device. The first privacy domain 1402A, represents Alice's participant devices/apps, the second privacy domain 1402B, represents Bob's participant devices/apps, and the third privacy domain 1402C represents a cloud service provider's participant devices/services. Cloud privacy control 1404 refers to a CPS cloud service that enforces access control policies for privacy domains, according to at least one embodiment of the present disclosure. Each of these participants will be issued an identity. For example, in privacy domain 1402A, Alice has an account signing key 1410A, which can be used to generate digital certificates and other identity-related information that can be used to determine whether a participant is in Alice's privacy domain, whether content was generated by such devices, and so on and so forth. Bob, likewise, has an account signing key 1410B, with which identity is issued to each of the participants in his privacy domain 1402B. The same may be true for each privacy domain. In various embodiments, data producer behavior can be customized to generate fewer or greater numbers of E2EKs and corresponding encrypted CEKs. As one example, a data producer could generate an E2EK per device. As a second example, to reduce the amount of computational overhead in E2E communications, an E2EK can be generated for each privacy domain. This is in accordance with FIG. 14, which depicts a first E2EK for participants in Alice's privacy domain 1402A, a second E2EK for participants in Bob's privacy domain 1402B, and a third E2EK for cloud service provider privacy domain 1402C.

In various embodiments, an E2EK can be shared across privacy domains but not with the entity that performs cloud privacy controls. For example, if cloud service provider domain 1402C performs cloud privacy controls, a first E2EK may be generated, used to produce an encrypted CEK, and shared between participants in Alice's privacy domain and participants in Bob's privacy domain and a second E2EK may be generated, used to produce an encrypted CEK, and used solely or exclusively by cloud service provider's privacy domain 1402C. The use of a separate E2EK to encrypt content for the cloud privacy control is to ensure that the cloud privacy control is not able to unilaterally access the plaintext CEK when an external key vault is used in conjunction with the cloud privacy controls.

Cloud privacy control 1404 may be in communication with various privacy domains and implement a rich set of access control mechanisms, including and not limited to cross-PD access controls. When Alice desires to share data content with Bob, Alice is not aware of Bob's PD environment, such as the universe of devices that belong to Bob. However, Bob should be able to control the data that Alice is sharing and Bob will ensure Alice's privacy by making the data only available on his smartphone app and not, for example, other devices in his privacy domain.

Similarly, when Alice is granting access to a cloud service provider—for example, to perform various machine-learning services or rich functionality, the cloud service is able to determine that the content Alice providers (e.g., from her smart camera) only needs to be accessed by specific services offered by the service provider and not others. Data minimization may be implemented within the consumers' privacy domains to avoid proliferating or increasing the surface area of data accessibility, which can result in more exposure.

Additionally, access control policies can be utilized to restrict or otherwise limit how data is accessible. For example, Alice may be able to specify a temporal restriction that Bob will be able to access video feed of her smart camera only between 6 and 9 pm (e.g., Bob is babysitting for Alice while she is out). In contrast, this type of access control would not be achieved through a naive implementation of end-to-end encryption because the data consumer would have full access to any encrypted data by virtue of having the content encryption key used to protect the producer's content.

In a naive implementations, data producers may simply encrypt content to all participants. This means that the content is encrypted and the participants can access the content if it has the key. The assumption is that anyone with the key is allowed to access the data. In that case, there is no fine grained control. Because the content is all encrypted, and any of Bob's devices can decrypt the content. There may also be a need for a mechanism that enforces which consumers can access the content and which ones cannot.

Accordingly, it should be appreciated that one challenge with this approach relates to how data access to participants can be limited. This may be solved by applying various techniques described herein that involve going through an access control mechanism (e.g., CPC 1404) where access to content is provided only when the access control system has approved that they have access to the content and not otherwise. Another goal for the CPC 1404 may be to preserve end-to-end data privacy wherein the access control system itself should not be able to have access to the data that is more than the customer has granted it access to see. For example, in the context of FIG. 14, Alice may wish to share content with Bob such that CPC 1404 is used to implement the access control system but is also not able to unilaterally grant data access to participants in an unrelated privacy domain (e.g., privacy domain 1402C) without Alice's permission.

In various embodiments, each privacy domain has an encryption key that is shared among the participants in the domain. As an example, all of Alice's devices have access to a privacy domain encryption key (E2EK_A 1408A). Similarly, the cloud privacy control has its own encryption key CPC-EK 1408D.

Continuing, a privacy policy may be stated by Alice. The privacy policy may indicate that Alice wishes for end-to-end encryption to be enabled and protect data produced to only to her own devices. Another example privacy policy is for Alice to be able to grant access to Bob's privacy domain. Alice may not have a full understanding of the participants in Bob's privacy domain as there's a privacy boundary. Alice is sharing her data with Bob and then it is Bob's responsibility to protect that trust and that Alice's privacy is protected. Similarly, when Alice shares data with a cloud service provider, she doesn't know the intricacies of the service or how to make such assertions. In various embodiments, Alice is able to provide general access grants to Bob's privacy domain, while in other embodiments, Alice can specify that a specific device in Bob's domain should be granted access. The data minimization strategy may be applied by Alice, Bob, or both.

Figure 15:
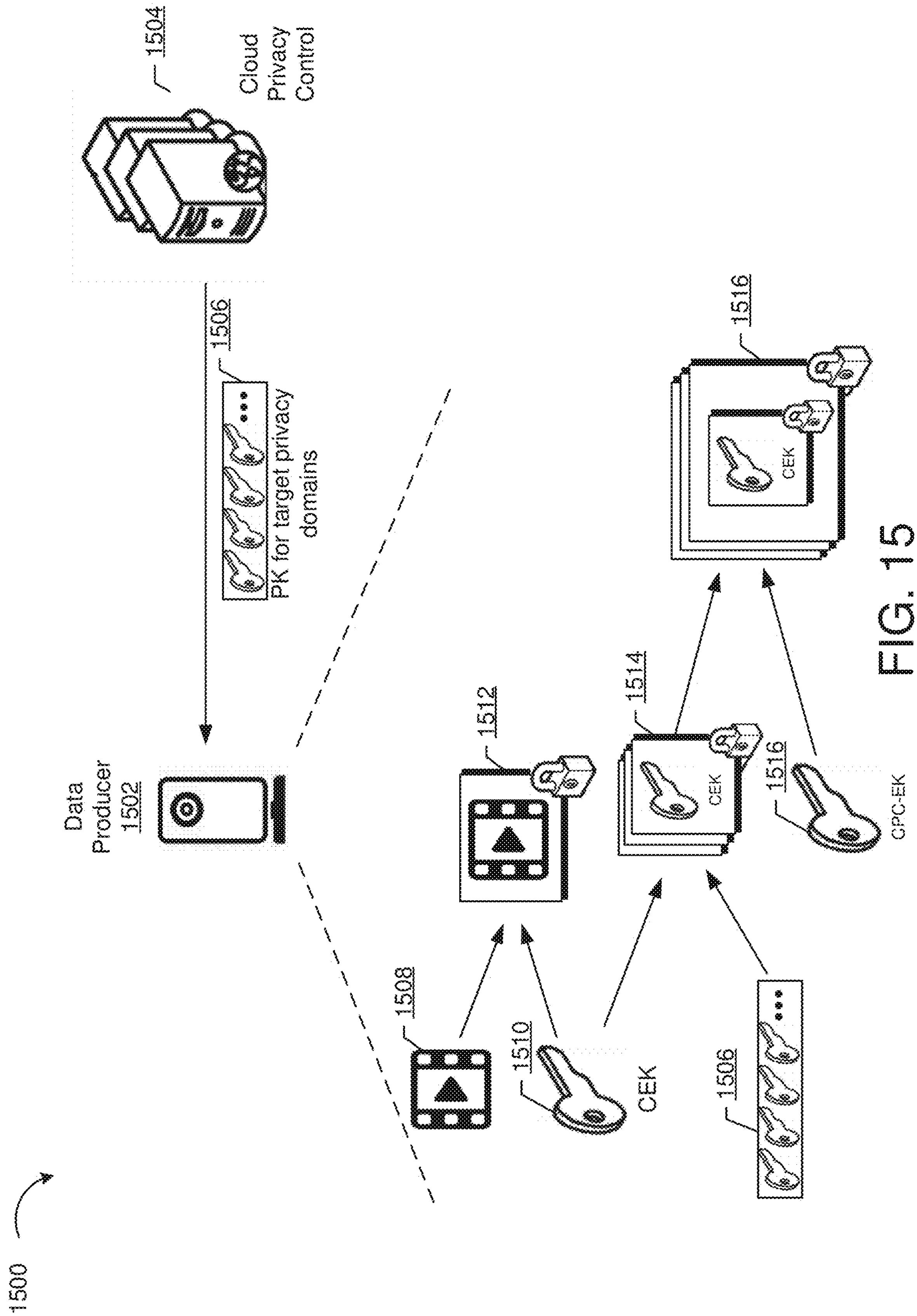
FIG. 15 illustrates a diagram 1500 depicting protection of key material in a cloud privacy control environment, in accordance with one or more example embodiments of the present disclosure.

FIG. 15 illustrates a diagram 1500 depicting protection of key material in a cloud privacy control environment, in accordance with one or more example embodiments of the present disclosure. In various embodiments, a content encryption key is used to encrypt content and/or decrypt encrypted content.

In various embodiments, data producer 1502 refers to a device of a user. The data producer device may generate data or content, such as video data, in the case of a home security camera or other types of data producer devices. Data producer 1502 may provide or otherwise make its content available to other devices, which may be referred to as data consumers. It is noted that some devices may be both consumers and producers and the designation of devices as data producers or data consumers may be in reference to the device's role in a specific flow and may change in the context of other flows.

Cloud privacy control 1504 may be implemented in accordance with those described elsewhere in this disclosure, such as in connection with FIG. 13 and FIG. 14. Data producer 1502 may request from cloud privacy control a list 1506 of public keys that are associated with privacy domains or even specific devices that should have access to content (e.g., content 1508) generated by data producer 1502. The list 1506 of PKs may refer to a list of public keys that are associated with the privacy domains which are authorized to access the content 1508. The list 1506 may be digitally signed by a manager device and data producer 1502 is able to validate the authenticity and integrity of any approved list of consumers that is provided by the cloud privacy control 1504 or any other entity.

When data producer 1502 generate content 1508, the content may be encrypted using a content encryption key 1510. The CEK may be used to protect content generated by data producer 1502 and to ensure that only authorized participants can access the contents. The resulting ciphertext may be referred to as encrypted content 1512. The encrypted content 1512 may be provided to a data consumer or securely stored for later retrieval. The encrypted content may have metadata that can be used to access a corresponding manifest.

Data producer 1502 may take the list of keys and generate encrypted version of the CEK 1510. For example, a first public key of the list 1506 may be used to generate a first encrypted CEK of the encrypted CEKs 1514, and a second public key of the list 1506 may be used to generate a second encrypted CEK of the encrypted CEKs 1514. In various embodiments, the encrypted CEKs are encrypted using end-to-end encryption keys (E2EKs) that are generated according to techniques described in connection with FIG. 8. The encrypted CEKs 1514 may each be encrypted using a CPC-EK by the CPC-EK 1516. CPC-EK 1516 may refer to a public key of an asymmetric key pair wherein the private key is a secret quantity that is known by CPC 1504. As a result of these operations, double-encrypted CEKs 1516 may be generated, one double-encrypted CEK for each key in the list of keys 1506. A key may be shared among multiple privacy domains, multiple devices, or combinations thereof. In various embodiments, any data consumers in the list that are also jointly owned by the cloud privacy control will have their own dedicated E2EK that is not shared with data consumers controlled by other entities.

Figure 16:
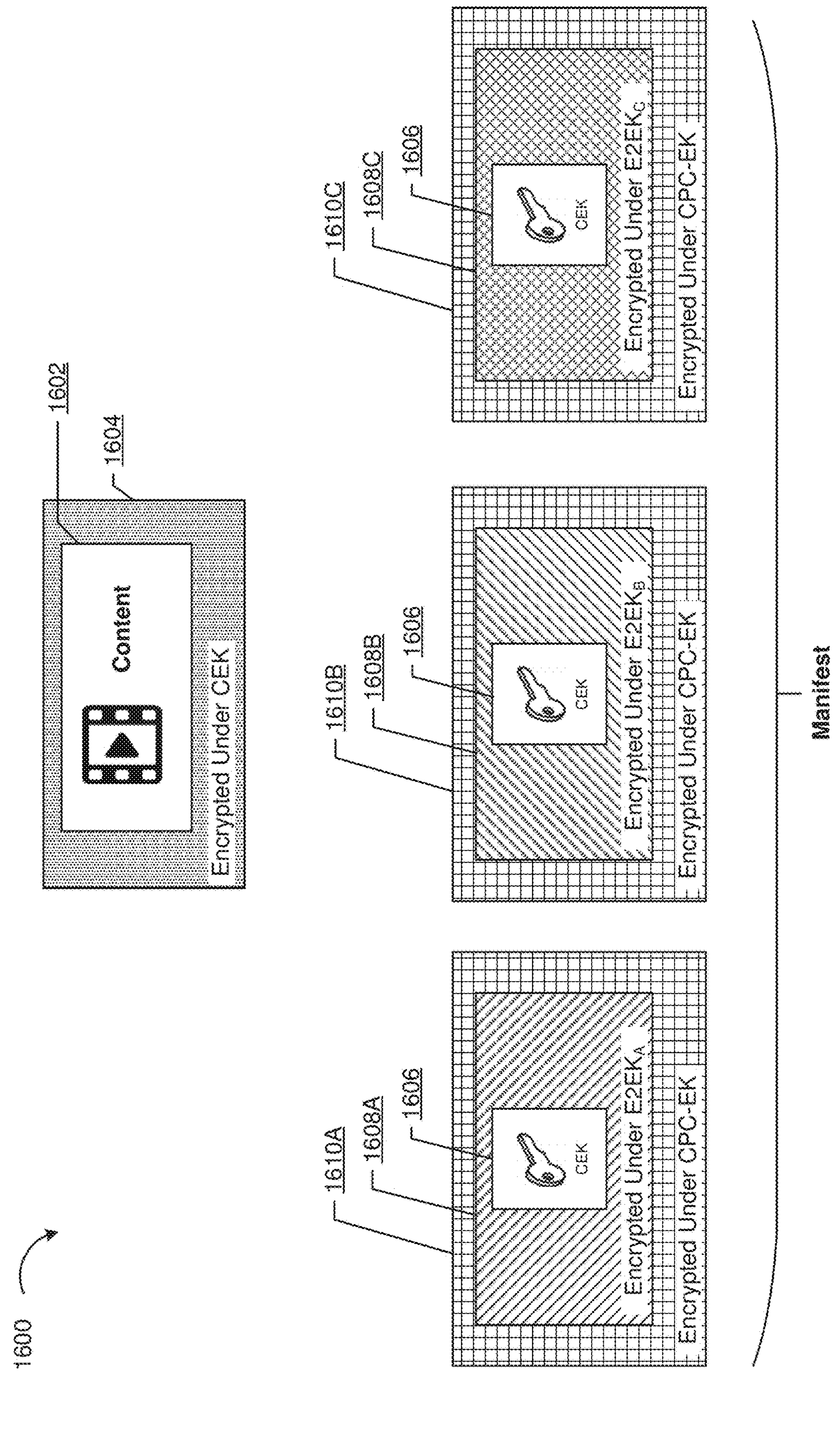
FIG. 16 illustrates a diagram 1600 depicting techniques for protecting a content encryption key (CEK) in a cloud privacy control environment, in accordance with one or more example embodiments of the present disclosure.

FIG. 16 illustrates a diagram 1600 depicting techniques for protecting a content encryption key (CEK) in a cloud privacy control environment, in accordance with one or more example embodiments of the present disclosure. In various embodiments, a content encryption key is used to encrypt content and/or decrypt encrypted content.

FIG. 16 depicts content 1602, encrypted content 1604, and content encryption key 1606, that may be implemented in various embodiments. Content 1602 may refer to data generated by a data producer, such as a video feed from a home security camera. The content 1602 may be encrypted using a content encryption key 1606, thereby producing encrypted content 1604. The CEK may be a symmetric key, meaning that the encrypted content 1604 can be decrypted by an entity possessing the CEK. Encrypted content 1604 may be stored in association with a manifest. Example manifests are depicted in FIG. 16, which may be associated with different privacy domains A, B, and C, respectively. Privacy policies may specify that these entities should be able to access the CEK. Furthermore, the data producer may also specify that the content 1604 should be kept private from the CPC, either through an express denial or the absence of an affirmative grant of permission.

Manifests may be generated for the content. A manifest for a first privacy domain "A" may include a double-encrypted CEK 1610A. The CEK may be encrypted by a first end-to-end encryption key E2EK_A, producing a single-encrypted CEK 1608A, and the single-encrypted CEK 1608A may then encrypted using a public key of the CPC, producing a double-encrypted CEK 1610A.

The CEK may be encrypted by a second end-to-end encryption key E2EK_B, producing a single-encrypted CEK 1608B, and the single-encrypted CEK 1608B may then encrypted using a public key of the CPC, producing a double-encrypted CEK 1610B.

The CEK may be encrypted by a third end-to-end encryption key E2EK_C, producing a single-encrypted CEK 1608C, and the single-encrypted CEK 1608C may then encrypted using a public key of the CPC, producing a double-encrypted CEK 1610C.

Manifests with the double-encrypted CEKs 1610A-C and/or encrypted content 1604 may be accessible by a cloud privacy control. It is noted that the CPC, in various embodiments, possesses a private key that can be used to decrypt the outer envelope of the double-encrypted CEKs 1610A-C. However, the CPC does not have access to the privacy domain private keys and would not be able to determine the plaintext CEK from the single-encrypted CEKs 1608A-C that it would be able to determine from the double-encrypted CEKs 1610A-C.

In various embodiments, a data producer follows the following sequence of steps:

First, the data producer encrypts the content using a randomly generated CEK. Next, the data producer retrieves the public key for each target privacy domains to grant access to the content. Next, the data producer validates the PD-EK using the well-known or securely discovered ASK root certificates. Next, the data producer encrypts the CEK once to E2EKs for each privacy domain. At this point, an example encrypted CEKs (ECEK) is expressed as:

$$ECEK-Alice := \text{Cipher}(\{CEK\}, Alice-E2EK)$$

Next, to opt-in for the cloud privacy control, the data producer will now encrypt the above ECEK to the CPC-EK. The following are the details that will be made available in the manifest and may be expressed as:

$$DECEK-Alice := \text{Cipher}(ECEK-Alice, CPC-EK \cdot \text{public\_key})$$

This process may be repeated for each authorized privacy domain.

Figure 17:
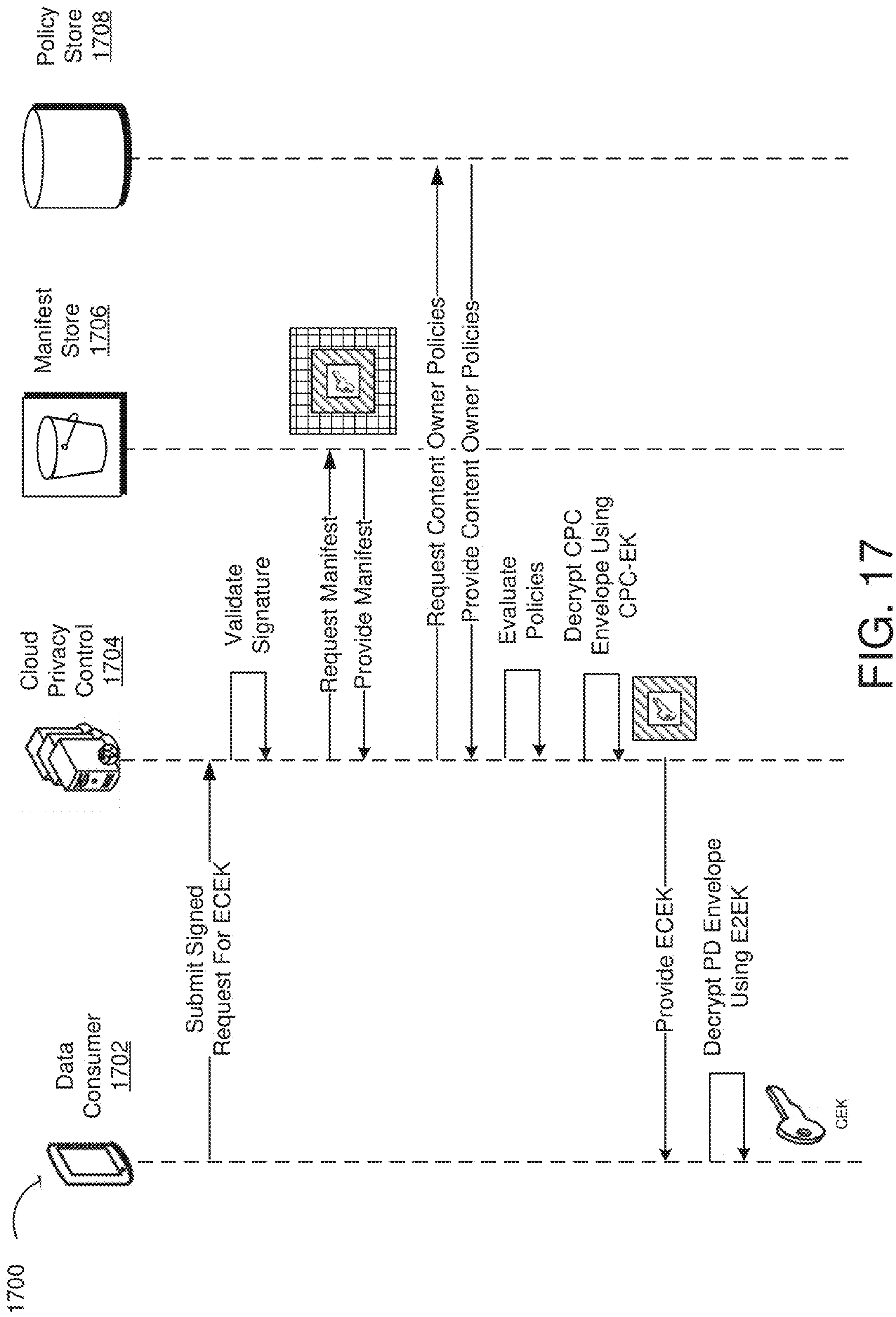
FIG. 17 illustrates a diagram 1700 depicting techniques for fulfilling a data access request in a cloud privacy control environment, in accordance with one or more example embodiments of the present disclosure.

FIG. 17 illustrates a diagram 1700 depicting techniques for fulfilling a data access request in a cloud privacy control environment, in accordance with one or more example embodiments of the present disclosure. In various embodiments, a content encryption key is used to encrypt content and/or decrypt encrypted content.

In various embodiments, FIG. 17 depicts an environment comprising a data consumer 1702, a cloud privacy control 1704, a manifest store 1706, and a policy store 1708. Various components depicted or described in FIG. 17 may be in accordance with those discussed in connection with FIG. 13 and elsewhere.

In various embodiments, data consumer 1702 submits a signed request to cloud privacy control 1704. The request may be to the cloud privacy control 1704 for access to the content encryption key associated with encrypted content that the data consumer 1702 wishes to access. Data consumer 1702 may or may not have access to a manifest associated with encrypted content. Regardless, when the data consumer wants access to the content, it cannot decrypt the manifest entry by itself because the manifest includes a double-encrypted CEK. To access the CEK, the data consumer 1702 submits a signed request to the CPC 1704 to gain access to the content. CPC 1704 may validate the signed request to ensure the authenticity and integrity of the request it has received from data consumer 1702. Validating the signature may be used to prevent impersonation or replay attacks. CPC 1704 may, in some embodiments, request a manifest from the manifest store 1706. In other cases, the data consumer 1702 already has access to the manifest and directly provides the CPC 1704 with the double-encrypted CEK. Returning to FIG. 17, CPC 1704 obtains the double-encrypted CEK associated with the data consumer 1702 (e.g., in the manifest that is provided by the manifest store 1706). CPC may request content owner policies from policy store 1708, and the policy store 1708 may provide such policies to CPC 1704. CPC 1704 may apply applicable access control policy.

In various embodiments, a privacy policy specifies two levels of information: the privacy domains to encrypt the content to and, for each privacy domain, the access control policy to apply before a participant (within the privacy domain) is granted access to the CEK. The access control policies can be specified by the content owner, content consumer, or other participants. For example, the content producer may specify that the privacy domain for another user may access the content. For example, the content consumer may specify that only specific devices within the privacy domain of the consumer is able to access the data. There may also be global or other generally applicable access control policies, such as policies that prohibit access to devices that are missing a security patch or have known security vulnerabilities so as to protect the customer data. For example, data access to data consumer 1702 may be suppressed if it is running older versions of an application until the device applies a security patch.

Continuing with FIG. 17, the CPC 1704 may, responsive to a positive evaluation of the applicable policies, decrypt the double-encrypted CEK (e.g., obtained from the manifest) using the CPC-EK private key. This effectively removes the outer envelope of the CEK and results in a single-encrypted CEK (ECEK). The ECEK may be provided to the data consumer 1702. Each privacy domain has an Encryption Key referred to as an end-to-end encryption key (E2EK), according to various embodiments. In some cases, multiple privacy domains may share the same E2EK, although this type of sharing may be prohibited with data consumers that are jointly controlled by the cloud privacy control system. The data consumer may use the consumer's private key to determine the E2EK and decrypt the ECEK to obtain the CEK (e.g., as described in connection with FIG. 11). The CEK may then be used to decrypt encrypted content, resulting in the sharing of the content in a manner that preserves end-to-end data privacy.

In an illustrative, non-limiting embodiment, a data consumer algorithm for a cloud-privacy control protected content is implemented as follows:

First, the consumer (e.g., Bob) will request access to the ECEK for a specific manifest by calling into CPC service. This request will be signed using the participant's identity private key (Bob-IK). The participant will provide its identity x509 certificate issued by Bob's manager along with the request. Next, the CPC will validate the x509 certificate and will check to ensure the participant is still enrolled and verify the request signature. The CPC will next retrieve the manifest requested along with the privacy policy applied by the content owner. The CPC then verifies if the manifest has content access for Bob's privacy domain. If so, it will evaluate the corresponding access control policy for Bob's privacy domain as established by Alice. If the evaluation of the policy criteria indicates access should be granted, the CPC will decrypt DECEK-Bob using the Bob-CPC-EK.private key and return the ECEK-Bob back to the participant. As mentioned earlier, the expectation is that the participant has access to Bob-EK.private key using which the ECEK-Bob was generated. The participant decrypts ECEK-Bob using the Bob-EK.private key and gets to the actual CEK, which is then used to decrypt the content.

Some aspects of the chosen strategy include are described in greater detail below. It is noted that rather than encrypting the CEK to individual consumers, now it is encrypting to the privacy-domain encryption key, which doesn't scale linearly with the number of participants within the domain. Rather, it scales linearly to the number of privacy domains involved, which doesn't grow as quickly. Second, the consumer participants use its identity to prove and get access to the CEK rather than producer encrypting to it. This gives flexibility in 2 ways: first, revocation of consumer is near-instantaneous since it merely involves revoking the participant's identity key; second, because there is no information in the cloud encrypting directly to the participant IK, the concern with the inability to revoke an encryption key is no longer applicable since there is no direct use of encryption key present directly on the device.

The EK private key of a privacy domain being accessible to all the participants of the domain will be compromised when there is a stolen device. However, the information in the cloud is not directly encrypted to EK. The exposure of the manifests, along with the compromised EK private key, doesn't risk content access. The only way for a stolen device to get to the content afresh is by requesting the CPC, and these requests can be denied, for example, through a revocation.

Past content access can be a simple act of an access control policy specified for the consumer. Content access restrictions can be realized based on temporal (time-of-day based) or spatial requirements (geo-fencing), which are more dynamic without increasing the complexity of the producer.

The cloud privacy control, while being able to participate in the access control, it doesn't have access to the CEK itself thereby preserving the end-to-end encryption when required as well.

Figure 18:
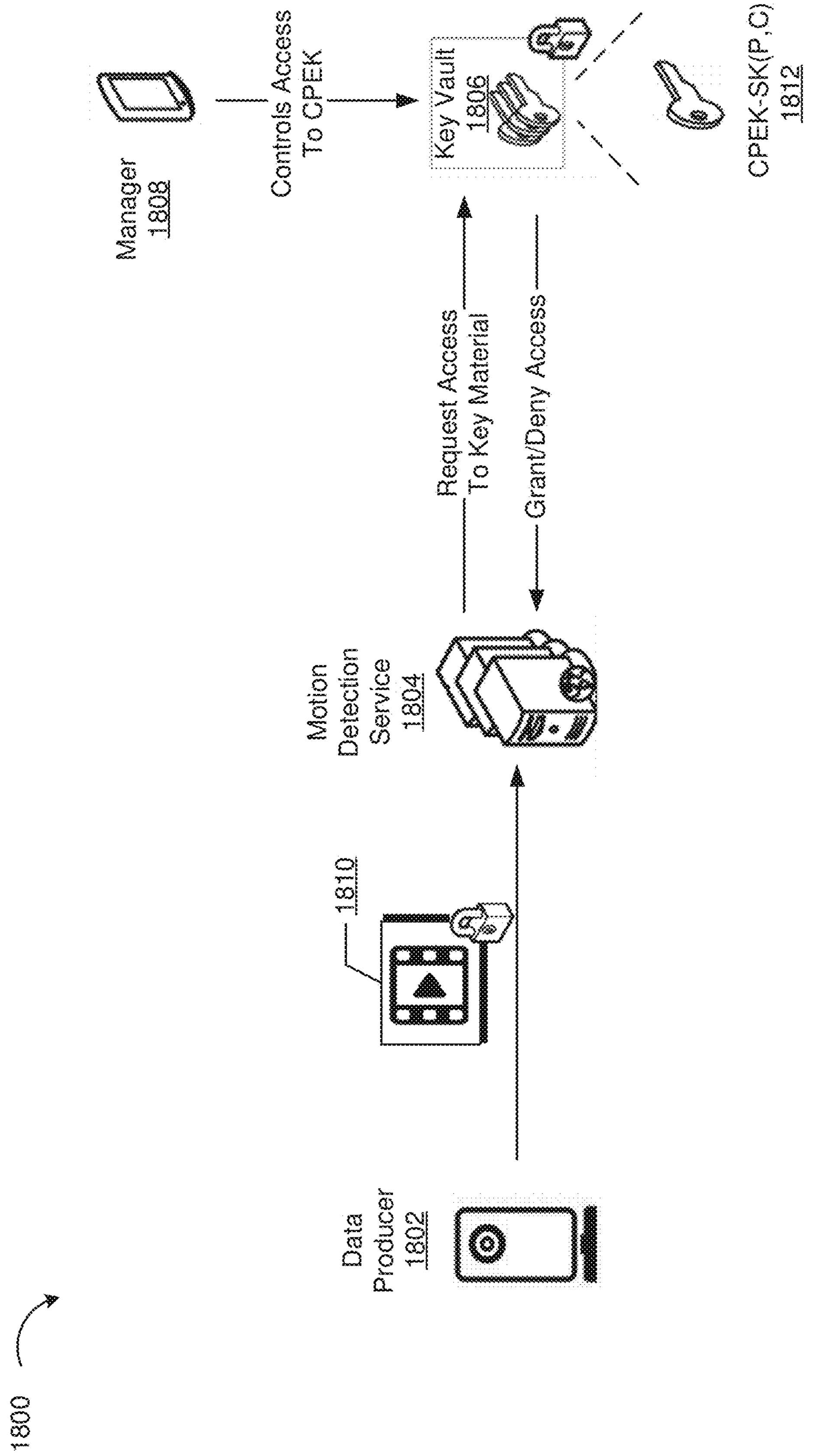
FIG. 18 illustrates a diagram 1800 depicting techniques for content protection service (CPS) data access and revocation, in accordance with one or more example embodiments of the present disclosure.

FIG. 18 illustrates a diagram 1800 depicting techniques for CPS data access and revocation, in accordance with one or more example embodiments of the present disclosure. In various embodiments, a content encryption key is used to encrypt content and/or decrypt encrypted content.

In various embodiments, FIG. 18 depicts an environment comprising a data producer 1802, a cloud-based data consumer represented as motion detection service 1804, a key vault 1806, and a manager 1808. FIG. 18 further depicts encrypted content 1810 and a private key 1812 of a consumer-producer encryption pair for the data producer 1802 and motion detection service 1804 as the data consumer, expressed as CPEK-SK(P,C).

In various embodiments, data producer 1802 refers to a device that generates data or content, such as video data, in the case of a home security camera or other types of data producer devices. Data producer 1802 may provide or otherwise make its content available to other devices, which may be referred to as data consumers. It is noted that some devices may be both consumers and producers, and the designation of devices as data producers or data consumers may be in reference to the device's role in a specific flow and may change in the context of other flows.

Motion detection service 1804 may, in the context of FIG. 18, refer to a data consumer that provides motion detection services. The cloud provider may be enrolled as a data consumer in a CPS environment. The data consumer may have a root of trust that is established using a manager device/app of the CPS environment. In various embodiments, data consumer device may refer to a headed device, a headless device, multi-modal device, or other various device types that may consume various types of content that may be generated by data producers in a CPS environment. For example, the data producer 1802 may generate a video feed that is provided to a computer vision or motion detection service 1804. Encrypted content 1810 may be decrypted by Motion detection service 1804 using key material (e.g., private key 1812) to reconstruct an envelope key, which can be used to generate the plaintext content.

Key vault 1806 may refer to a customer-controlled storage system or service. The key vault 1806 may refer to a device that is physically in the possession of a customer (e.g., an on-premises device at a customer's home or office environment). The key vault 1806 may be hosted by a service provider separate from the cloud environment in which access control policies are implemented. The key vault 1806 may provide a customer, via manager 1808, the ability to exercise independent control over revocation of access grants to customer data. In various embodiments, key vault 1806 provides a customer with an independent mechanism for unilaterally revoking access to data within a CPS environment in a cryptographically verifiable manner.

Typically, customers do not have independent control over which entities in a cloud—or outside the cloud, for that matter—are allowed to access their data as a policy typically expresses grant or deny effects in a wholesale manner. There is not an independent control to control where their data goes, who has access, and how that data can be used. Embodiments described herein may be provided to give the customers an independent control over who can access what parts of the data and independent control over revocation of that access. The independent part of it comes from decoupling a key management element from the "cloud" that is referred to as key vault 1806 and designed the encryption of the content that gets generated on the customer device—for example, a home security camera —in such a way that the key vault is a part of the encryption and decryption process for any downstream data consumer to be able to access that data.

A key vault 1806 could be an actual hardware device that sits in a customer's home, or it could be a cloud-based version of that key vault service provided by a third party cloud different from the cloud environment that is used to service the data. Customers may have a higher trust on this key vault element than they have on the cloud where their data goes. That higher trust is what will be leveraged to grant and revoke access independent of the cloud where their data is going. This can involve removing or deleting the key that sits in a key vault, essentially result in all consumers who depend on availability in that key to lose access.

That is what is meant by cryptographic revocation, where the customer can independently command the delete of the private key 1812 without worrying about whether the cloud provider would honor the revocation request properly or not. Customers have the key vault 1806 as an orthogonal, separate control which is a higher assurance for them that access revocation is honored.

As an example, consider a data producer 1802 that is provisioned in a CPS environment and generates content (e.g., a video feed). A user (e.g., via a manager device/app) may grant access to motion detection service 1804 to use content 1814 for specific purposes, such as to perform motion detection or object detection in a video feed generated by the customer's devices for a limited period of time. The motion detection service 1804, in this case, is being authorized to receive the customer data and process it, send the customer notifications, and so on and so forth. Various types of rich functionality may be realized through the use of the services that the cloud provider offers.

In the event that the customer would later wish to revoke the cloud provider's data access, the customer would be able to use the manager 1808 to revoke access, for example, by unchecking a box in an app to indicate that the customer no longer wishes to use the cloud provider's motion detection services. In naive systems that do not implement a key vault or use the techniques described herein, the customer may be placing their trust in the cloud provider to use its cloud privacy control to revoke access to the data. The techniques described herein can provide for cryptographically verifiable assurances that the access is revoked, providing customers with stronger assurances of data privacy.

Said another way, the techniques described herein may be utilized to improve data security by replacing cloud-based policy implementations with a cryptographic policy implementation that is independently controlled by the customer and whose access revocation can be cryptographically verified, thereby providing stronger assurances of data privacy through the management of key material rather than through policies documents.

Figure 19:
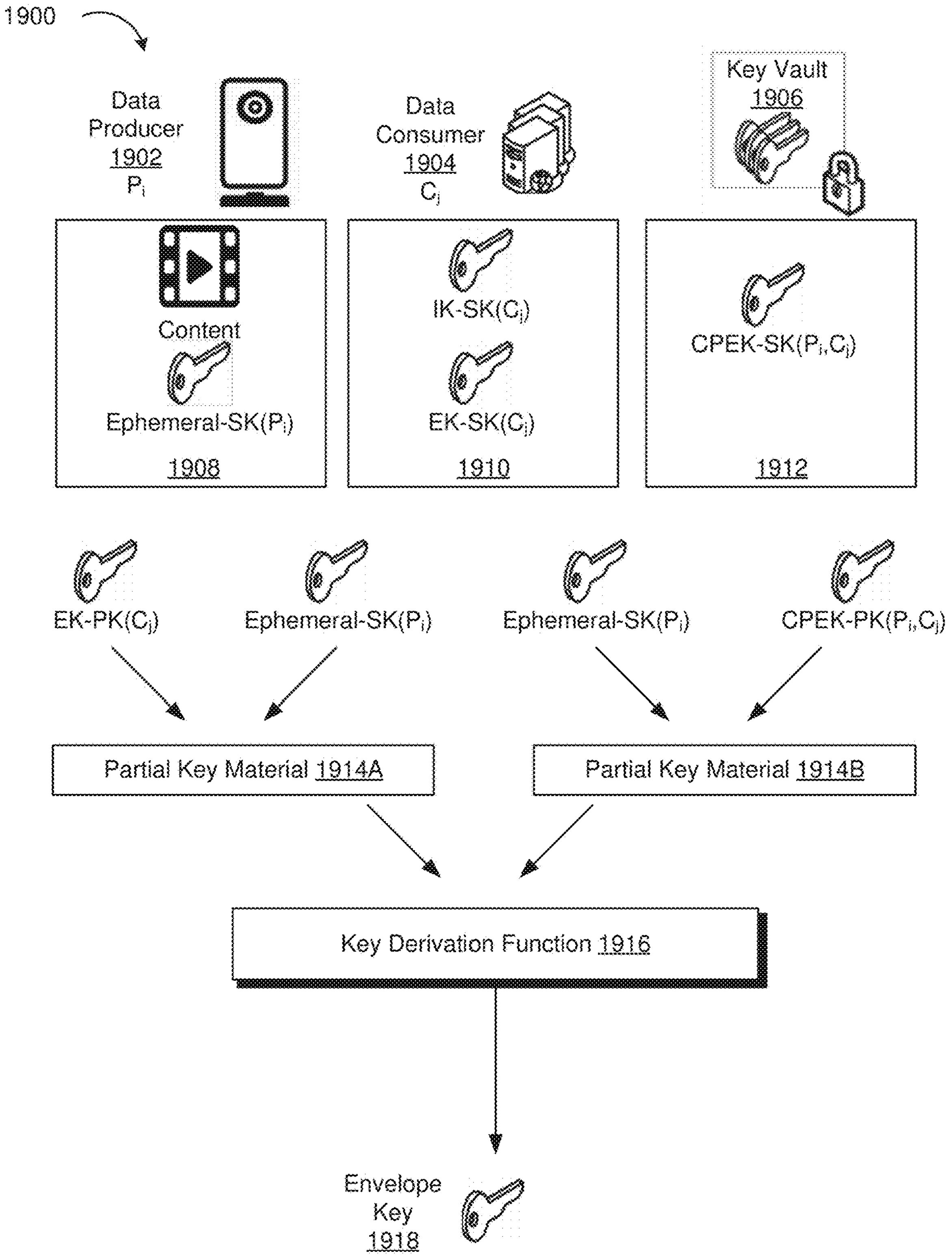
FIG. 19 illustrates a diagram 1900 in which a key vault is utilized as part of an end-to-end encryption scheme to encrypt content, in accordance with one or more example embodiments of the present disclosure.

FIG. 19 illustrates a diagram 1900 in which a key vault is utilized as part of an end-to-end encryption scheme to encrypt content, in accordance with one or more example embodiments of the present disclosure. In various embodiments, a content encryption key is used to encrypt content and/or decrypt encrypted content.

In various embodiments, FIG. 19 depicts an environment comprising a data consumer 1902, a data consumer 1904, and a key vault 1906. The data consumer 1904 may generate content (e.g., video feed), and the data consumer's access to the content may be controlled by a key vault 1906.

In various embodiments, data producer 1902 refers to a device that generates data or content, such as video data, in the case of a home security camera or other types of data producer devices. Data producer 1902 may provide or otherwise make its content available to other devices, which may be referred to as data consumers. It is noted that some devices may be both consumers and producers, and the designation of devices as data producers or data consumers may be in reference to the device's role in a specific flow and may change in the context of other flows. Data producer 1902 may be referred to as Data Producer Pi in the context of FIG. 19. Data producer 1902 may store or otherwise have access to first data 1908, comprising: content and the data producer's ephemeral key, which is expressed as Ephemeral-SK(Pi). The producer's corresponding public identity key may be expressed as Ephemeral-PK(Pi) or simply PK(Pi). This ephemeral key may be used for limited purposes. For example, in various embodiments, Ephemeral-SK(Pi) is used to encrypt only a single piece of content, and a different ephemeral key is used for another piece of content generated by data producer 1902. In various embodiments, Ephemeral-SK(Pi) is used to generate a limited amount (e.g., not necessarily limited to exactly one) amount of encrypted contents. For example, an ephemeral key may be used for a limited amount of time and then discarded/refreshed (e.g., new ephemeral keys are generated every minute). This may be used as a performance optimization to reduce the amount of cryptographic operations (e.g., ephemeral key generation) being performed by data producer 1902 on a per-content basis.

Data consumer 1904 may refer to a data consumer, such as a cloud provider that implements motion detection services or other functionality that may leverage data provided by data producer 1902. The data consumer may store or otherwise have access to second data 1910 comprising: the data consumer's private identity key, which is expressed as IK-SK(Cj) and one or more data consumer private encryption keys, an example of which is expressed as EK-SK(Cj) in FIG. 19.

Key vault 1906 may refer to an on-premises device or third-party cloud service that is used to securely store and/or generate key material. Key vaults may be implemented as a hardware security module (HSM) or other types of security modules. Key vault 1906 may store or otherwise have access to third data 1912 comprising: a relationship key private key that is used to protect communications between a particular producer-consumer pair. In the case of producer Pi and consumer Cj, this is expressed as CPEK-SK(Pi,Cj). The corresponding public key to this private key may be expressed as CPEK-PK(Pi,Cj) and may be known or made available to data producer 1902 and/or data consumer 1904.

In various embodiments, a data producer 1902 derives envelope key 1918 in the following manner: a first partial key material 1914A is derived from the producer's private key and the target consumer's public key. This may be used to generate a first partial key material 1914A. This may, for example, be performed using Diffie Hellman key exchange techniques. Data producer 1902 may derive a second partial key material 1914B from the producer's private key and CPEK public key. First and second partial key materials may be generated as follows:

$$\text{Env\_DH1}(Pi, Cj) = DH(ProducerEphemeralKey \cdot \text{private}, ConsumerEncryptionKey \cdot \text{public})$$

$$\text{Env\_DH2}(Pi, Cj) = DH\big(ProducerEphemeralKey \cdot \text{private}, CPEK-Pi-Cj \cdot \text{public}\big)$$

First partial key material 1914A and second partial key material 1914B may be combined (e.g., concatenated) and provided as an input to a key derivation function 1916 such as PBKDF2, thereby producing envelope key 1918. Envelope key 1918 may be used to encrypt a content encryption key (CEK) that is used to encrypt the content of the data producer 1902. The encrypted content may be stored in an encrypted content store, provided directly to the data consumer in real-time, or any other suitable means of data providing. In various embodiments, the ephemeral public key is stored in the corresponding manifest entry to facilitate re-construction of the envelope key 1918 by data producers authorized to access the content being protected by the CEK.

Figure 20:
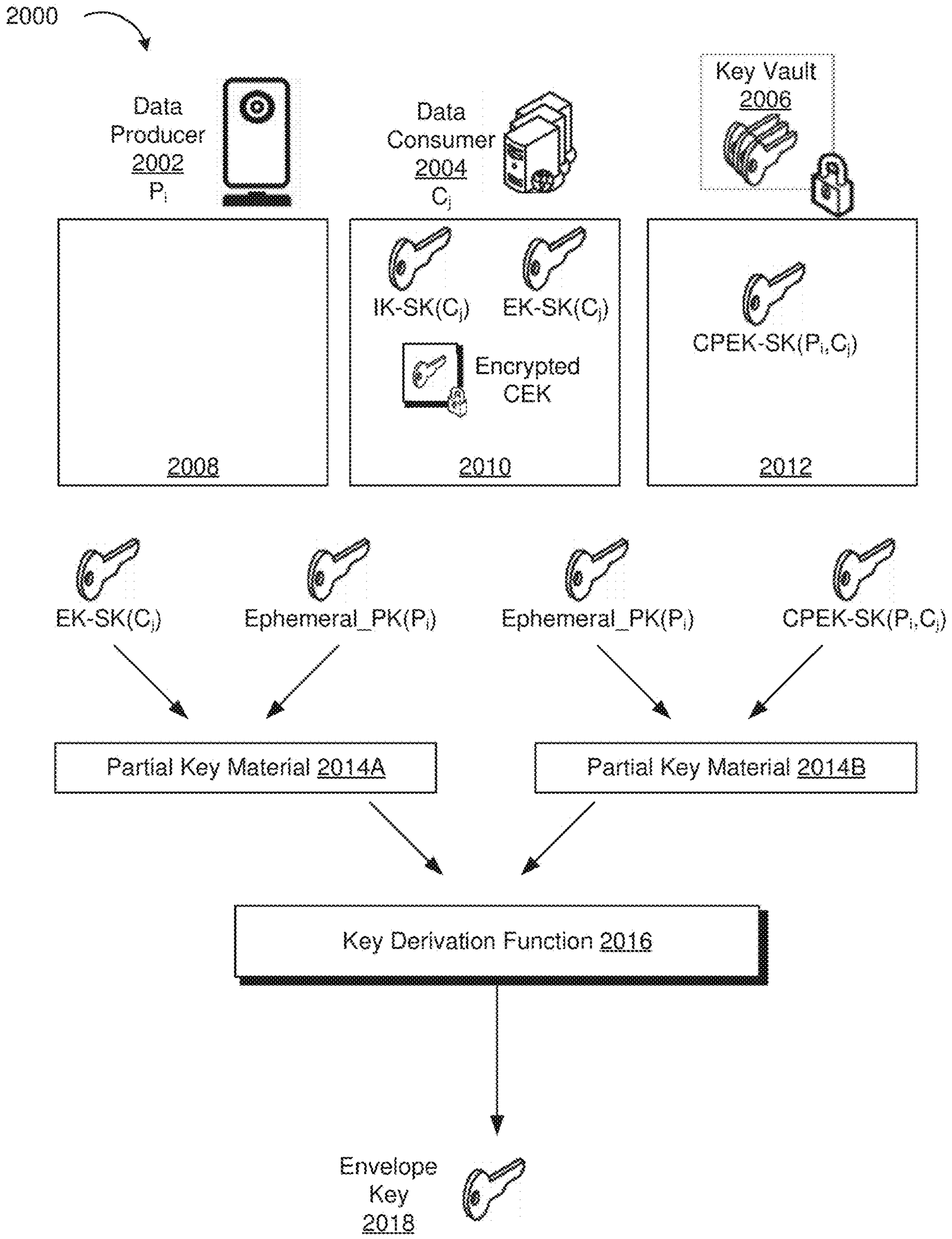
FIG. 20 illustrates a diagram 2000 in which a key vault is utilized as part of an end-to-end encryption scheme to decrypt an encrypted content, in accordance with one or more example embodiments of the present disclosure.

FIG. 20 illustrates a diagram 2000 in which a key vault is utilized as part of an end-to-end encryption scheme to decrypt an encrypted content, in accordance with one or more example embodiments of the present disclosure. In various embodiments, a content encryption key is used to encrypt content and/or decrypt encrypted content. FIG. 20 may be implemented following the generation of encrypted CEK as described in connection with FIG. 19.

In various embodiments, FIG. 20 depicts an environment comprising a data producer 2002, a data consumer 2004, and a key vault 2006. The data consumer 2004 may have been used to generate content that was encrypted and made available to data consumer 2004 in an encrypted format, such that decryption of the encrypted content relies on the use of key vault 2006.

In various embodiments, data producer 2002 refers to a device that generates data or content, such as video data, in the case of a home security camera or other types of data producer devices. Data producer 2002 may provide or otherwise make its content available to other devices, which may be referred to as data consumers. It is noted that some devices may be both consumers and producers, and the designation of devices as data producers or data consumers may be in reference to the device's role in a specific flow and may change in the context of other flows. Data producer 2002 may be referred to as Data Producer Pi in the context of FIG. 20. As depicted in FIG. 20, data producer 2002 is not required to store any first data 2008 in connection with the data consumer's ability to generate envelope key 2018. In various embodiments, first data 2008 comprises an ephemeral private key Ephemeral-SK(Pi) used to encrypt only a single piece of content. This is discussed in greater detail above in connection with FIG. 19. The producer's corresponding public identity key may be expressed as Ephemeral-PK(Pi) or simply PK(Pi).

Data consumer 2004 may refer to a data consumer, such as a cloud provider that implements motion detection services or other functionality that may leverage data provided by data producer 2002. The data consumer may store or otherwise have access to second data 2010 comprising: encrypted content encryption key (e.g., generated in accordance with FIG. 19); the data consumer's private identity key, which is expressed as IK-SK(Cj); and one or more data consumer private encryption keys, an example of which is expressed as EK-SK(Cj) in FIG. 20. The corresponding consumer public encryption key, expressed as PK-SK(Cj), may have been used to generate envelope key 2018 by data producer 2002, for example, using techniques discussed in connection with FIG. 19.

Key vault 2006 may refer to an on-premises device or third-party cloud service that is used to securely store and/or generate key material. Key vault may be implemented as a hardware security module (HSM) or other types of security modules. Key vault 2006 may store or otherwise have access to third data 2012 comprising: a relationship key private key that is used to protect communications between a particular producer-consumer pair. In the case of producer Pi and consumer Cj, this is expressed as CPEK-SK(Pi,Cj). The corresponding public key to this private key may be expressed as CPEK-PK(Pi,Cj) and may be known or made available to data producer 2002 and/or data consumer 2004.

In various embodiments, data consumer 2004 derives envelope key 2018 in the following manner: a first partial key material 2014A is derived from the consumer's private key and the producer's public key. This may be used to generate a first partial key material 2014A. This may, for example, be performed using Diffie Hellman key exchange techniques. Data consumer 2004 may derive a second partial key material 2014B from the producer's public key and the CPEK private key. First and second partial key materials may be generated as follows:

$$\text{Env\_DH1}(Pi, Cj) = DH(ProducerEphemeralKey \cdot \text{public}, ConsumerEncryptionKey \cdot \text{private})$$

$$\text{Env\_DH2}(Pi, Cj) = DH\big(ProducerEphemeralKey \cdot \text{public}, CPEK-Pi-Cj \cdot \text{private}\big)$$

In order to get the CPEK private key, data consumer 2004 may submit a request to key vault 2006 requesting such information. The request may be signed. The key vault may verify the signed request as being authentic and genuine, and then perform an evaluation of whether the data consumer 2004 should be granted access to the CPEK private key. Various policies that the data producer 2002 defines may be applicable, such as providing the data consumer 2004 access only at certain times, when certain conditions are met (e.g., geo-fencing), or only when the manager app is opened. This may, for example, be used in a scenario where the data producer is owned by a first user and is sharing the data with a data consumer of a second user.

First partial key material 2014A and second partial key material 2014B may be combined (e.g., concatenated) and provided as an input to a key derivation function 2016, such as PBKDF2, thereby producing envelope key 2018. Envelope key 2018 may be used to decrypt an encrypted content encryption key that the data a producer uses to encrypt the aforementioned content. The CEK may then be used to decrypt an encrypted content.

Figure 21:
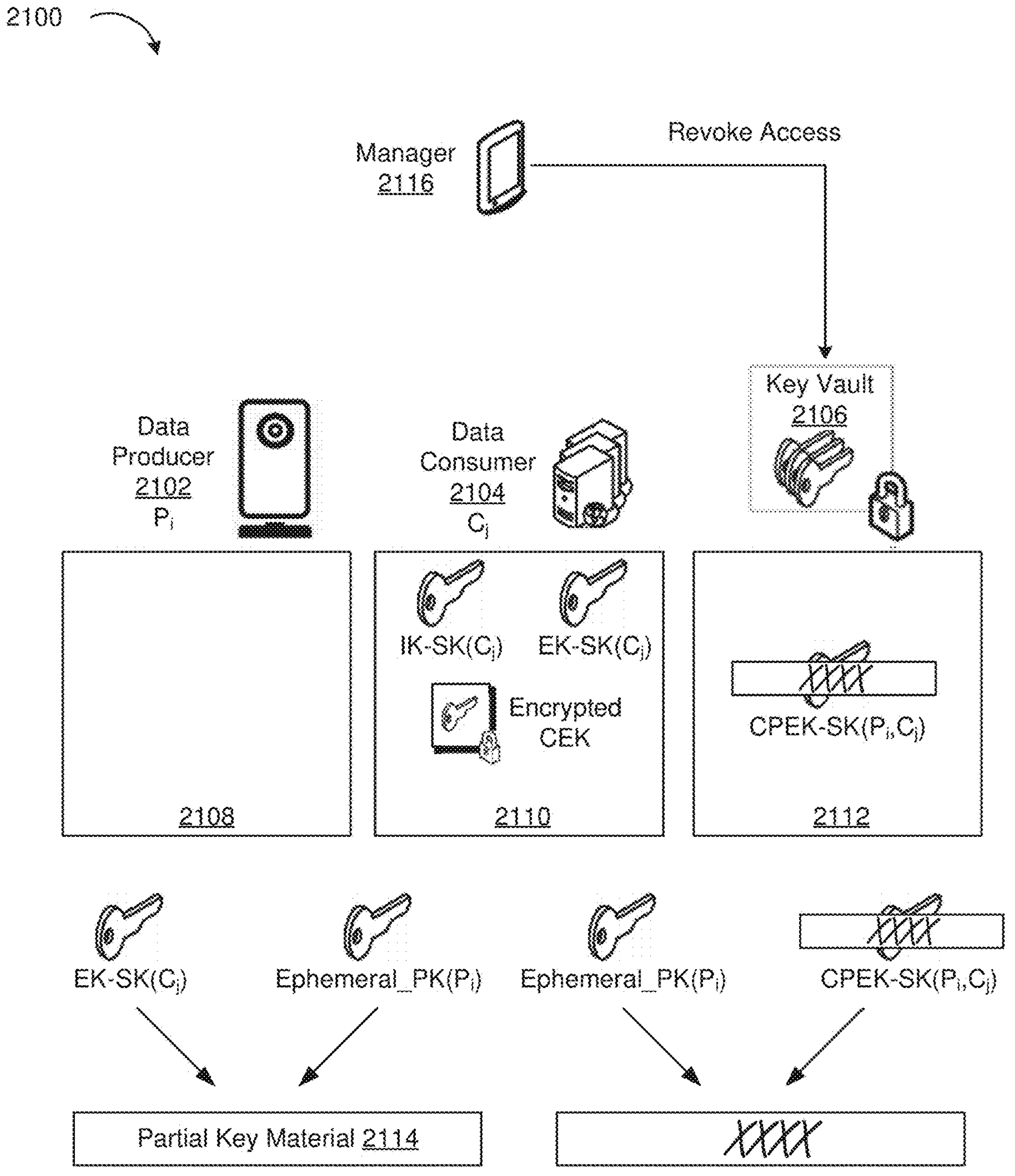
FIG. 21 illustrates a diagram 2120 in which a key vault is utilized as part of an end-to-end encryption scheme to perform a cryptographic revocation of data access, in accordance with one or more example embodiments of the present disclosure.

FIG. 21 illustrates a diagram 2100 in which a key vault is utilized as part of an end-to-end encryption scheme to perform a cryptographic revocation of data access, in accordance with one or more example embodiments of the present disclosure. In various embodiments, a content encryption key is used to encrypt content and/or decrypt encrypted content. FIG. 21 may be implemented following the generation of encrypted CEK as described in connection with FIG. 19.

In various embodiments, FIG. 21 depicts an environment comprising a data producer 2102, a data consumer 2104, and a key vault 2106. The data producer 2102 may have been used to generate content that was encrypted and made available to data consumer 2104 in an encrypted format, such that decryption of the encrypted content relies on the use of key vault 2106.

In various embodiments, data producer 2102 refers to a device that generates data or content, such as video data, in the case of a home security camera or other types of data producer devices. Data producer 2102 may provide or otherwise make its content available to other devices, which may be referred to as data consumers. It is noted that some devices may be both consumers and producers, and the designation of devices as data producers or data consumers may be in reference to the device's role in a specific flow and may change in the context of other flows. Data producer 2102 may be referred to as Data Producer Pi in the context of FIG. 21. Data producer 2102 may store or otherwise have access to first data 2108, comprising: data producer's private identity key, which is expressed as IK-SK(Pi). The producer's corresponding public identity key may be expressed as IK-PK(Pi).

Data consumer 2104 may refer to a data consumer, such as a cloud provider that implements motion detection services or other functionality that may leverage data provided by data producer 2102. The data consumer may store or otherwise have access to second data 2110 comprising: encrypted content encryption key (e.g., generated in accordance with FIG. 19); and one or more data consumer private encryption keys, an example of which is expressed as EK-SK(Cj) in FIG. 21. The corresponding consumer public encryption key, expressed as PK-SK(Cj), may have been used by data producer 2102 to generate the envelope key used to protect the CEK, for example, using techniques discussed in connection with FIG. 19 the data consumer's private identity key, which is expressed as IK-SK(Cj).

Key vault 2106 may refer to an on-premises device or third-party cloud service that is used to securely store and/or generate key material. Key vault may be implemented as a hardware security module (HSM) or other types of security modules. Key vault 2106 may store or otherwise have access to third data 2112 comprising: a relationship key private key that is used to protect communications between a particular producer-consumer pair. In the case of producer Pi and consumer Cj, this is expressed as CPEK-SK(Pi,Cj). The corresponding public key to this private key may be expressed as CPEK-PK(Pi,Cj) and may be known or made available to data producer 2102 and/or data consumer 2104.

In various embodiments, manager 2116 may be a device that manages access to data produced by data producer 2102. The manager 2116 may have privileges that allow for the revocation of access to data producer data. The manager 2116, in various embodiments, submits an API to key vault 2106 to revoke the data consumer's access. The revocation may be specific to a particular data producer (e.g., data producer Pi) or to all data producers. A revocation may be performed by key vault 2106 through the destruction of key material. When a manager 2116 submits a request to revoke consumer Cj's access to producer Pi's data, a private key stored within key vault 2106 represents that relationship, namely, CPEK-SK(Pi,Cj) as discussed above. This key may be electronically shredded by the key vault in response to a revocation request. As a result, data consumer 2104 is able to generate partial key material 2114 but is not able to generate other partial key material that is needed to assemble the envelope key for decrypting the encrypted CEK (see FIG. 20).

Figure 22:
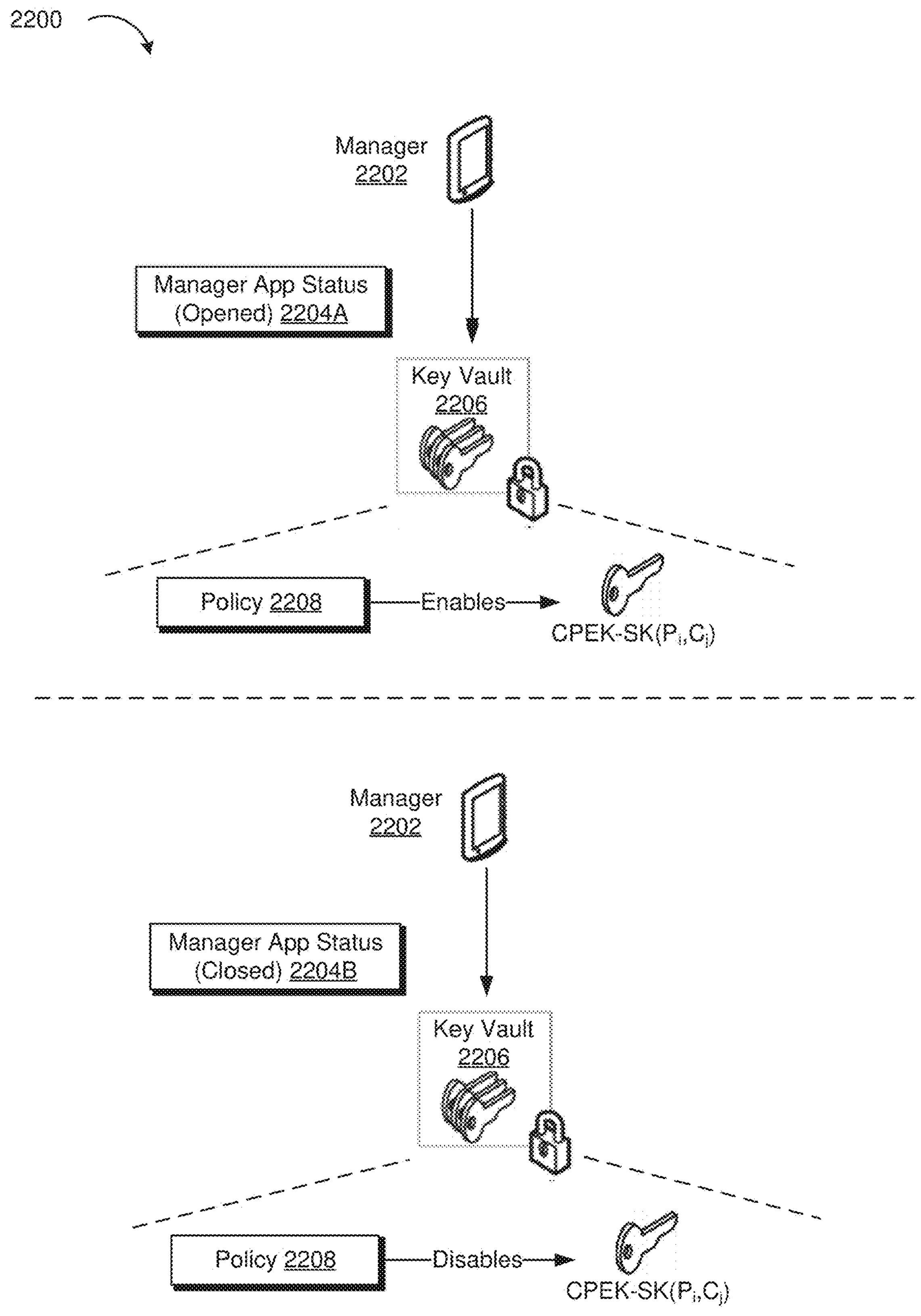
FIG. 22 illustrates a diagram 2200 in which a key vault is utilized as part of an end-to-end encryption scheme to provide conditional access grants, in accordance with one or more example embodiments of the present disclosure.

FIG. 22 illustrates a diagram 2200 in which a key vault is utilized as part of an end-to-end encryption scheme to provide conditional access grants, in accordance with one or more example embodiments of the present disclosure. In various embodiments, a content encryption key is used to encrypt content and/or decrypt encrypted content.

In various embodiments, manager 2202 refers to a manager app/device such as those described in connection with FIG. 21. A key vault 2206 may store or otherwise have access to policies such as policy 2208 that can be used to enable or disable the use of cryptographic material stored in the key vault 2206. As an example, policy 2208 may specify that data consumer Cj's access to data from producer Pi (or to all producers) is restricted to being allowed only when the producer's manager app is running. This may, for example, allow for the manager app to request an approval from the customer via a notification, allow for the manager app to monitor the consumer's use of the data or other use cases. In the upper portion of FIG. 22, when the manager 2202 is in the manager app status (opened) 2204A, the policy 2208 enables the use of CPEK-SK(Pi,Cj) so that if data consumer Cj attempts to decrypt an encrypted CEK in this state, the CPEK key will be provided. Conversely, in the bottom portion of FIG. 22, if the manager 2202 is in the manager app status (closed) 2204B, the policy 2208 disables the use of CPEK-SK(Pi,Cj) so that if data consumer Cj attempts to request the CPEK private key during this state, the request will not be fulfilled.

Figure 23:
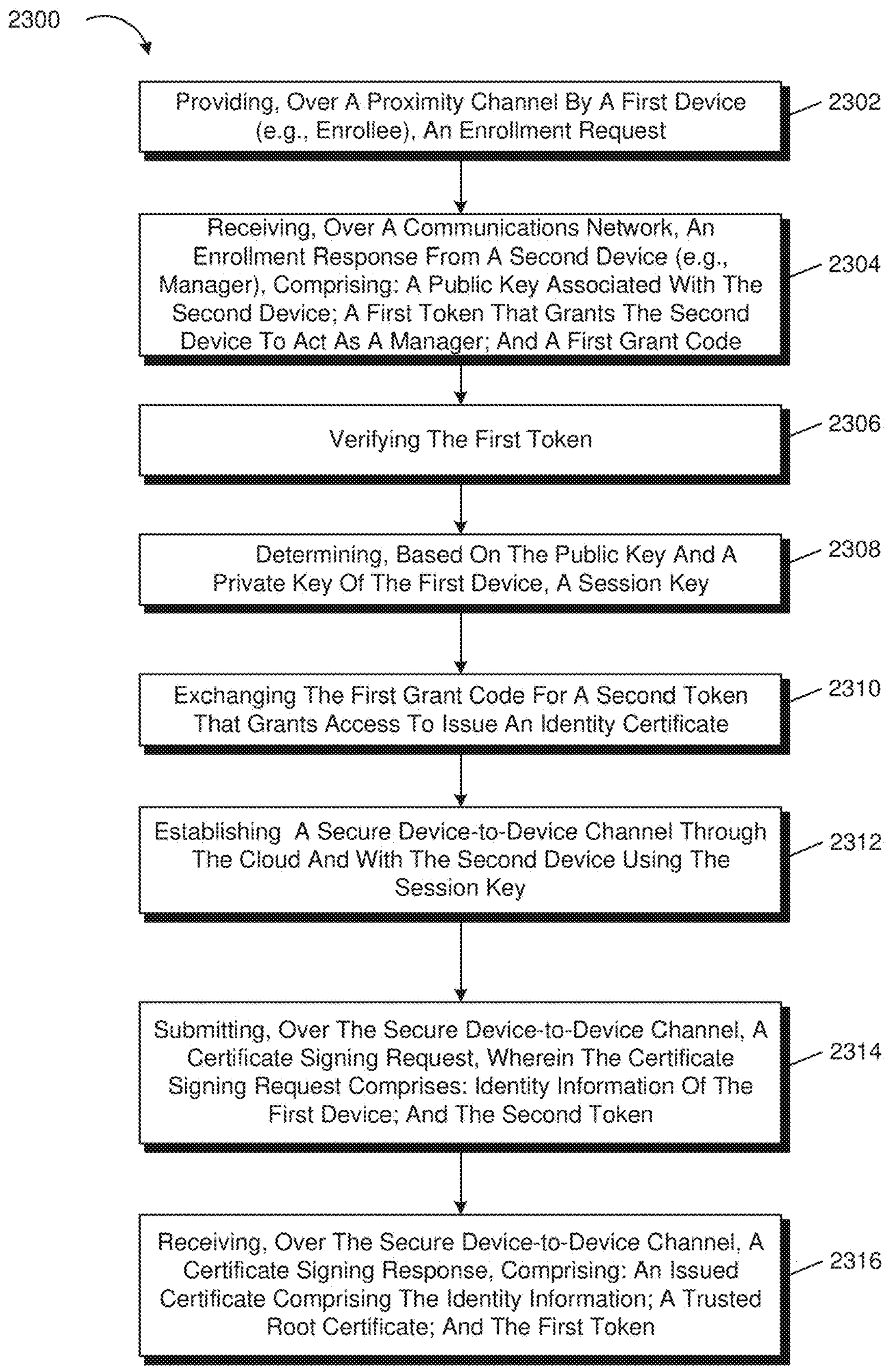
FIG. 23 shows an illustrative example of a process 2300 for enrollment of a participant device (e.g., enrollee) in a content protection service (CPS) environment, in accordance with one or more example embodiments of the present disclosure.

FIG. 23 shows an illustrative example of a process 2300 for enrollment of a participant device (e.g., enrollee) in a content protection service (CPS) environment, in accordance with one or more example embodiments of the present disclosure. In at least one embodiment, some or all of the process 2300 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2300 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, a system comprises one or more processors and memory storing executable instructions that, as a result of execution by the one or more processors, cause the system to perform some or all steps of process 2300. Process 2300 may be implemented in the context of various systems and methods described elsewhere in this disclosure, such as those discussed in connection with FIGS. 1-7 and 33.

In at least one embodiment, process 2300 comprises a step 2302 for providing, by one or more processors of a first device and over a proximity channel, an enrollment request.

In at least one embodiment, process 2300 comprises a step 2304 for receiving, by the one or more processors and over a communications network, an enrollment response from a second device, comprising: a public key associated with the second device; a first token that grants the second device to act as a manager; and a first grant code.

In at least one embodiment, process 2300 comprises a step 2306 for verifying, by the one or more processors, the first token.

In at least one embodiment, process 2300 comprises a step 2308 for determining, by the one or more processors, based on the public key and a private key of the first device, a session key.

In at least one embodiment, process 2300 comprises a step 2310 for exchanging, by the one or more processors, the first grant code for a second token that grants access to issue an identity certificate.

In at least one embodiment, process 2300 comprises a step 2312 for establishing, by the one or more processors, a secure device-to-device channel through the cloud and with the second device using the session key. An example of such a device-to-device channel is depicted in FIG. 3 as CH08, which uses a CPS message forwarder to facilitate device-to-device communications.

In at least one embodiment, process 2300 comprises a step 2314 for submitting, by the one or more processors and over the secure device-to-device channel, a certificate signing request, wherein the certificate signing request comprises: identity information of the first device; and the second token.

In at least one embodiment, process 2300 comprises a step 2316 for receiving, by the one or more processors and over the secure device-to-device channel, a certificate signing response, comprising: an issued certificate comprising the identity information; a trusted root certificate; and the first token.

In various embodiments, process 2300 comprises submitting, by the one or more processors and to an identity service, a participant enrollment request, comprising the issued certificate.

In various embodiments, process 2300 is implemented such that the session key is established using an Elliptic Curve Diffie Hellman (ECDH) key exchange.

In various embodiments, process 2300 is implemented such that exchanging the first grant code for the second token comprises: submitting a request to an authorization service to perform a cloud-based authorization of the first device using one or more native identity providers. In various embodiments, an authorization service is used to perform mutual authentication between a manager entity and enrollee entity. In various embodiments, the authorization service performs a first cloud-based authorization of the first device using one or more native identity providers and a second cloud-based authorization of the second device using the one or more native identity providers.

In various embodiments, process 2300 is implemented such that a QR code is provided over the proximity channel. The QR code may be displayed on the screen of one device that is participating in the enrollment process (e.g., a QR code displayed on a screen by a manager smartphone app) and scanned by the counterparty (e.g., a headless device such as a home security camera).

In various embodiments, process 2300 is implemented such that the enrollment request further comprises a second grant code that is redeemable by the second device for the first token.

In various embodiments, process 2300 is implemented such that the enrollment request further comprises a third grant code that is redeemable for a third token that grants access to send messages to the first device; and the enrollment response further comprises a fourth grant code that is redeemable for a fourth token that grants access to send messages to the second device.

In various embodiment, a computer-implemented method described herein, comprises: providing, from an originator to a responder over a proximity channel: an originator public key; an originator message grant code; and an originator enroll grant code; providing, from the responder to the originator: a responder public key; and a first ciphertext encrypted using a session key generated based at least in part on the originator public key and a responder private key the originator public key, the first ciphertext encoding: a responder message grant code; a responder enroll grant code; an originator enroll token obtained from the originator enroll grant code; and the responder public key; verifying, at the originator, the responder public key and the originator enroll token in the first ciphertext; providing, by the originator to the responder, a second ciphertext encrypted using the responder public key, the second ciphertext encoding: a responder enroll token obtained from the responder enroll grant code; and a certificate signing request for the originator; verifying, at the responder, the responder enroll token in the second ciphertext; based at least in part on successful verification of the responder enroll token at the responder, issuing a certificate to the originator; providing, by the responder to the originator, a third ciphertext encrypted using the session key, the third ciphertext encoding: the originator enroll token; an issued certificate; and a trusted root certificate; verifying, at the originator, the originator enroll token in the third ciphertext; providing, by the originator and to the responder, an indication of success enrollment; and submitting an enrollment request to an identity service, the enrollment request comprising an issued certificate.

In various embodiments, the responder is a manager entity having access to an account signing key (ASK) for issuing certificates.

In various embodiments, a QR code is provided over the proximity channel.

In various embodiments, the originator message grant code is redeemable for an originator message token that grants access to the responder to send messages to the originator; and the responder message grant code is redeemable for a responder message token that grants access to the originator to send messages to the responder.

Figure 24:
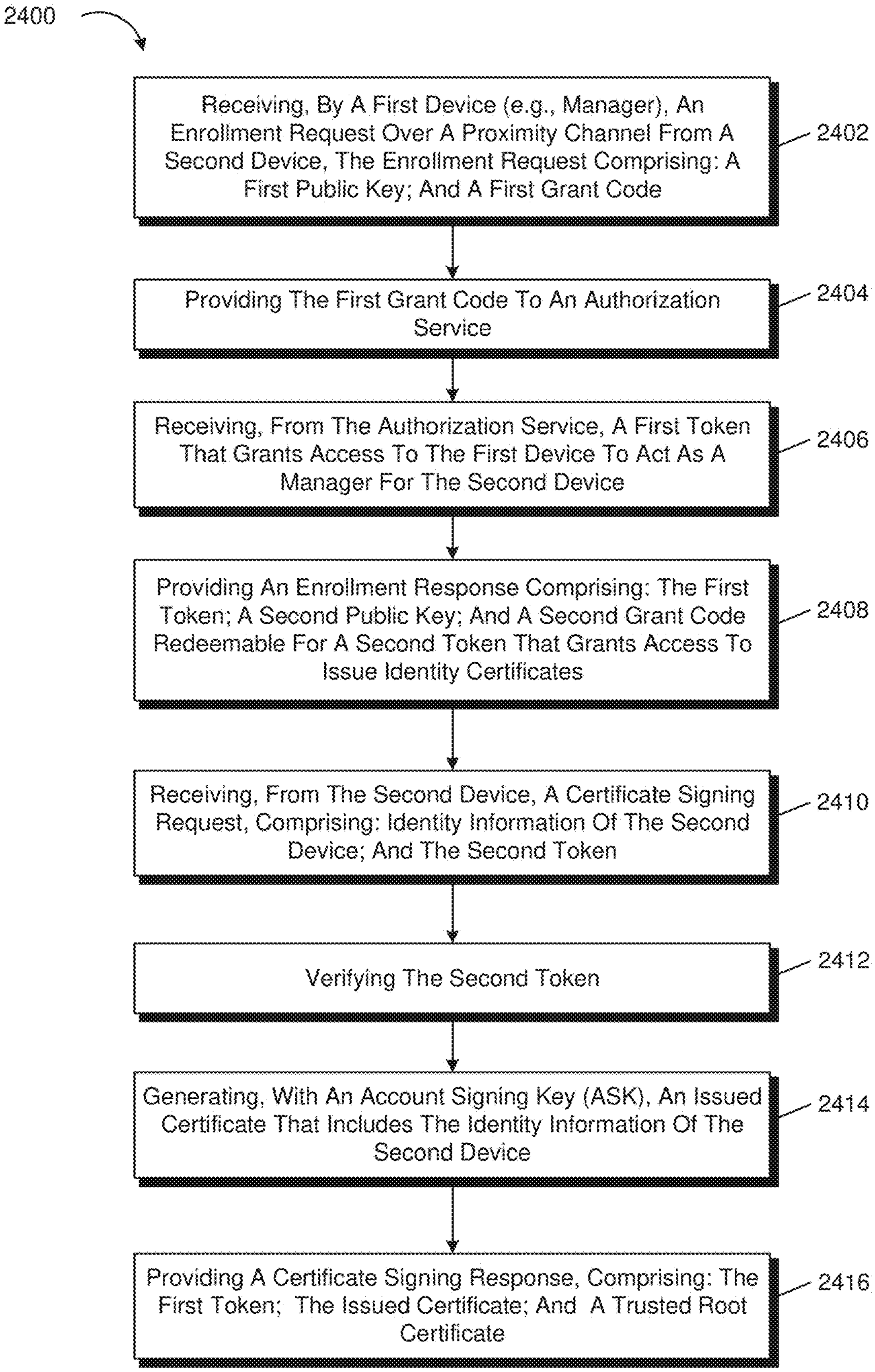
FIG. 24 shows an illustrative example of a process 2400 for enrollment of a participant device (e.g., manager) in a content protection service (CPS) environment, in accordance with one or more example embodiments of the present disclosure.

FIG. 24 shows an illustrative example of a process 2400 for enrollment of a participant device (e.g., manager) in a content protection service (CPS) environment, in accordance with one or more example embodiments of the present disclosure. In at least one embodiment, some or all of the process 2400 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2400 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, a system comprises one or more processor and memory storing executable instructions that, as a result of execution by the one or more processors, cause the system to perform some or all steps of process 2400. Process 2400 may be implemented in the context of various systems and methods described elsewhere in this disclosure, such as those discussed in connection with FIGS. 1-7 and 33.

In at least one embodiment, process 2400 comprises a step 2402 for receiving, by one or more processors of a first device, an enrollment request over a proximity channel from a second device, the enrollment request comprising: a first public key; and a first grant code.

In at least one embodiment, process 2400 comprises a step 2404 for providing, by the one or more processors, the first grant code to an authorization service.

In at least one embodiment, process 2400 comprises a step 2406 for receiving, by the one or more processors and from the authorization service, a first token that grants access to the first device to act as a manager for the second device.

In at least one embodiment, process 2400 comprises a step 2408 for providing, by the one or more processors, an enrollment response comprising: the first token; a second public key; and a second grant code redeemable for a second token that grants access to issue identity certificates.

In at least one embodiment, process 2400 comprises a step 2410 for receiving, by the one or more processors, from the second device, a certificate signing request, comprising: identity information of the second device; and the second token.

In at least one embodiment, process 2400 comprises a step 2412 for verifying, by the one or more processors, the second token.

In at least one embodiment, process 2400 comprises a step 2414 for generating, by the one or more processors and with an account signing key (ASK), an issued certificate that includes the identity information of the second device.

In at least one embodiment, process 2400 comprises a step 2416 for providing, by the one or more processors, a certificate signing response, comprising: the first token; the issued certificate; and a trusted root certificate.

Figure 25:
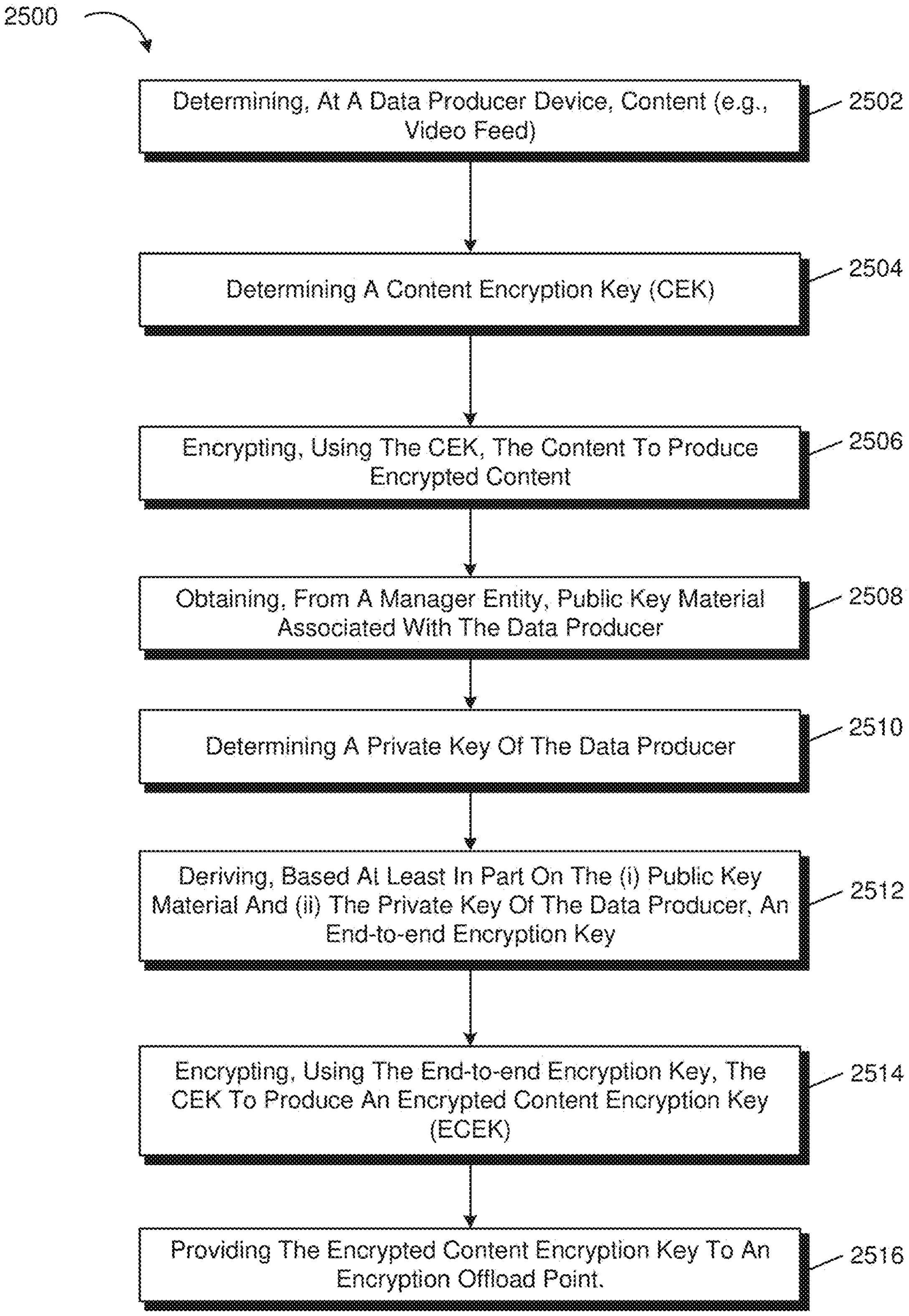
FIG. 25 shows an illustrative example of a process 2500 for implementing a data producer with encryption offloading, in accordance with one or more example embodiments of the present disclosure.

FIG. 25 shows an illustrative example of a process 2500 for implementing a data producer with encryption offloading, in accordance with one or more example embodiments of the present disclosure. In at least one embodiment, some or all of the process 2500 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, a system comprises one or more processor and memory storing executable instructions that, as a result of execution by the one or more processors, cause the system to perform some or all steps of process 2500. Process 2500 may be implemented in the context of various systems and methods described elsewhere in this disclosure, such as those discussed in connection with FIGS. 8-12 and 33.

In at least one embodiment, process 2500 comprises a step 2502 for determining, at a data producer device, content (e.g., video feed).

In at least one embodiment, process 2500 comprises a step 2504 for determining a content encryption key (CEK).

In at least one embodiment, process 2500 comprises a step 2506 for encrypting, using the CEK, the content to produce encrypted content.

In at least one embodiment, process 2500 comprises a step 2508 for obtaining, from a manager entity, public key material associated with the data producer.

In at least one embodiment, process 2500 comprises a step 2510 for determining a private key of the data producer.

In at least one embodiment, process 2500 comprises a step 2512 for deriving, based at least in part on the (i) public key material and (ii) the private key of the data producer, an end-to-end encryption key.

In at least one embodiment, process 2500 comprises a step 2514 for encrypting, using the end-to-end encryption key, the CEK to produce an encrypted content encryption key (ECEK).

In at least one embodiment, process 2500 comprises a step 2516 for providing the encrypted content-encryption key to an encryption offload point.

Figure 26:
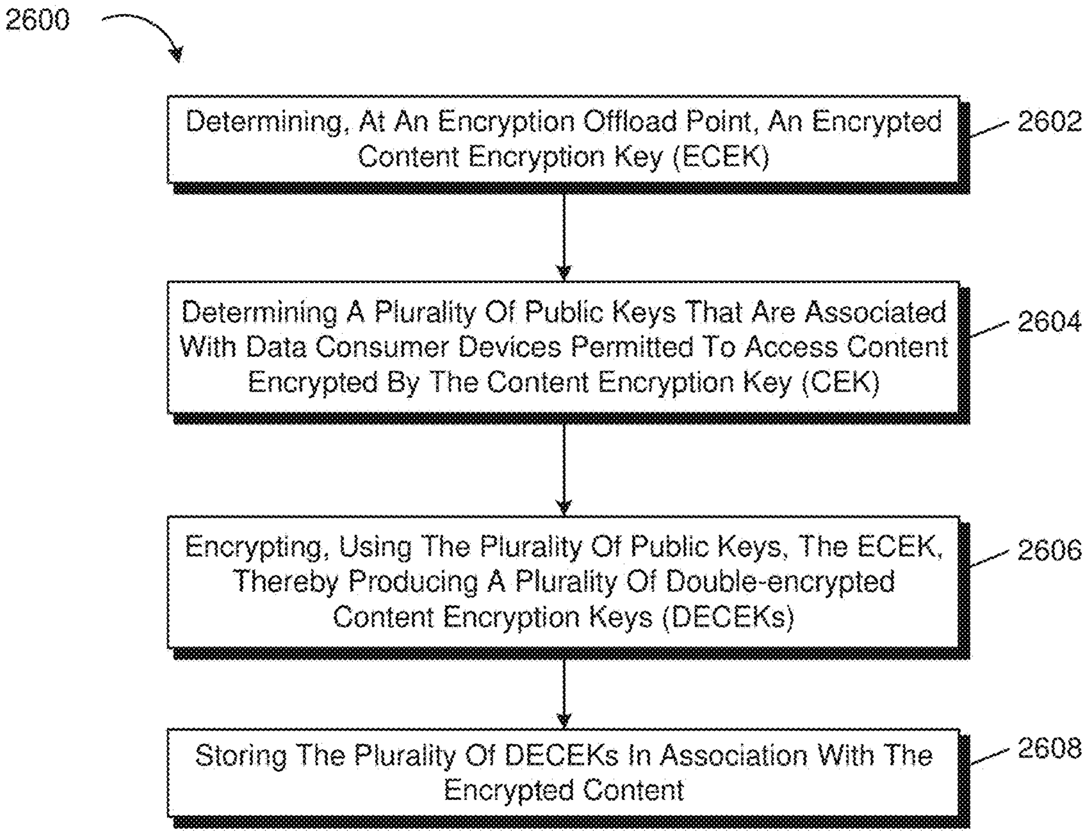
FIG. 26 shows an illustrative example of a process 2600 for implementing an encryption offload point, in accordance with one or more example embodiments of the present disclosure.

FIG. 26 shows an illustrative example of a process 2600 for implementing an encryption offload point, in accordance with one or more example embodiments of the present disclosure. In at least one embodiment, some or all of the process 2600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, a system comprises one or more processor and memory storing executable instructions that, as a result of execution by the one or more processors, cause the system to perform some or all steps of process 2600. Process 2600 may be implemented in the context of various systems and methods described elsewhere in this disclosure, such as those discussed in connection with FIGS. 8-12 and 33.

In at least one embodiment, process 2600 comprises a step 2602 for determining, at an encryption offload point, an encrypted content encryption key (ECEK).

In at least one embodiment, process 2600 comprises a step 2604 for determining a plurality of public keys that are associated with data consumer devices permitted to access content encrypted by the content-encryption key (CEK).

In at least one embodiment, process 2600 comprises a step 2606 for encrypting, using the plurality of public keys, the ECEK, thereby producing a plurality of double-encrypted content encryption keys (DECEKs).

In at least one embodiment, process 2600 comprises a step 2608 for storing the plurality of DECEKs in association with the encrypted content.

In various embodiments, the plurality of public keys comprises: a first public key associated with a first user; and a second public key associated with a second user.

In various embodiments, the encryption offload point is implemented in a computing resource service provider that is remote from the data producer device.

In various embodiments, the encryption offload point lacks sufficient cryptographic material to determine the content encryption key.

In various embodiments, process 2600 further comprises: determining, by the second one or more processors, an additional data consumer device is permitted to access the content; determining, by the second one or more processors, an additional public key associated with the additional data consumer device; and encrypting, by the second one or more processors and using the additional public key, the ECEK, thereby producing an additional double-encrypted content encryption key (DECEK).

Figure 27:
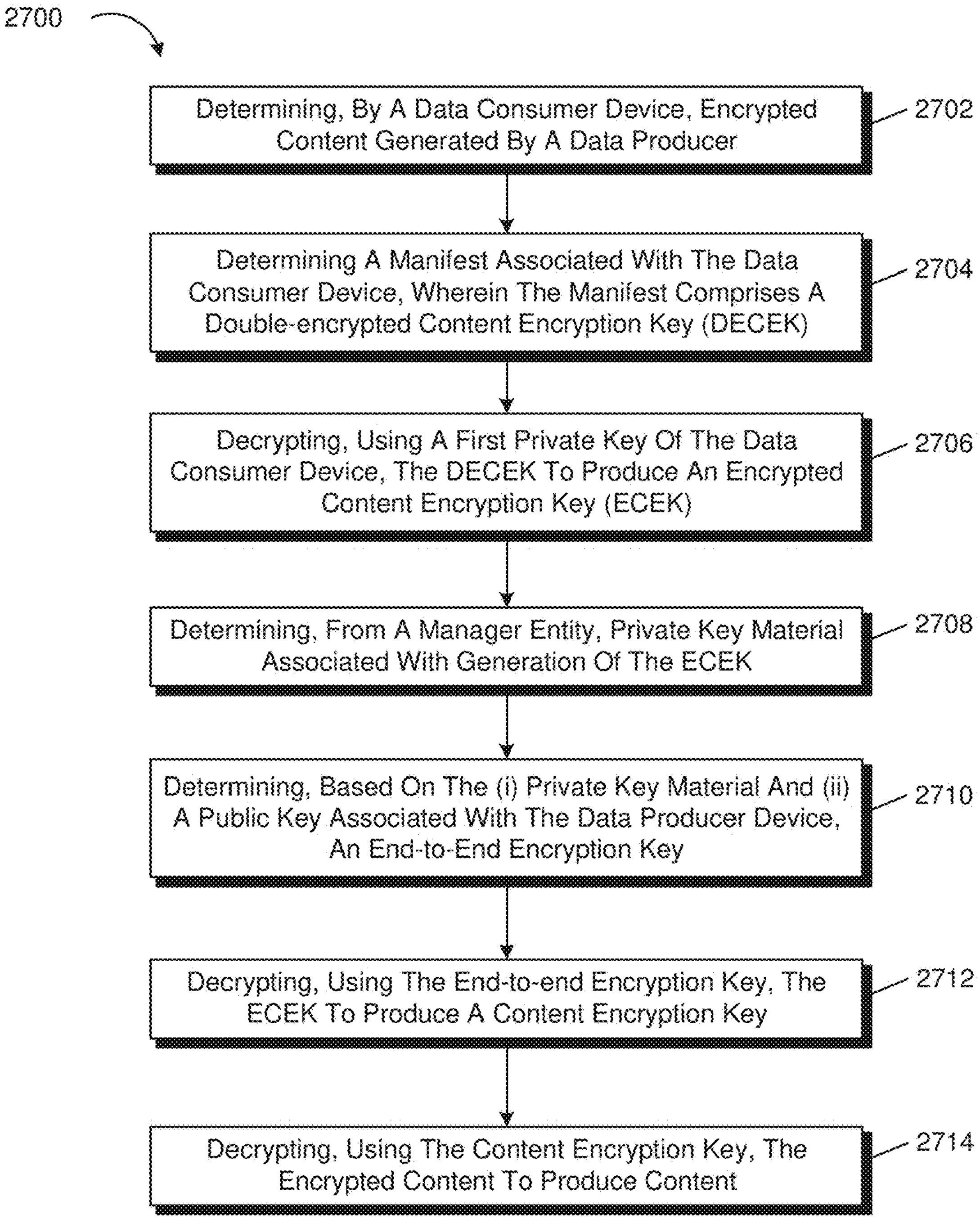
FIG. 27 shows an illustrative example of a process 2700 for implementing a data consumer that utilizes encryption offloading, in accordance with one or more example embodiments of the present disclosure.

FIG. 27 shows an illustrative example of a process 2700 for implementing a data consumer that utilizes encryption offloading, in accordance with one or more example embodiments of the present disclosure. In at least one embodiment, some or all of the process 2700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, a system comprises one or more processor and memory storing executable instructions that, as a result of execution by the one or more processors, cause the system to perform some or all steps of process 2700. Process 2700 may be implemented in the context of various systems and methods described elsewhere in this disclosure, such as those discussed in connection with FIGS. 8-12 and 33.

In at least one embodiment, process 2700 comprises a step 2702 for determining, by a data consumer device, encrypted content generated by a data producer.

In at least one embodiment, process 2700 comprises a step 2704 for determining a manifest associated with the data consumer device, wherein the manifest comprises a double-encrypted content encryption key (DECEK).

In at least one embodiment, process 2700 comprises a step 2706 for decrypting, using a first private key of the data consumer device, the DECEK to produce an encrypted content encryption key (ECEK).

In at least one embodiment, process 2700 comprises a step 2708 for determining private key material associated with generation of the ECEK.

In at least one embodiment, process 2700 comprises a step 2710 for determining, based on the (i) private key material and (ii) a public key associated with the data producer device, an end-to-end encryption key.

In at least one embodiment, process 2700 comprises a step 2712 for decrypting, using the end-to-end encryption key, the ECEK to produce a content-encryption key.

In at least one embodiment, process 2700 comprises a step 2714 for decrypting, using the content-encryption key, the encrypted content to produce content.

In various embodiments, determining, by the one or more processors, the private key material associated with the generation of the ECEK comprises: providing, by the one or more processors, a request to a manager entity, the request comprising an identifier associated with the data producer; obtaining, by the one or more processors, encrypted private key material associated with the generation of the ECEK; and decrypting, by the one or more processors and using the first private key, the encrypted private key material to produce the private key material.

In various embodiments, the end-to-end encryption key is determined according to an Elliptic Curve Diffie Hellman (ECDH) key exchange protocol. For example, in some embodiments, the private key material comprises ECDH key derivation parameters.

In various embodiments, the encrypted content is obtained from a system other than the data producer.

In various embodiments, the end-to-end encryption key is a symmetric key.

In various embodiments, the encrypted content comprises metadata that indicates how to locate the manifest.

In various embodiments, a system comprises one or more processors and memory storing executable instructions that, as a result of execution by the one or more processors, cause the system to: obtain, from a data producer device, an encrypted content encryption key (ECEK), wherein a plaintext of the ECEK is usable to decrypt encrypted content generated by the data producer device; determine one or more public keys associated with data consumer device(s) that are permitted to decrypt the encrypted content; encrypt, using the one or more public keys, the ECEK, thereby producing correspond one or more double-encrypted content encryption keys (DECEKs); and store the one or more DECEKs in association with the encrypted content.

In various embodiments, the one or more public keys are determined based at least in part on policies associated with the data consumer device(s) indicating that they are permitted to decrypt the encrypted content.

In various embodiments, the system lacks sufficient cryptographic material to decrypt the encrypted content.

In various embodiments, wherein the instructions, as a result of being executed by the one or more processors of the system, further cause the system to: obtain a request to access a DECEK of the one or more DECEKs; authenticate the request as being from one of the data consumer device (s); and responsive to a successful authentication of the request, provide the DECEK.

In various embodiments, the instructions, as a result of being executed by the one or more processors of the system, further cause the system to: determine that the system is one of the data consumer device(s) that is permitted to decrypt the encrypted content; obtain, from a manager entity, private key material associated with public key material used to generate an end-to-end encryption key; determine, based on the (i) the private key material and (ii) a private key associated with the system, the end-to-end encryption key; and decrypt, using the end-to-end encryption key, the ECEK to produce a content encryption key.

In various embodiments, the end-to-end encryption key is determined according to an Elliptic Curve Diffie Hellman (ECDH) key exchange protocol. For example, the private key material may comprise ECDH key derivation parameters.

In various embodiments, the DECEKs are stored in a manifest that is referenced by the encrypted content.

Figure 28:
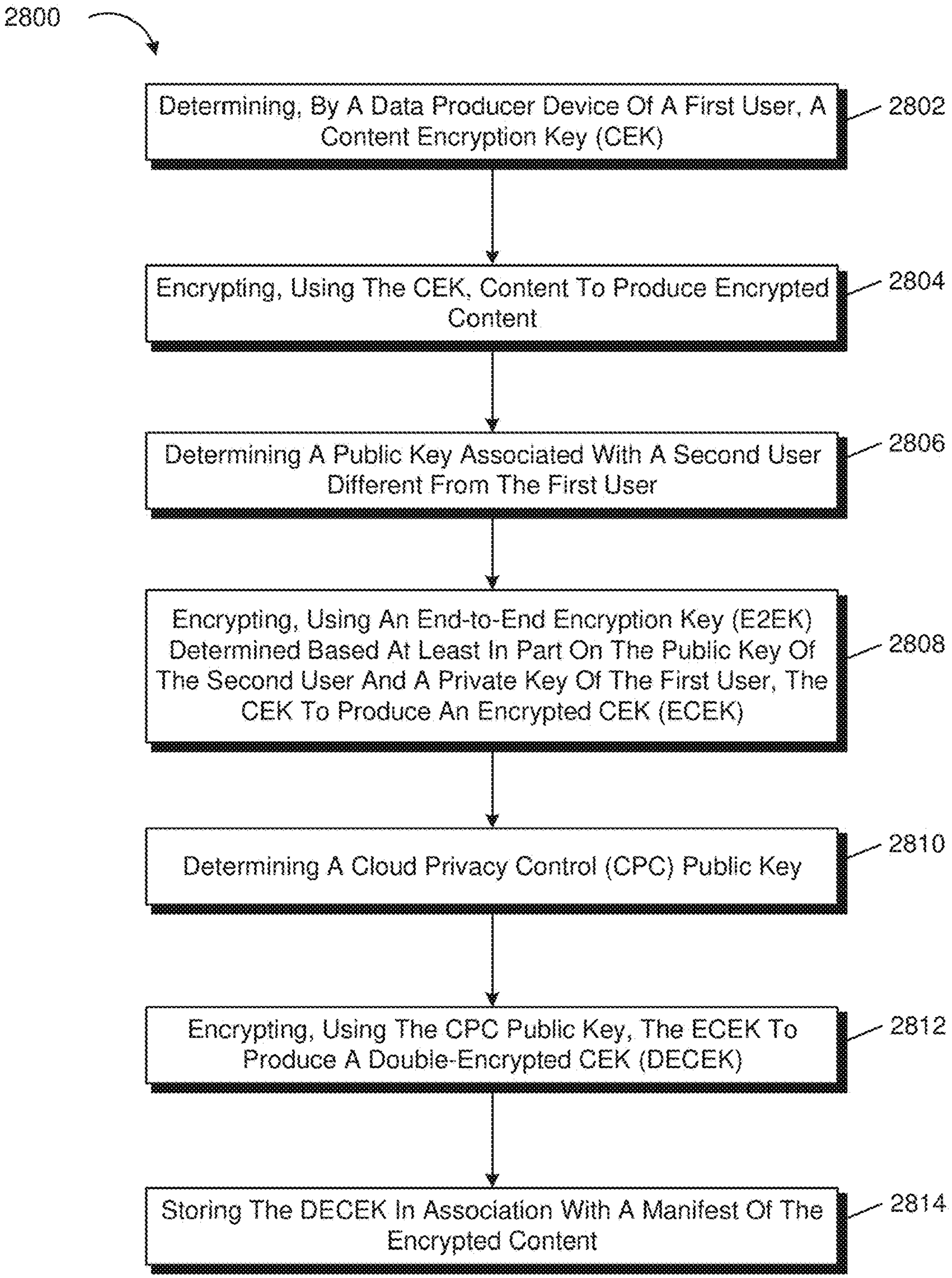
FIG. 28 shows an illustrative example of a process 2800 for a data producer that generates content for sharing with a data consumer using cloud privacy controls, in accordance with one or more example embodiments of the present disclosure.

FIG. 28 shows an illustrative example of a process 2800 for a data producer that generates content for sharing with a data consumer using cloud privacy controls, in accordance with one or more example embodiments of the present disclosure. In at least one embodiment, some or all of the process 2800 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2800 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, a system comprises one or more processor and memory storing executable instructions that, as a result of execution by the one or more processors, cause the system to perform some or all steps of process 2800. Process 2800 may be implemented in the context of various systems and methods described elsewhere in this disclosure, such as those discussed in connection with FIGS. 13-17 and 33.

In at least one embodiment, process 2800 comprises a step 2802 for determining, by a data producer device of a first user, a content encryption key (CEK).

In at least one embodiment, process 2800 comprises a step 2804 for encrypting, using the CEK, content to produce encrypted content.

In at least one embodiment, process 2800 comprises a step 2806 for determining a privacy domain public key associated with a second user different from the first user.

In at least one embodiment, process 2800 comprises a step 2808 for encrypting, using an end-to-end encryption key (E2EK) determined based at least in part on the public key of the second user and a private key of the first user, the CEK to produce an encrypted CEK (ECEK).

In at least one embodiment, process 2800 comprises a step 2810 for determining a cloud privacy control (CPC) public key.

In at least one embodiment, process 2800 comprises a step 2812 for encrypting, using the CPC public key, the ECEK to produce a double-encrypted CEK (DECEK).

In at least one embodiment, process 2800 comprises a step 2814 for storing the DECEK in association with a manifest of the encrypted content.

Figure 29:
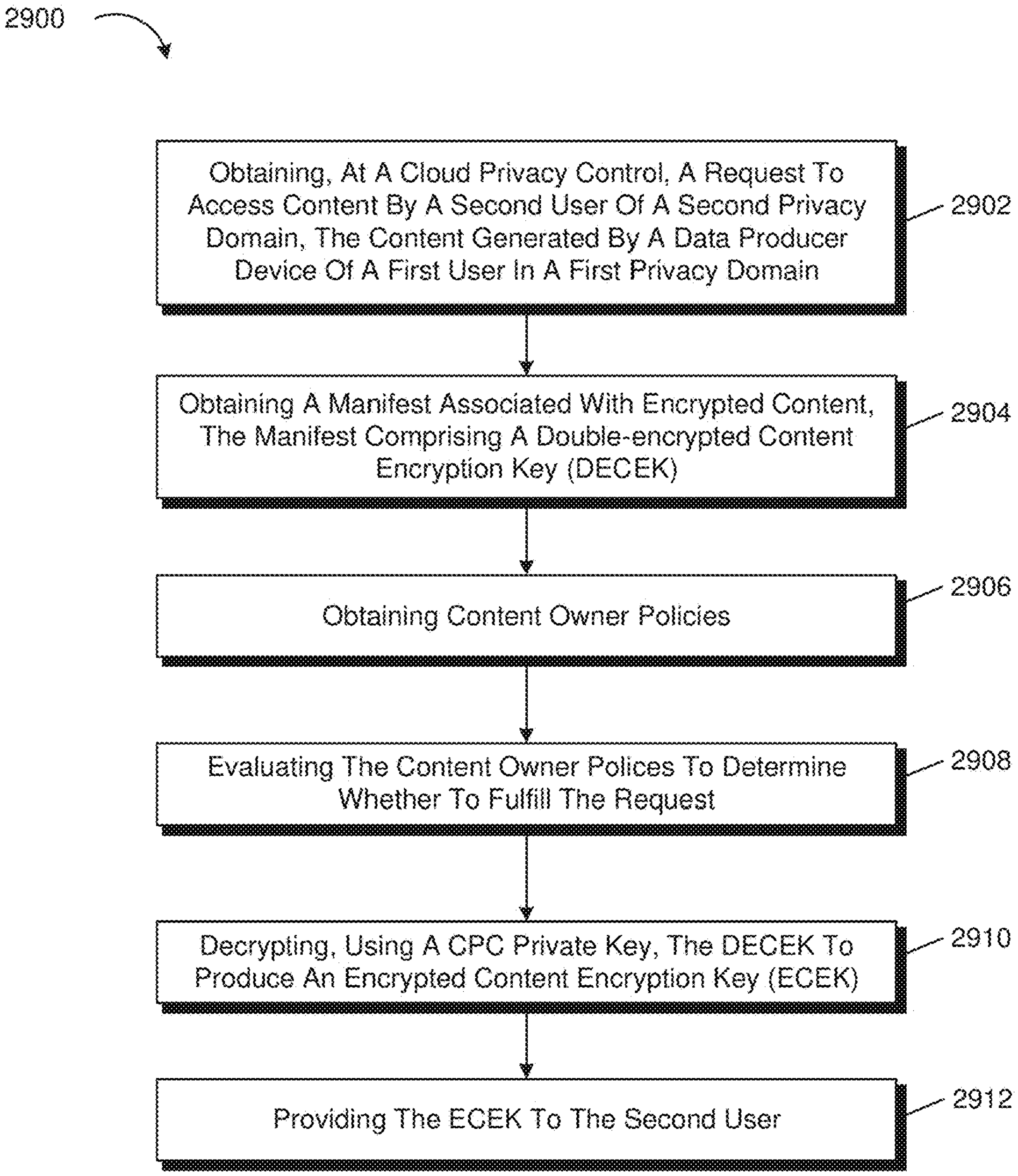
FIG. 29 shows an illustrative example of a process 2900 for a cloud privacy control for sharing content between a data producer and a data consumer, in accordance with one or more example embodiments of the present disclosure.

FIG. 29 shows an illustrative example of a process 2900 for a cloud privacy control for sharing content between a data producer and a data consumer, in accordance with one or more example embodiments of the present disclosure. In at least one embodiment, some or all of the process 2900 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 2900 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, a system comprises one or more processor and memory storing executable instructions that, as a result of execution by the one or more processors, cause the system to perform some or all steps of process 2900. Process 2900 may be implemented in the context of various systems and methods described elsewhere in this disclosure, such as those discussed in connection with FIGS. 13-17 and 33.

In at least one embodiment, process 2900 comprises a step 2902 for obtaining, at a cloud privacy control, a request to access content by a second user of a second privacy domain, the content generated by a data producer device of a first user in a first privacy domain.

In at least one embodiment, process 2900 comprises a step 2904 for obtaining a manifest associated with encrypted content, the manifest comprising a double-encrypted content encryption key (DECEK).

In at least one embodiment, process 2900 comprises a step 2906 for obtaining content owner policies. In some embodiments, the policy comprises a temporal condition on the second user's ability to access the content.

In at least one embodiment, process 2900 comprises a step 2908 for evaluating the content owner policies to determine whether to fulfill the request.

In at least one embodiment, process 2900 comprises a step 2910 for decrypting, using a CPC private key, the DECEK to produce an encrypted content encryption key (ECEK).

In at least one embodiment, process 2900 comprises a step 2912 for providing the ECEK to the second user.

In some embodiments, process 2900 comprises: determining, by the first one or more processors, a second privacy domain public key associated with a third user different from the first user; encrypting, by the one or more processors and using the second privacy domain public key, the CEK to produce a second encrypted CEK (ECEK); and encrypting, by the one or more processors and using the CPC public key, the second ECEK to produce a second double-encrypted CEK (DECEK).

In various embodiments, the cloud privacy control lacks sufficient cryptographic material to decrypt the ECEK.

In various embodiments, the method comprises: at a data consumer device of the second user: obtaining, by third one or more processors of the data consumer device, the ECEK; decrypting, by the third one or more processors and using a privacy domain private key, the ECEK to produce the CEK; and decrypting, by the third one or more processors and using the CEK, the encrypted content to produce the content.

Figure 30:
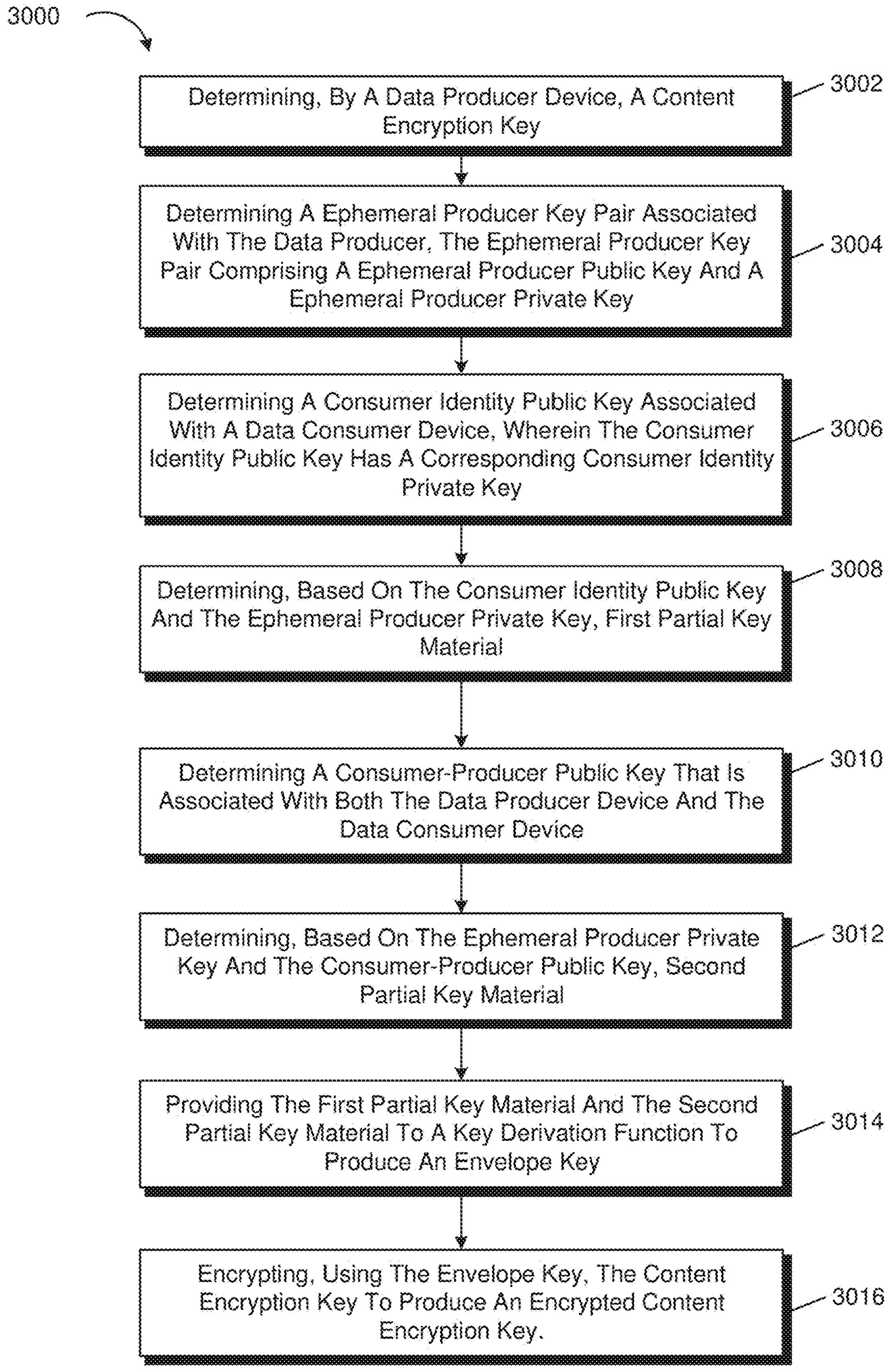
FIG. 30 shows an illustrative example of a process 3000 for a data producer that utilizes a key vault to share content with a data consumer, in accordance with one or more example embodiments of the present disclosure.

FIG. 30 shows an illustrative example of a process 3000 for a data producer that utilizes a key vault to share content with a data consumer, in accordance with one or more example embodiments of the present disclosure. In at least one embodiment, some or all of the process 3000 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 3000 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, a system comprises one or more processor and memory storing executable instructions that, as a result of execution by the one or more processors, cause the system to perform some or all steps of process 3000. Process 3000 may be implemented in the context of various systems and methods described elsewhere in this disclosure, such as those discussed in connection with FIGS. 18-22 and 33.

In at least one embodiment, process 3000 comprises a step 3002 for determining, by a data producer device, a content-encryption key.

In at least one embodiment, process 3000 comprises a step 3004 for determining an ephemeral producer key pair associated with the data producer, the ephemeral producer key pair comprising an ephemeral producer public key, and an ephemeral producer identity private key.

In at least one embodiment, process 3000 comprises a step 3006 for determining a consumer identity public key associated with a data consumer device, wherein the consumer identity public key has a corresponding consumer identity private key.

In at least one embodiment, process 3000 comprises a step 3008 for determining, based on the consumer identity public key and the producer identity private key, first partial key material.

In at least one embodiment, process 3000 comprises a step 3010 for determining a consumer-producer public key that is associated with both the data producer device and the data consumer device;

In at least one embodiment, process 3000 comprises a step 3012 for determining, based on the producer identity private key and the consumer-producer public key, second partial key material;

In at least one embodiment, process 3000 comprises a step 3014 for providing the first partial key material and the second partial key material to a key derivation function to produce an envelope key; and In at least one embodiment, process 3000 comprises a step 3016 for encrypting, using the envelope key, the content-encryption key to produce an encrypted content-encryption key.

In some embodiments, a corresponding consumer-producer private key to the consumer-producer public key is managed by a key vault.

In some embodiments, the first partial key material can also be determined based on the consumer identity private key and the producer identity public key; and the second partial key material can also be determined based on the producer identity public key and the consumer-producer private key.

In some embodiments, the key vault is implemented as a hardware security module (HSM).

In some embodiments, the consumer-producer private key is programmatically unexportable from the HSM.

In some embodiments, the producer identity key pair are ephemeral keys.

In some embodiments, the key derivation function is PBKDF2.

In at least one embodiment, a process comprises: determining, by a manager device or application, to permit a data consumer device access to content generated by a data producer device; providing, by the manager device or application, instructions to a key vault to generate a consumer-producer key pair that is associated with both the data consumer device and the data producer device, the consumer-producer key pair comprising a consumer-producer private key and a consumer-producer public key; determining, at the data producer device, first partial key material based at least in part on a data producer private key and a data consumer public key; determining, at the data producer device, second partial key material based at least in part on the data producer private key and the consumer-producer public key; performing, at the data producer device, a key derivation based on the first partial key material and the second partial key material to produce an envelope key; and encrypting, at the data producer device and using the envelop key, a content encryption key (CEK), wherein the CEK is used to encrypt the content.

In at least one embodiment, a process further comprises: obtaining, by the data consumer device, an encrypted content encryption key; determining, at the data consumer device, the first partial key material based at least in part on a data consumer private key and a data producer public key; submitting, at the data consumer device, a request to the key vault for the second partial key material; obtaining, at the data consumer device, a response from the key vault with the second partial key material; performing, at the data consumer device, the key derivation based on the first partial key material and the second partial key material to produce the envelope key; and decrypting, at the data consumer device and using the envelope key, the encrypted content encryption key to produce the content encryption key.

In at least one embodiment, a process further comprises: decrypting, at the data consumer device and using the content-encryption key, encrypted content to produce the content.

In at least one embodiment, the second partial key material is provided to the data consumer device contingent upon evaluation of one or more policies by the key vault.

Figure 31:
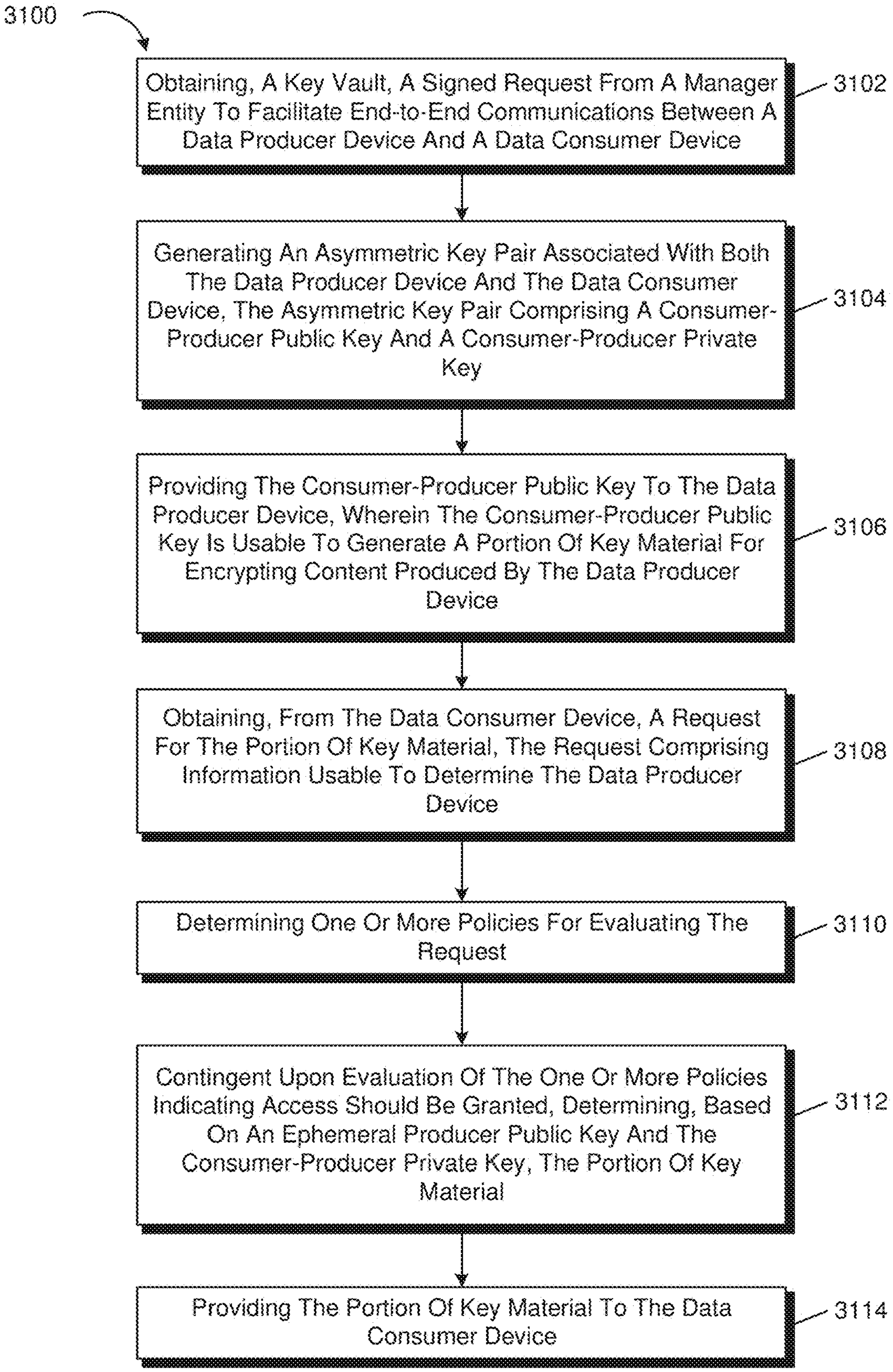
FIG. 31 shows an illustrative example of a process 3100 for a data producer that utilizes a key vault to share content with a data consumer, in accordance with one or more example embodiments of the present disclosure.

FIG. 31 shows an illustrative example of a process 3100 for a data producer that utilizes a key vault to share content with a data consumer, in accordance with one or more example embodiments of the present disclosure. In at least one embodiment, some or all of the process 3100 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 3100 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, a system comprises one or more processors and memory storing executable instructions that, as a result of execution by the one or more processors, cause the system to perform some or all steps of process 3100. Process 3100 may be implemented in the context of various systems and methods described elsewhere in this disclosure, such as those discussed in connection with FIGS. 18-22 and 33.

In at least one embodiment, process 3100 comprises a step 3102 for obtaining, a key vault, a signed request from a manager entity to facilitate end-to-end communications between a data producer device and a data consumer device.

In at least one embodiment, process 3100 comprises a step 3104 for generating an asymmetric key pair associated with both the data producer device and the data consumer device, the asymmetric key pair comprising a consumer-producer public key and a consumer-producer private key.

In at least one embodiment, process 3100 comprises a step 3106 for providing the consumer-producer public key to the data producer device, wherein the consumer-producer public key is usable to generate a portion of key material for encrypting content produced by the data producer device.

In at least one embodiment, process 3100 comprises a step 3108 for obtaining, from the data consumer device, a request for the portion of key material, the request comprising information usable to determine the data producer device. In some embodiments, the information is a key identifier or an identifier for a manifest that encodes the producer's public key.

In at least one embodiment, process 3100 comprises a step 3110 for determining one or more policies for evaluating the request.

In at least one embodiment, process 3100 comprises a step 3112 for contingent upon evaluation of the one or more policies indicating access should be granted, determining, based on the ephemeral producer public key and the consumer-producer private key, the portion of key material.

In at least one embodiment, process 3100 comprises a step 3114 for providing the portion of key material to the data consumer device.

In various embodiments, the key vault is implemented using a hardware security module (HSM). In various embodiments, the consumer-producer private key is programmatically unexportable from the HSM.

In various embodiments, the method further comprises: obtaining, by the one or more processors, a command to revoke access from the data consumer device; and causing, by the one or more processors, the HSM to destroy the consumer-producer private key.

In various embodiments, evaluation of the one or more policies comprises: determining, by the one or more processors, that an application on the manager's entity is not running; and providing, by the one or more processors, an indication that access should be denied.

In various embodiments, the evaluation of the one or more policies comprises: determining, by the one or more processors, that an application on the manager entity is running; and providing, by the one or more processors, an indication that access should be granted.

In various embodiments, the producer identity public key is an ephemeral key.

In various embodiments, the portion of key material is also determinable based on a producer identity private key and the consumer-producer public key.

It should be noted that throughout this disclosure, references to a "once" or "twice" encrypted quantity may refer simply to the minimum number of layers of encryption rather than an exact number of layers and that a "single" encrypted quantity may be encrypted once, but may also be encrypted twice, thrice, or more times. Likewise, a "double" encrypted quantity may be encrypted twice, thrice, or more times using different sets of cryptographic material.

One or more operations of the methods, process flows, or use cases of FIGS. 1-33 may have been described above as being performed by a user device, or more specifically, by one or more program module(s), applications, or the like executing on a device. It should be appreciated, however, that any of the operations of the methods, process flows, or use cases of FIGS. 1-33 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-33 may be described in the context of the illustrative devices, it should be appreciated that such operations may be implemented in connection with numerous other device configurations.

The operations described and depicted in the illustrative methods, process flows, and use cases of FIGS. 1-33 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-33 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 32:
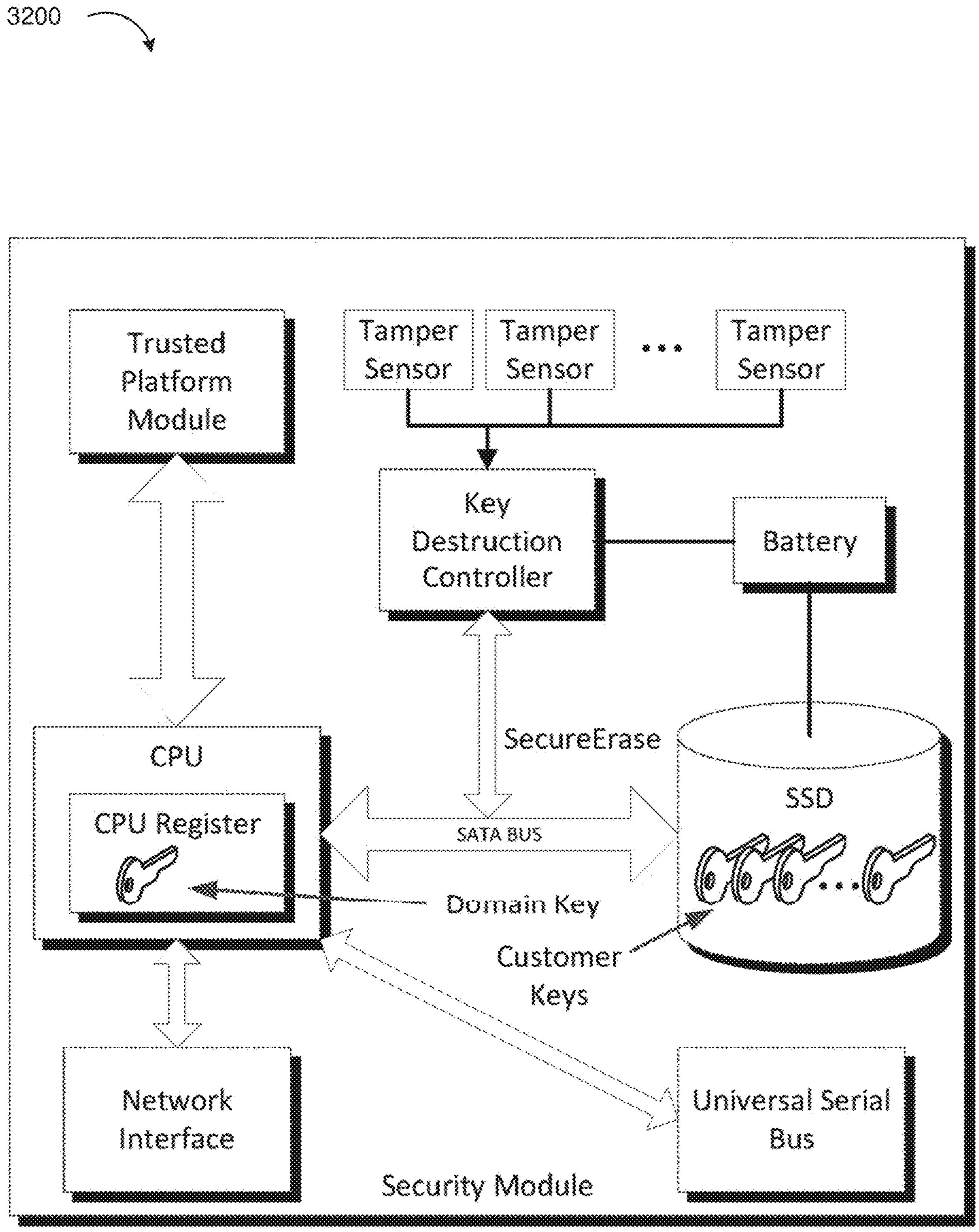
FIG. 32 illustrates one way in which customer keys may be rendered inaccessible, in accordance with one or more example embodiments of the present disclosure.

In an embodiment, the security module is configured such that activation of one or more of the tamper sensors causes customer keys to become inaccessible. Causing customer keys to become inaccessible may be performed in various ways in accordance with the various embodiments. For example, FIG. 32 illustrates one way in which customer keys may be rendered inaccessible. In particular, as illustrated in FIG. 32, the tamper sensors are communicatively connected with a key destruction controller, which may be hardware (e.g., circuitry including a processor) configured to issue an erase command to the SSD to erase customer keys when appropriate. In an embodiment, the key destruction controller's processor(s) is/are separate from the CPU, e.g., as part of a data storage subsystem, such that, even if the CPU is inoperable, the key destruction controller is able to operate as described below. For example, in an embodiment, the key destruction controller is electrically connected to the SATA bus such that when a need to erase customer keys is detected by the key destruction controller, the key destruction controller issues a SecureErase command over the SATA bus to the SSD, thereby causing the SSD to securely erase the customer key stored thereon. In other embodiments, such as where different types of storage devices are used, a different type of command causing lost access to customer keys may be used. In the embodiment illustrated in the figure, the key destruction controller may be electrically connected to the SATA bus in any suitable manner. For example, the key destruction controller may be connected with the SATA bus such that any commands issued simultaneously with the erase command do not conflict, potentially causing the erase command to be unfulfilled by the SSD. For example, the key destruction controller may be configured to break one or more circuits between the SSD and the CPU to disable the CPU's ability to transmit a conflicting command to the SSD. Other techniques for avoiding conflicting commands may also be used.

The key destruction controller may also perform other operations. For example, in an embodiment, the key destruction controller may generate a certificate that states that the SecureErase operation was completed correctly. The certificate may state metadata about the SecureErase operation, such as the time the operation was completed. The security module may, upon reboot or other events, perform a self-test routine to confirm that the SecureErase command was successfully completed. Failure of the self-test may cause the security module to perform one or more predefined operations, such as issuing a SecureErase command again.

Further, as illustrated in FIG. 32, the security module includes a battery, comprising one or more battery cells, to which at least the key destruction controller and SSD are connected. The battery may be rechargeable (e.g., comprising one or more lithium ion or other rechargeable cells) and may be charged during normal operation of the security module by charging the circuitry of the security module (not shown). By use of a battery, if a main power supply to the security module is cut off, the battery provides enough power to the key destruction controller and the SSD to enable the key destruction controller to issue the SecureErase command and enable the SSD to fulfill the SecureErase command and securely render the customer keys inaccessible.

It should be noted that the particular configuration of components and the security module are provided for the purpose of illustration and that numerous other components may be used. For example, while FIG. 32 shows an SSD used in accordance with various embodiments, any data storage device may be used. In addition, in other embodiments, customer keys may be stored in volatile memory such that intrusion events and/or a loss of power may cause customer keys to be rendered inaccessible despite the loss of power (from the main power supply). In some embodiments, a volatile memory is separate from the CPU, although, in other embodiments, as noted above, some or all customer keys may be stored in the CPU register. Other variations are also considered as being within the scope of the present disclosure. For instance, in some embodiments, customers are able to specify the type of storage in which keys are to be stored. A customer may, for instance, request that one key be stored in persistent memory (e.g., in one or more SSDs) and another key be stored in volatile memory. Such requests may be part of a request to create a key and/or may be submitted after a key is created. In the latter case, the request may identify key(s) by its/their KeyID.

In an embodiment, a security module operates in a plurality of modes. The plurality of modes, in an embodiment, includes a service mode and a use mode. In the service mode, the security module does not store customer keys and does not store a domain key. For example, the security module may be configured to destroy its access to the domain key and customer keys upon detection of entry into security mode (or, alternatively, upon detection of leaving use mode). Access may be destroyed in any suitable manner, such as through a SecureErase command issued to an SSD storing customer keys, removal of power to volatile memory (e.g., CPU register) storing the domain key and/or one or more customer keys, encrypting the domain key and/or one or more customer keys with another key and then losing access to the other key, overwriting (with random, pseudo-random, or other data) memory locations storing the domain key and/or one or more customer keys and/or destroying access in other ways. In security mode, however, an administrative interface is enabled to allow the security module to receive code updates and perform other administrative functions. The administrative interface may include a secure shell (SSH) console login, a remotely accessible desktop, and/or other functionalities. In an embodiment, the security module transitions between the two modes, although, in other embodiments, the security module may have more than two modes.

In use mode, in an embodiment, the security module is configured to store a domain key and one or more customer keys, to use the domain key and/or one or more customer keys such as described in more detail below. For example, when in use mode, a security module may receive requests to perform cryptographic operations using a customer key identified by a KeyID, perform the requested cryptographic operations, and provide results of the performed cryptographic operations in response to the requests. In use mode, however, some or all administrative interfacing abilities of the security module are disabled. For example, in use mode some or all functionalities available through an administrative interface may be blocked while in use mode, although, in some embodiments, a limited number of administrative capabilities may be allowed. For example, in some embodiments, functions using the simple network management protocol (SNMP) may be available in use mode and/or in other modes. As such, in various embodiments, when in use mode, a security module cannot receive code updates. Other capabilities may also be disabled when in use mode.

In an embodiment, some or all components of a security module are implemented using commodity hardware (e.g., a commodity processor, commodity storage device, commodity TPM, commodity motherboard, commodity sensors, commodity cooling fans, and/or other commodity hardware components). Commodity hardware may be hardware configured to operate in accordance with a standard, which may be defined by the International Organization for Standardization or another organization and which may be an open standard. Example standards include industry standard architecture (ISA), peripheral component interconnect (PCI), PCI Express, Universal Serial Bus (USB), Serial ATA (SATA) and other standards. As such, a commodity hardware component of a security module that operates in accordance with a standard may be replaceable by another component, possibly of a different manufacturer, that operates according to the same open standard. In other words, commodity hardware components may be replaced by other components without affecting the operation of the security module. Commodity hardware components may also lack specialization. For example, commodity hardware components may be obtained from a mass producer of the hardware components without the need to specialize in the hardware components. In some embodiments, a security module comprises solely commodity hardware. Thus, embodiments of the present disclosure provide numerous technical advantages as they allow the use of commodity hardware (which is obtainable at substantially lower costs than non-commodity hardware) while still ensuring data security.

Security modules in accordance with the present disclosure may be configured to maintain various security measures. For example, in various embodiments, security modules are configured such that customer secrets (e.g., customer keys) may exist in plaintext only in volatile memory. Customer secrets in non-volatile memory must be stored in encrypted form, the encryption performed using a key to which only security modules in the same cryptography domain have access. Further, in various embodiments, security modules are configured such that operators have access to a security module only when the security module itself lacks access to customer secrets in plaintext form. Thus, in such embodiments, a security module cannot be logged into by an operator, although a security module's software stack may provide mechanisms for extracting logs, but will not permit on-box debugging. Logging mechanisms that could expose the contents of volatile memory (or generally that could expose customer secrets in plaintext form) are disabled, while the security module has access to the customer secrets in plaintext form. In some embodiments, security modules provide verifiable shredding (destruction) of customer secrets by a quorum mechanism combined with master-key rotation (i.e., rotation of the domain key). Further, in various embodiments, security modules are configured to be unable to make API calls to one another. A cryptography service using such security modules may be configured to coordinate all information transfer among security modules of a cryptographic domain. In various embodiments, security modules are FIPS-compliant and/or have gone through FIPS validation, as discussed above. A security module may use a FIPS validated crypto library and minimize dependencies to ease the validation process.

Cryptographic material and other information stored in a security module may be said to be programmatically unexportable if there is no legitimate way to programmatically cause (e.g., through an interface of the security module) the security module to provide the information. Information, such as customer keys or other sensitive data, may be maintained such that there is no request mechanism (e.g., application programming interface (API) call) for causing hardware, with access to the information in plaintext form, to reveal the information in plaintext form. As an example, the security module may be configured to lack the ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form. As a result, absent extraordinary computational effort, a device lacking access to cryptographic material securely stored within a security module is unable to perform various cryptographic operations such as decrypting ciphertexts, generating digital signatures or authentication tags, etc.

Figure 33:
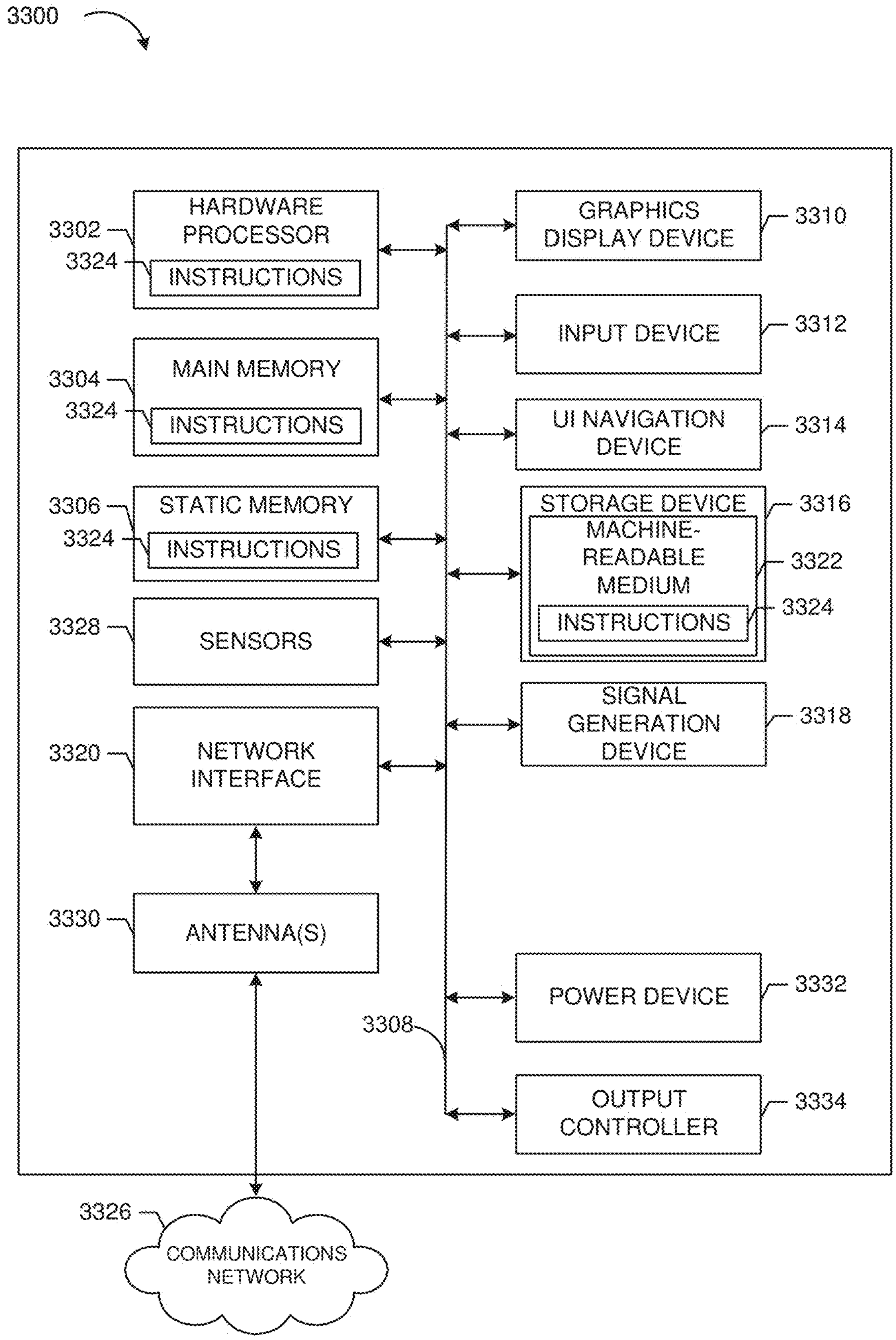
FIG. 33 illustrates a block diagram of an example machine upon which any of one or more techniques (e.g., methods) may be performed, in accordance with one or more example embodiments of the present disclosure.

FIG. 33 illustrates a block diagram of an example of a machine 3300 (e.g., implemented in whole or in part in the context of embodiments described in connection with other figures. In some embodiments, the machine 3300 may operate as a standalone device or may be connected (e.g., networked) to other machines. In a networked deployment, the machine 3300 may operate in the capacity of a server machine, a client machine, or both in server-client network environments. In an example, the machine 3300 may act as a peer machine in Wi-Fi direct, peer-to-peer (P2P) (or other distributed) network environments. The machine 3300 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 3300 may include any combination of the illustrated components. For example, the machine 3300 may include a hardware processor 3302 (e.g., a central processing unit (CPU), a graphics processing unit (GPU), a hardware processor core, or any combination thereof), a main memory 3304, and a static memory 3306, some or all of which may communicate with each other via an interlink (e.g., bus) 3308. The machine 3300 may further include a power management device 3332, a graphics display device 3310, an alphanumeric input device 3312 (e.g., a keyboard), and a user interface (UI) navigation device 3314 (e.g., a mouse). In an example, the graphics display device 3310, alphanumeric input device 3312, and UI navigation device 3314 may be a touch screen display. The machine 3300 may additionally include a storage device (e.g., drive unit) 3316, a signal generation device 3318, and a network interface device/transceiver 3320 coupled to antenna(s) 3330. The machine 3300 may include an output controller 3334, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 3316 may include a machine readable medium 3322 on which is stored one or more sets of data structures or instructions 3324 (e.g., software) embodying or utilized by any one or more of the techniques or functions described herein. The instructions 3324 may also reside, completely or at least partially, within the main memory 3304, within the static memory 3306, or within the hardware processor 3302 during execution thereof by the machine 3300. In an example, one or any combination of the hardware processor 3302, the main memory 3304, the static memory 3306, or the storage device 3316 may constitute machine-readable media.

While the machine-readable medium 3322 is illustrated as a single medium, the term "machine-readable medium" may include a single medium or multiple media (e.g., a centralized or distributed database, and/or associated caches and servers) configured to store the one or more instructions 3324.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM), random access memory (RAM), magnetic disk storage media, optical storage media, a flash memory, etc.

The term "machine-readable medium" may include any medium that is capable of storing, encoding, or carrying instructions for execution by the machine 3300 and that causes the machine 3300 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 3324 may further be transmitted or received over a communications network 3326 using a transmission medium via the network interface device/transceiver 3320 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 3320 may include one or more physical jacks (e.g., Ethernet, coaxial, or phone jacks) or one or more antennas to connect to the communications network 3326. In an example, the network interface device/transceiver 3320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 3300 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device," and "user equipment" (UE) as used herein refer to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating," as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple-input multiple-output (MIMO) transceiver or device, a single-input multiple-output (SIMO) transceiver or device, a multiple-input single-output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machines, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that, upon execution, may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). The number of items in a plurality is at least two but it can be more when so indicated either explicitly or by context.

Additionally, features of various systems and methods described herein that are implemented "by" or "based on" performing a step are to be construed or may be synonymous to "by at least" or "based at least in part on" performing said step rather than "by solely" or "based solely on" performing said step, unless it is explicitly stated or clear from the context. For example, a system that implements specific features "by" performing a particular step may be described in a manner that is not exclusive of the performance of other steps, some of which may be related to said particular step. In some cases, other steps may omitted from various discussions for the sake of clarity.

What is claimed is:

1. A method comprising:
- obtaining, by one or more processors of a cloud privacy control and from a computing entity, a request comprising:
  - information associated with digital content to access; and
  - a digital signature;
- validating, by the one or more processors, the digital signature to determine a first identity associated with the computing entity;
- determining, by the one or more processors, a manifest that encodes a plurality of double-encrypted content encryption keys (DECEKs) associated with the digital content;
- selecting, by the one or more processors, a first DECEK from the plurality of DECEKs that is associated with the first identity;
- decrypting, by the one or more processors and using a cryptographic key associated with the cloud privacy control, the first DECEK to produce a first encrypted content encryption key (ECEK); and
- providing, by the one or more processors, the first ECEK to the computing entity.

2. The method of claim 1, wherein the information associated with the digital content comprises the manifest.

3. The method of claim 1, wherein the first identity corresponds to a first privacy domain.

4. The method of claim 1, further comprising:
- requesting, by the one or more processors, one or more policies;
- evaluating, by the one or more processors, the one or more policies; and
- wherein the first DECEK is decrypted contingent upon the one or more policies indicating that the computing entity is authorized to access the digital content.

5. A system, comprising:
- one or more processors; and
- memory storing executable instructions that, as a result of execution by the one or more processors, cause the system to:
  - obtain, from a computing entity, a request comprising:
    - information associated with digital content to access; and
    - a digital signature;
  - validate, by the one or more processors, the digital signature to determine a first identity associated with the computing entity;
  - determine a manifest that encodes a plurality of double-encrypted content encryption keys (DECEKs) associated with the digital content;
  - select a first DECEK from the plurality of DECEKs that is associated with the first identity;
  - decrypt, using a cryptographic key associated with the system, the first DECEK to produce a first encrypted content encryption key (ECEK); and
  - provide, by the one or more processors, the first ECEK to the computing entity.

6. The system of claim 5, wherein the information associated with the digital content comprises the first DECEK.

7. The system of claim 5, wherein the first identity corresponds to a first privacy domain.

8. The system of claim 5, wherein the executable instructions include further instructions that, as a result of execution by the one or more processors, further cause the system to:
- request one or more policies;
- evaluate the one or more policies; and
- wherein the first DECEK is decrypted contingent upon the one or more policies indicating that the computing entity is authorized to access the digital content.

9. The system of claim 8, wherein the executable instructions include further instructions that, as a result of execution by the one or more processors, further cause the system to:
- determine, based at least in part on the one or more policies, that the first computing entity's access to the digital content should be revoked; and
- revoking an identity key associated with the digital signature.

10. The system of claim 5, wherein the system lacks sufficient cryptographic material to decrypt the first ECEK.

11. The system of claim 5, wherein the computing entity lacks sufficient cryptographic material to decrypt the first DECEK.

12. The system of claim 5, wherein the first identity is associated with a plurality of devices.

13. The system of claim 12, wherein the first ECEK is encrypted using a secret accessible to the plurality of devices.

14. A non-transitory computer-readable storage medium storing executable instructions that, as a result of being executed by one or more processors of a computer system, cause the computer system to at least:
- obtain encrypted content that encodes digital content to access;
- obtain a manifest comprising at least a double-encrypted content encryption key (DECEK) associated with the encrypted content;
- generate a request to access the digital content, the request comprising:
  - information associated with the digital content to access; and
  - a digital signature;
- submit the request to a cloud privacy control (CPC) service;
- receive a response to the request, the request comprising an encrypted content encryption key (ECEK) determined by the CPC service and based at least in part on the DECEK;

determine a cryptographic key suitable for decrypting the ECEK;

decrypt the ECEK to produce a content encryption key (CEK); and decrypt the encrypted content to access the digital content.

15. The non-transitory computer-readable storage medium of claim 14, wherein the information associated with the digital content comprises the DECEK.

16. The non-transitory computer-readable storage medium of claim 14, wherein:

the computer system is part of a privacy domain managed by the CPC service; and the cryptographic key is an end-to-end encryption key (E2EK) that is accessible to members of the privacy domain.

17. The non-transitory computer-readable storage medium of claim 16, wherein the executable instructions include further instructions that, as a result of execution by the one or more processors, further cause the system to:

generate the digital signature using an identity key associated with the privacy domain.

18. The non-transitory computer-readable storage medium of claim 14, wherein a data producer device generated the digital content and the executable instructions include further instructions that, as a result of execution by the one or more processors, further cause the system to:

obtain the encrypted content from the data producer device.

19. The non-transitory computer-readable storage medium of claim 14, wherein the CPC service lacks sufficient cryptographic material to decrypt the ECEK.

20. The non-transitory computer-readable storage medium of claim 14, wherein the computer system lacks sufficient cryptographic material to decrypt the DECEK.

* * * * *